United States Patent
Cole et al.

(10) Patent No.: US 10,742,948 B2
(45) Date of Patent: *Aug. 11, 2020

(54) METHODS AND APPARATUS FOR REQUESTING, RECEIVING AND/OR PLAYING BACK CONTENT CORRESPONDING TO AN ENVIRONMENT

(71) Applicant: NextVR Inc., Newport Beach, CA (US)

(72) Inventors: David Cole, Aliso Viejo, CA (US); Alan Moss, Laguna Beach, CA (US)

(73) Assignee: NextVR Inc., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/040,184

(22) Filed: Jul. 19, 2018

(65) Prior Publication Data

US 2019/0082158 A1 Mar. 14, 2019

Related U.S. Application Data

(63) Continuation of application No. 15/058,131, filed on Mar. 1, 2016, now Pat. No. 10,038,889.
(Continued)

(51) Int. Cl.
*H04N 13/111* (2018.01)
*G06F 3/01* (2006.01)
(Continued)

(52) U.S. Cl.
CPC ............ *H04N 13/111* (2018.05); *G06F 3/011* (2013.01); *G06F 3/012* (2013.01);
(Continued)

(58) Field of Classification Search
None
See application file for complete search history.

(56) References Cited

U.S. PATENT DOCUMENTS

| 6,111,582 A | 8/2000 | Jenkins |
| 8,451,320 B1 | 5/2013 | Cole et al. |

(Continued)

FOREIGN PATENT DOCUMENTS

| CN | 101729791 A | 6/2010 |
| CN | 102106152 A | 6/2011 |

(Continued)

*Primary Examiner* — Xiao M Wu
*Assistant Examiner* — Steven Z Elbinger
(74) *Attorney, Agent, or Firm* — Blank Rome LLP

(57) ABSTRACT

Methods and apparatus for receiving content including images of surfaces of an environment visible from a default viewing position and images of surfaces not visible from the default viewing position, e.g., occluded surfaces, are described. Occluded and non-occluded image portions are received in content streams that can be in a variety of stream formats. In one stream format non-occluded image content is packed into a frame with occluded image content with the occluded image content normally occupying a small portion of the frame. In other embodiments occluded image portions are received in an auxiliary data stream which is multiplexed with a data stream providing frames of non-occluded image content. UV maps which are used to map received image content to segments of an environmental model are also supplied with the UV maps corresponding to the format of the frames which are used to provide the images that serve as textures.

8 Claims, 25 Drawing Sheets

Related U.S. Application Data

(60) Provisional application No. 62/127,215, filed on Mar. 2, 2015, provisional application No. 62/126,701, filed on Mar. 1, 2015, provisional application No. 62/126,709, filed on Mar. 1, 2015.

(51) Int. Cl.

| | | |
|---|---|---|
| H04N 19/44 | (2014.01) | |
| H04N 13/139 | (2018.01) | |
| H04N 13/161 | (2018.01) | |
| H04N 13/189 | (2018.01) | |
| H04N 13/194 | (2018.01) | |
| H04N 13/204 | (2018.01) | |
| H04N 13/282 | (2018.01) | |
| G09G 3/00 | (2006.01) | |
| G09G 5/00 | (2006.01) | |
| H04N 13/344 | (2018.01) | |
| H04N 13/232 | (2018.01) | |
| H04N 13/279 | (2018.01) | |
| H04N 13/271 | (2018.01) | |
| H04N 13/239 | (2018.01) | |
| G06F 3/0481 | (2013.01) | |
| G06T 17/05 | (2011.01) | |
| G06T 17/20 | (2006.01) | |
| G06T 19/20 | (2011.01) | |
| H04N 21/434 | (2011.01) | |
| G06K 9/00 | (2006.01) | |

(52) U.S. Cl.
CPC .......... *G06F 3/04815* (2013.01); *G06T 17/05* (2013.01); *G06T 17/20* (2013.01); *G06T 19/20* (2013.01); *G09G 3/003* (2013.01); *G09G 5/001* (2013.01); *G09G 5/003* (2013.01); *G09G 5/006* (2013.01); *H04N 13/139* (2018.05); *H04N 13/161* (2018.05); *H04N 13/189* (2018.05); *H04N 13/194* (2018.05); *H04N 13/204* (2018.05); *H04N 13/232* (2018.05); *H04N 13/239* (2018.05); *H04N 13/271* (2018.05); *H04N 13/279* (2018.05); *H04N 13/282* (2018.05); *H04N 13/344* (2018.05); *H04N 19/44* (2014.11); *H04N 21/4345* (2013.01); *G06K 9/00362* (2013.01); *G06T 2207/30244* (2013.01); *G09G 2352/00* (2013.01); *G09G 2360/02* (2013.01); *G09G 2360/125* (2013.01); *G09G 2370/02* (2013.01)

(56) References Cited

U.S. PATENT DOCUMENTS

| | | |
|---|---|---|
| 8,610,757 B2 | 12/2013 | Cole et al. |
| 9,204,127 B1 | 12/2015 | Cole et al. |
| 9,313,474 B1 | 4/2016 | Cole et al. |
| 9,336,602 B1 | 5/2016 | Chang et al. |
| 9,407,902 B1 | 8/2016 | Cole et al. |
| 9,485,494 B1 | 11/2016 | Cole et al. |
| 9,538,160 B1 | 1/2017 | Cole |
| 9,699,437 B2 | 7/2017 | Cole et al. |
| 9,729,850 B2 | 8/2017 | Cole et al. |
| 9,821,920 B2 | 11/2017 | Cole et al. |
| 9,832,449 B2 | 11/2017 | Cole et al. |
| 9,832,450 B2 | 11/2017 | Cole et al. |
| 9,836,845 B2 | 12/2017 | Cole et al. |
| 9,865,055 B2 | 1/2018 | Cole et al. |
| 9,894,350 B2 | 2/2018 | Cole et al. |
| 9,912,965 B2 | 3/2018 | Cole et al. |
| 9,918,136 B2 | 3/2018 | Cole et al. |
| 9,930,318 B2 | 3/2018 | Cole et al. |
| 9,955,147 B2 | 4/2018 | Cole et al. |
| 10,027,944 B2 | 7/2018 | Cole et al. |
| 10,027,948 B2 | 7/2018 | Cole et al. |
| 10,033,995 B2 | 7/2018 | Cole et al. |
| 10,038,889 B2 | 7/2018 | Cole et al. |
| 10,075,701 B2 | 9/2018 | Cole et al. |
| 2008/0267527 A1 | 10/2008 | Berretty |
| 2009/0153577 A1 | 6/2009 | Ghyme et al. |
| 2013/0314410 A1* | 11/2013 | Gravois ............... G06T 19/006 345/420 |
| 2013/0321396 A1 | 12/2013 | Kirk et al. |
| 2014/0118509 A1 | 5/2014 | Kroon |
| 2014/0157342 A1* | 6/2014 | Yahata ........... H04N 21/234309 725/110 |
| 2015/0147046 A1* | 5/2015 | Van Broeck ........... G06T 19/20 386/278 |
| 2015/0172550 A1 | 6/2015 | Bretscher |
| 2015/0341617 A1 | 11/2015 | Cole et al. |
| 2015/0346812 A1 | 12/2015 | Cole et al. |
| 2015/0346832 A1 | 12/2015 | Cole et al. |
| 2016/0065946 A1 | 3/2016 | Cole et al. |
| 2016/0065947 A1 | 3/2016 | Cole et al. |
| 2016/0080728 A1 | 3/2016 | Cole et al. |
| 2016/0212403 A1 | 7/2016 | Cole et al. |
| 2016/0212409 A1 | 7/2016 | Cole et al. |
| 2016/0219262 A1 | 7/2016 | Cole et al. |
| 2016/0219305 A1 | 7/2016 | Cole et al. |
| 2016/0227190 A1 | 8/2016 | Cole et al. |
| 2016/0239978 A1 | 8/2016 | Cole et al. |
| 2016/0241836 A1 | 8/2016 | Cole et al. |
| 2016/0241837 A1 | 8/2016 | Cole et al. |
| 2016/0241838 A1 | 8/2016 | Cole et al. |
| 2016/0241892 A1 | 8/2016 | Cole et al. |
| 2016/0253795 A1 | 9/2016 | Cole et al. |
| 2016/0253809 A1 | 9/2016 | Cole et al. |
| 2016/0253810 A1 | 9/2016 | Cole et al. |
| 2016/0253839 A1 | 9/2016 | Cole et al. |
| 2016/0255326 A1 | 9/2016 | Cole et al. |
| 2016/0255327 A1 | 9/2016 | Cole et al. |
| 2016/0269716 A1 | 9/2016 | Cole et al. |
| 2016/0360180 A1 | 12/2016 | Cole et al. |
| 2016/0373734 A1 | 12/2016 | Cole et al. |
| 2017/0050743 A1 | 2/2017 | Cole et al. |
| 2017/0061600 A1 | 3/2017 | Cole et al. |
| 2017/0094247 A1 | 3/2017 | Cole et al. |
| 2017/0150122 A1 | 5/2017 | Cole |
| 2017/0324945 A1 | 11/2017 | Cole et al. |
| 2017/0359564 A1 | 12/2017 | Cole et al. |
| 2018/0020206 A1 | 1/2018 | Sheridan |
| 2018/0024419 A1 | 1/2018 | Sheridan |
| 2018/0027152 A1 | 1/2018 | Sheridan |
| 2018/0054607 A1 | 2/2018 | Cole et al. |
| 2018/0186466 A1 | 7/2018 | Cole et al. |
| 2018/0189973 A1 | 7/2018 | Cole et al. |
| 2018/0192025 A1 | 7/2018 | Cole et al. |
| 2018/0197309 A1 | 7/2018 | Cole et al. |
| 2018/0220121 A1 | 8/2018 | Cole et al. |
| 2018/0225537 A1 | 8/2018 | Cole et al. |
| 2018/0234676 A1 | 8/2018 | Cole et al. |
| 2018/0249189 A1 | 8/2018 | Cole et al. |
| 2018/0255288 A1 | 9/2018 | Cole et al. |
| 2018/0262745 A1 | 9/2018 | Cole et al. |
| 2018/0279006 A1 | 9/2018 | Cole et al. |
| 2018/0280656 A1 | 10/2018 | Cole et al. |
| 2018/0288403 A1 | 10/2018 | Cole et al. |
| 2018/0324408 A1 | 11/2018 | Cole et al. |

FOREIGN PATENT DOCUMENTS

| | | |
|---|---|---|
| EP | 2302945 A1 | 3/2011 |
| WO | 2012103168 A1 | 8/2012 |
| WO | 2012176109 A1 | 12/2012 |

\* cited by examiner

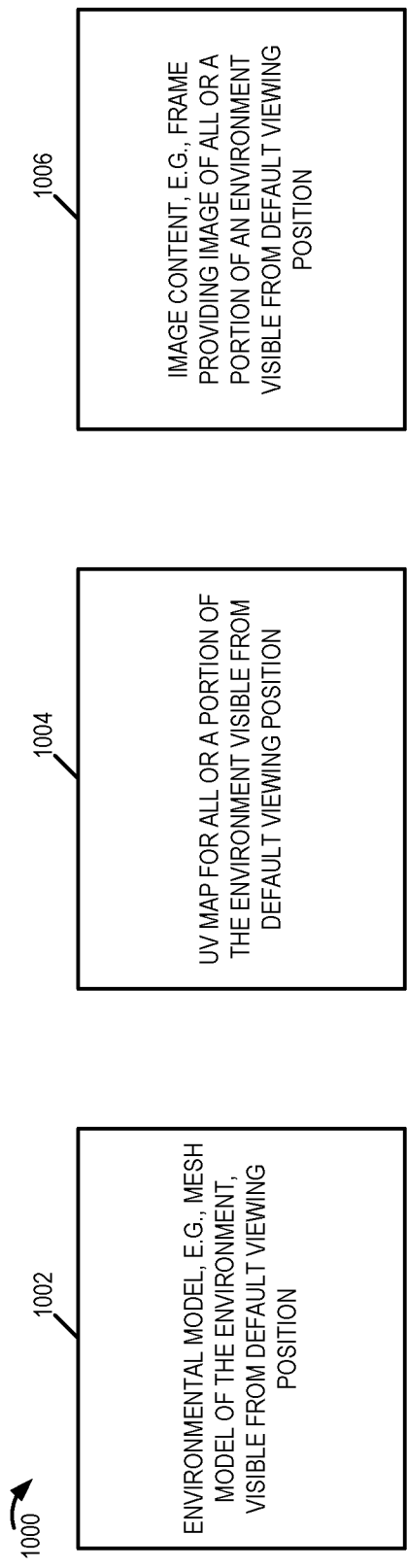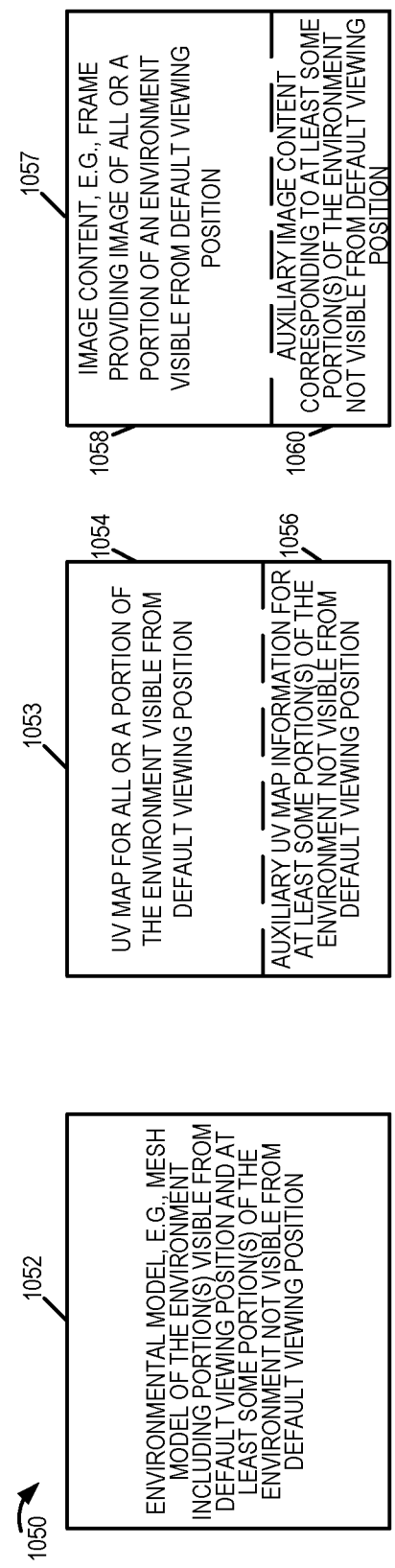

| FIGURE 13A |
| FIGURE 13B |

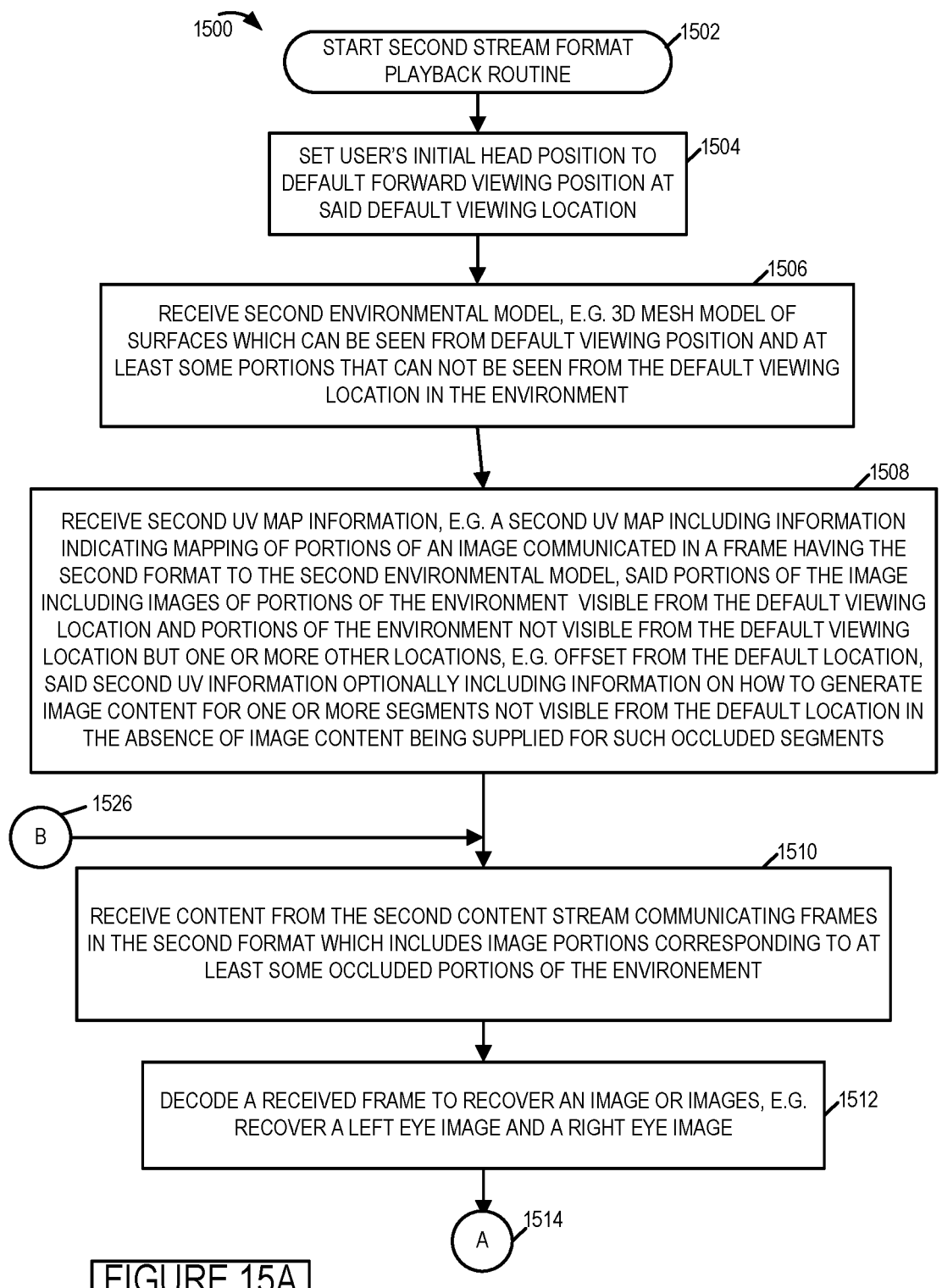

METHODS AND APPARATUS FOR REQUESTING, RECEIVING AND/OR PLAYING BACK CONTENT CORRESPONDING TO AN ENVIRONMENT

RELATED APPLICATIONS

The present application is a continuation application of U.S. patent application Ser. No. 15/058,131 filed Mar. 1, 2016 which claims the benefit of U.S. Provisional Application Ser. No. 62/126,701 filed Mar. 1, 2015, U.S. Provisional Application Ser. No. 62/126,709 filed Mar. 1, 2015, and U.S. Provisional Application Ser. No. 62/127,215 filed Mar. 2, 2015, each of which is hereby expressly incorporated by reference in its entirety.

FIELD

The present invention relates to methods and apparatus for generating, transmitting and/or using image content which maybe communicated in one or more different content stream formats.

BACKGROUND

Content capture methods normally focus on the capture of content from a single location in an environment. Various surfaces maybe obstructed, e.g., occluded from view, from the single image capture location. For example the back of a column may not be visible for the inside of a box may not be visible.

As environmental simulations become more realistic, users of display devices would like to be able to move in the simulated environment. For example if they stand up they may expect to be able to look over the top of a box and see the inside of the box which was not visible from a default viewing location in the environment corresponding to the position from which images were captured in the environment. Similarly if a user changes his head location by leaning to the side the user might expect to be able to peer around a column.

Unfortunately, if images captured from the single location in the environment is the only content provided to the playback device the playback device will be unable to show the previously occluded image content which a user expects to see when the user changes his location in the environment that is being simulated using the images captured from the single location in the environment. Thus, there is a need for capturing, communicating and/or using images of occluded portions of an environment to facilitate more realistic environmental simulations. While there is a need for improvements with regard to transmission as well as playback, all features and embodiments need not address both the transmit side and the playback side and features which provide improvements to either would be useful and beneficial.

From the above it should be appreciated that there is a need for methods and/or apparatus which would allow images of occluded portions of an environment to be captured and at least some portions of the images of the occluded portions of the environment to be provided to a playback device.

While not necessary or critical for all embodiments, it would be useful if one or more methods of transmitting occluded image content along with non-occluded image content to a playback device could be supported in a relatively data efficient manner.

From the above it should also be appreciated that there is a need for methods and/or apparatus which would allow a playback device to receive and/or use images of non-occluded portions of an environment along with at least some image content corresponding to occluded portions of the environment.

SUMMARY

Methods and apparatus for processing captured images and transmitting the images in one or more formats to support playback are described. The image processing and transmission in some embodiments is performed in a manner that facilitates playback and allows for a playback device to provide a user a simulation of being present in the environment where the images were captured. In some but not necessarily all embodiments sufficient content is transmitted to a playback device to allow a user to change his/her position and for the displayed content to reflect, at least partially, the change in the viewers position so that the user can see content that was not visible from a default position in the environment.

Thus, at least some features are directed to methods and apparatus for supporting a range of viewing positions in a simulated environment using a playback device are described. In various embodiments an environment is simulated from a first, e.g., default, viewing location. The users head position, e.g., head orientation and location, is monitored and changes from the default viewing location, e.g., due to a shift in the user's head location, are detected. A user may choose to move, e.g., shift, his head to a new viewing position which is within a range of supported viewing locations relative to the location to which the default viewing position corresponds. Turns of the head left or right and up/down are supported by changing which portions of the environment are displayed to the user with the displayed portions corresponding to the default viewing position but taking into consideration different head angles. While the user's head remains at the default viewing position, image content captured by one or more stereoscopic camera pairs positioned at the default viewing position within the actual environment are rendered and displayed to the user. Image rendering in the context of a default viewing position may, and sometimes does involve displaying images using a 3D model of the environment, a first content stream including frames, e.g., pairs of left and right eye images, corresponding to the default viewing position and a UV map used for rendering frames corresponding to images from the default viewing position content stream onto the 3D model.

While detected head rotations will result in the display of different portions of the content stream corresponding to the default viewing position, a user may alter his/her head position by leaning, e.g., left or right, forward or back and/or standing up or sitting down. Such changes represent a physical shift or offset from the default viewing position, not simply a head rotation, and result in a change in viewing location.

In the case of a physical offset from a default viewing position, a user may expect to see a portion of the environment which was occluded from view from the default viewing position. For example, if there was a support column positioned to the left of the user's default viewing location, by leaning forward and thus by changing the user's viewing position, e.g., location and/or direction of view, relative to the support column the user may expect to be able to see a portion of the environment which was previously occluded from view. The portion of the environment that was occluded from view will normally not be available from the cameras, e.g., one or more pairs of cameras used to capture left and right eye views corresponding to the default viewing position since the column will normally have blocked the capture of such image areas to the cameras used to capture the images corresponding to the default viewing position.

In accordance with various embodiments, additional cameras, beyond those used to capture the images used to generate the content stream for the default viewing area are used and capture portions of the environment occluded from view from the default viewing area. The cameras may be mounted on a camera rig that includes one or more camera pairs used to capture left and right eye views corresponding to the default viewing position. In some such embodiments the cameras used to capture the occluded image areas are of a different type or types than the cameras of the stereoscopic camera pair(s). For example the cameras used to capture the occluded image areas maybe light field cameras or lower resolution cameras included in the camera rig at different positions than the camera pairs used to capture left and right eye positions images for stereoscopic playback. In some embodiments the images captured by the light field camera or cameras is used to provide environmental depth information allowing for real time mapping of the environment and detection of changes in the environment during an event while also providing images that can be used to supplement the images captured by the stereoscopic camera pairs in the event a user changes his/her head position from the default viewing position.

While in some embodiments the image data corresponding to environmental portions occluded from view from the default viewing position are captured by one or more cameras located at various locations on the same camera rig on which the camera pairs used to capture the stereoscopic images corresponding to the default viewing position, in other embodiments the image portions are captured by cameras at other locations within the environment of interest or the images are captured at times different from the time at which the images provided as corresponding to the default viewing position are captured. For example, the images corresponding to the occluded image portions may be captured by one or more cameras located to the left or right of the camera rig used to capture images corresponding to the default viewing position. Alternatively, if it known that a temporary impediment to viewing from the default viewing position during an event, am image may be captured prior to placement of the temporary impediment, e.g., banner or equipment storage rack added for the event, and then used as image data to support viewing of the occlude image area. While in various some embodiments the image data corresponding to the occluded image area may not correspond to a different time period than the image data corresponding to the default viewing position, the occluded image area is not likely to convey important scene information and a user in many cases will not realize the image data for the normally occlude image area is not from the same point in time as other areas of the displayed 3D scene.

In various embodiments occluded image content, e.g., image content not visible from the default viewing location, is communicated to a playback device in addition to non-occluded image content.

Various methods for communicating the occluded and non-occluded image content to a playback device are supported. An individual embodiment need not support multiple ways of transmitting and/or receiving occluded and non-occluded image content but in some embodiments the content server and playback device support multiple method of communicating and receiving such information.

In some embodiments occluded and non-occluded image content is packed together into frames which are transmitted to a playback device.

In another embodiment occluded image content is communicated in a different content stream, e.g., a primary content stream, which is separate from an auxiliary content stream which is used to communicate occluded image content. The primary and auxiliary content streams maybe and often are multiplexed into a program stream used to communicate content corresponding to a program, e.g., sporting event, concert or other event that may occur in an environment such as a stadium, concert hall, etc. which can be modeled.

In order to display images corresponding to normally occluded image areas, in some embodiments a supplemental image content stream is provided in some but not all embodiments to a playback device to provide image content corresponding to image areas occluded from view from the default viewing position. Such supplemental content may be in the form of a frame including content corresponding to one, but in many cases, a plurality of normally occluded areas of the environment. In addition to the images corresponding to the occluded image portions, an occluded image portion UV map is provided in at least some embodiments with information indicating how segments of a frame providing occluded image data are to be mapped to the 3D model of the environment. Which segments of an occluded image portion from are used may, and in some embodiments do, depend on the change to the default viewing position made by a user. Changes in the default viewing position up to a predetermined amount may be supported. For example moving the viewing position up to a foot or more left or right may be supported though the use of the occluded image portions provided by the supplemental image data. The image data corresponding to occluded image portions can be, and in some embodiments is, sent in a frame at the same or a lower frame rate than image data corresponding to the default viewing position. In some embodiments changes in captured images corresponding to normally occluded portions of the environment are detected and a new supplemental frame is sent in response to the detected change to provide updated occluded area image content to be displayed by the playback device if needed. Occluded image portions may and sometimes do have the same resolution of images of the environment corresponding to the default viewing position.

However, in other embodiments the images corresponding to normally occluded portions of the environment may be of lower resolution than those captured by the camera pairs used to capture images corresponding to the default viewing position. This is often the case when images captured by one or more cameras which use a light field array, such as Lytro cameras, are used to capture images of normally occluded image portions.

While an image processing and/or transmission system may support one or more methods of communicating non-occluded image content and/or occluded image content, all transmission systems need not support all the methods described herein.

A playback device in various embodiments is capable of receiving and/or using non-occluded image content and occluded image content. The playback device may receive such content from the system described herein which serves such content.

Various features are directed to a playback device and/or a method of operation a playback device.

In one embodiment a playback device receives frames including both occluded and non-occluded image portions. In another embodiment a playback device receives frames, e.g., primary frames, including image data corresponding to the default viewing position and frames, e.g., auxiliary frames, providing image data corresponding to normally occluded portions of the environment were are not viewable from the default viewing position in the environment. The two different ways in which occluded content can be received correspond to different content stream formats.

In response to detecting a user change from the default viewing position to a new viewing position the playback device generates and display an image including a first image portion generated from received content corresponding to the default viewing position and at least a second image portion generated from received image content corresponding to a normally occluded image portion.

The content corresponding to the normally occluded image portion is received in some embodiments in a frame which includes both non-occluded and occluded image portions. In other embodiments occluded image data is received in an auxiliary which provides images of environmental areas normally occluded from view from the default viewing position. The selection of which portion or portions of the normally occluded images which is displayed is determined based on a detected offset of the user from the default viewing position.

By supping occluded and non-occluded image content multiple viewing positions, including some corresponding to different locations in the environment, can be supported during content playback.

While numerous features and embodiments have been described in the summary it should be appreciated that not all embodiments require or involve use of all of the above described features and that some embodiments may include one or a few of the above described features and/or support one of the above described methods of communication and/or using occluded image portions. Numerous additional features, embodiments and benefits are discussed in the detailed description which follows.

BRIEF DESCRIPTION OF THE DRAWINGS

FIG. 7 comprises the combination of FIGS. 7A, 7B, 7C and 7D.

FIG. 9 illustrates a first stream format which is used to serve, e.g., stream or download content which does not include occluded image portions.

FIG. 10 illustrates a second stream format which is used to serve, e.g., stream or download content, which includes non-occluded image portions and occluded image portions in a frame.

FIG. 15A is a first part of FIG. 15 which illustrates the steps of an exemplary second stream format playback routine which is implemented by the playback device as part of performing the method of FIG. 13.

FIG. 15 comprises the combination of FIGS. 15A and 15B.

FIG. 16 comprises the combination of FIGS. 16A, 16B, 16C and 16D.

DETAILED DESCRIPTION

Various features relate to the field of panoramic stereoscopic imagery and various imaging devices and/or apparatus, e.g., camera rigs including cameras, discussed below are well suited for capturing high-definition, high dynamic range, high frame rate stereoscopic, 360-degree panoramic video using a minimal number of cameras in an apparatus of small size and at reasonable cost while satisfying weight, and power requirements for a wide range of applications.

Stereoscopic, 360-degree panoramic video content is increasingly in demand for use in virtual reality displays. In order to produce stereoscopic, 360-degree panoramic video content with 4K or greater of resolution, which is important for final image clarity, high dynamic range, which is important for recording low-light content, and high frame rates, which are important for recording detail in fast moving content (such as sports), an array of professional grade, large-sensor, cinematic cameras or other cameras of suitable quality are often needed.

In order for the camera array to be useful for capturing 360-degree, stereoscopic content for viewing in a stereoscopic virtual reality display, the camera array should acquire the content such that the results approximate what the viewer would have seen if his head were co-located with the camera. Specifically, the pairs of stereoscopic cameras should be configured such that their inter-axial separation is within an acceptable delta from the accepted human-model average of 63 mm. Additionally, the distance from the panoramic array's center point to the entrance pupil of a camera lens (aka nodal offset) should be configured such that it is within an acceptable delta from the accepted human-model average of 101 mm.

In order for the camera array to be used to capture events and spectator sports where it should be compact and non-obtrusive, it should be constructed with a relatively small physical footprint allowing it to be deployed in a wide variety of locations and shipped in a reasonable sized container when shipping is required.

The camera array should also be designed such that the minimum imaging distance of the array to be small, e.g., as small as possible, which minimizes the "dead zone" where scene elements are not captured because they fall outside of the field of view of adjacent cameras.

It would be advantageous if the camera array can be calibrated for optical alignment by positioning calibration targets where the highest optical distortion is prone to occur (where lens angles of view intersect AND the maximum distortion of the lenses occur). To facilitate the most efficacious calibration target positioning, target locations should, and in some embodiments are, determined formulaically from the rig design.

Figure 1:
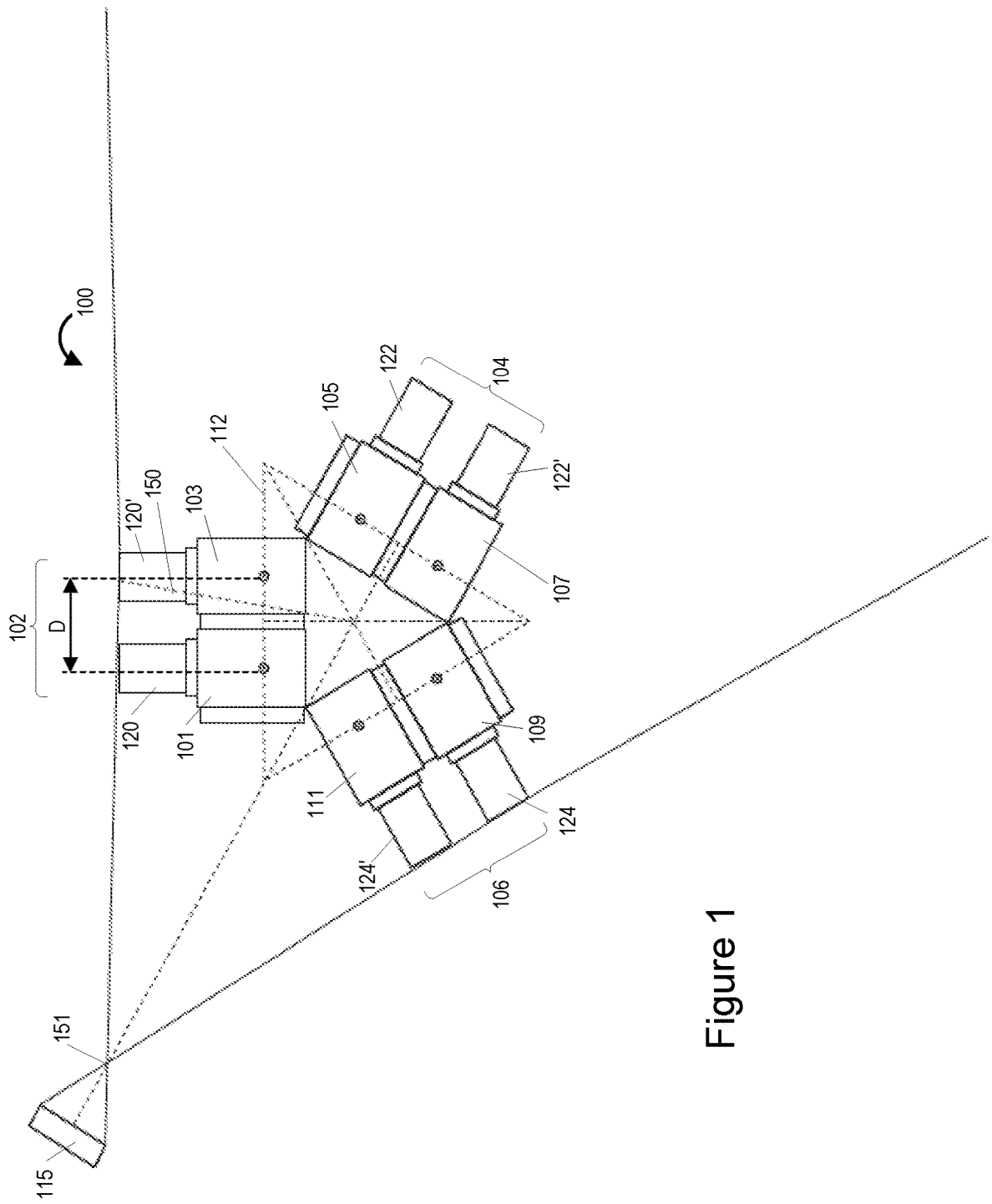
FIG. 1 illustrates a camera rig implemented in accordance with one embodiment along with a calibration target which may be used to for calibrating the camera rig.
Figure 4:
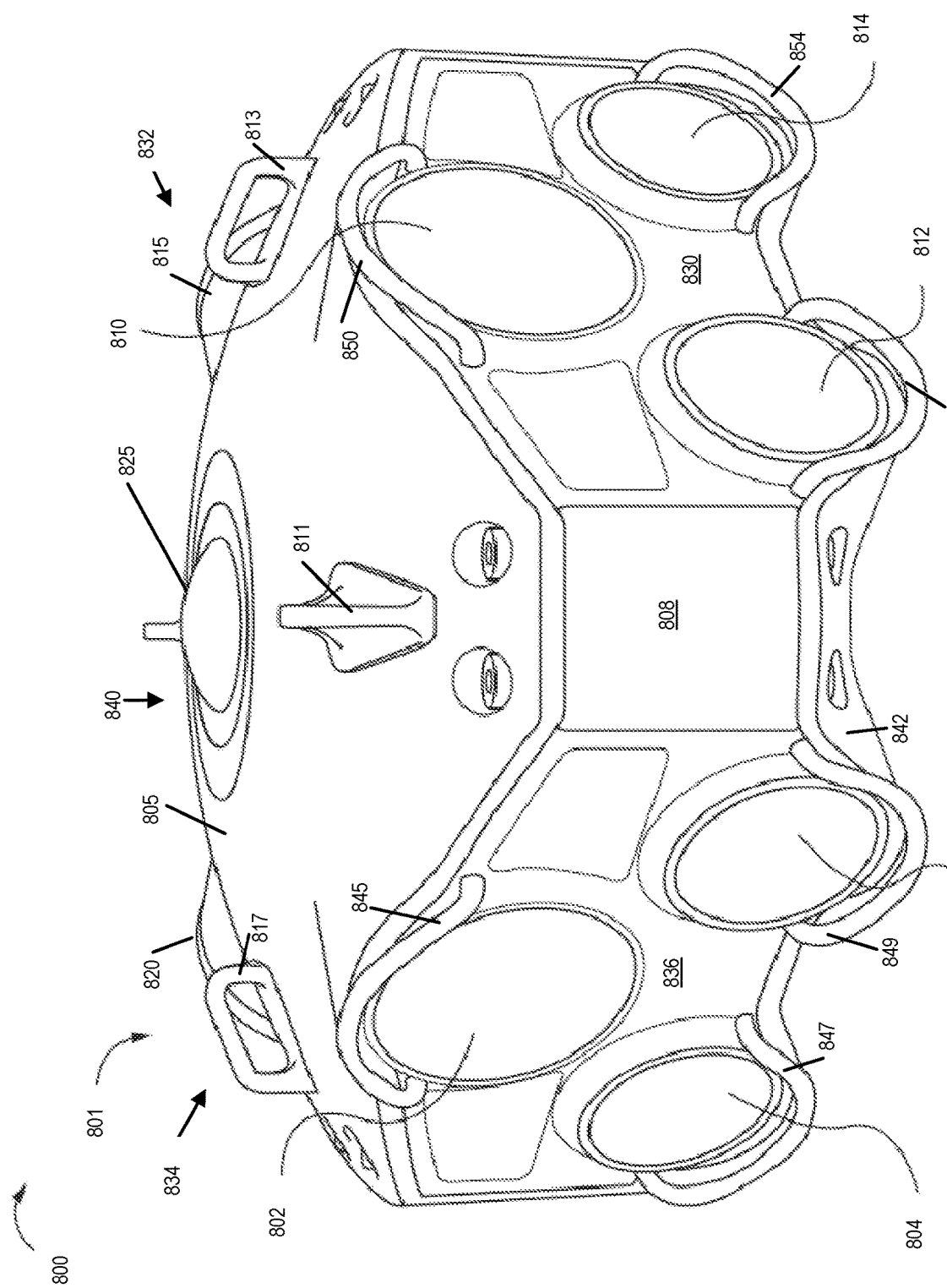
FIG. 4 illustrates another exemplary camera rig implemented in accordance with some exemplary embodiments.
Figure 5:
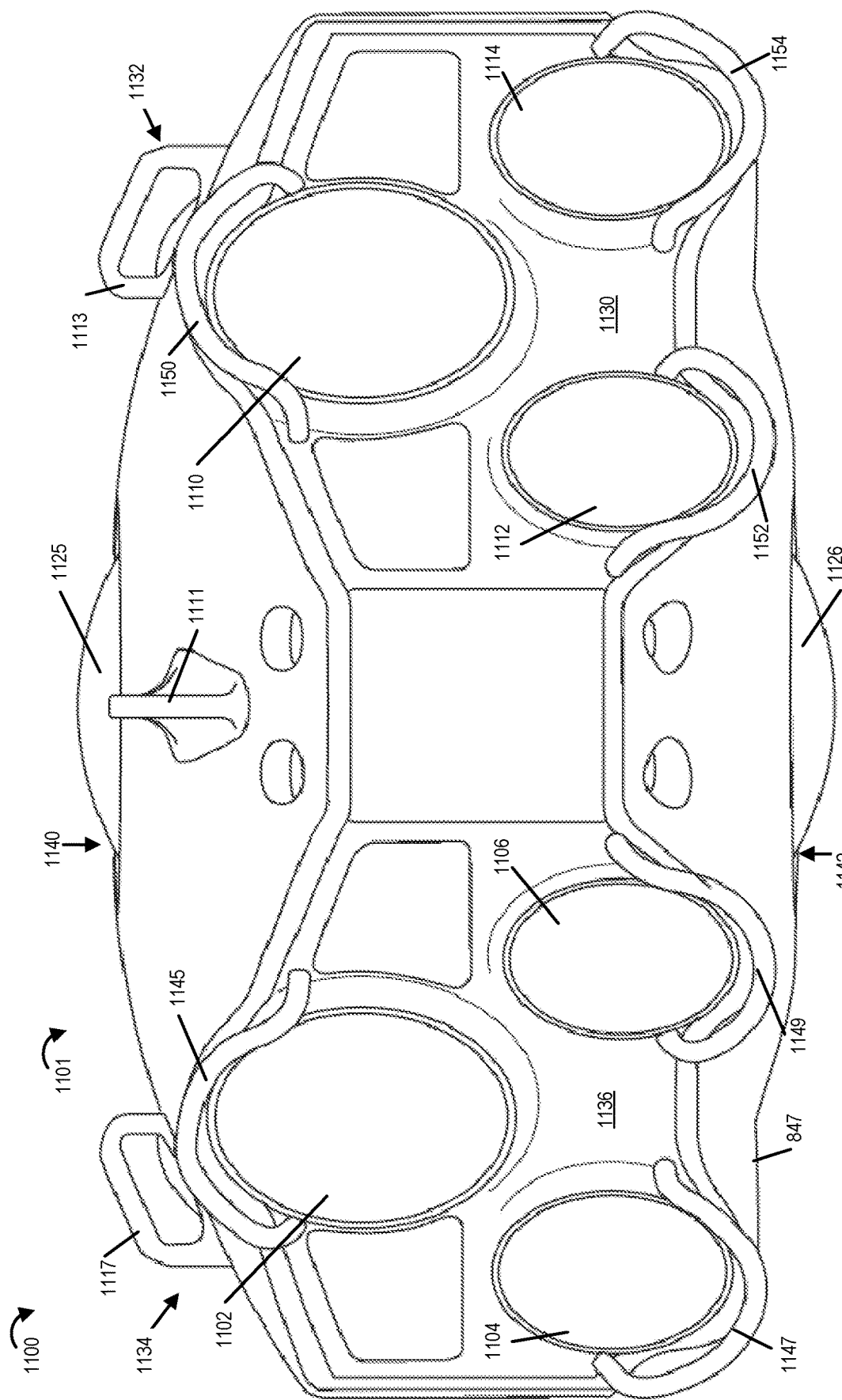
FIG. 5 illustrates yet another exemplary camera rig implemented in accordance with some exemplary embodiments.

FIG. 1 shows an exemplary camera configuration 100 used in some embodiments. The support structure shown in FIGS. 4 and 5 is not shown in FIG. 1 to allow for better appreciation of the camera pair arrangement shown used in some embodiments. While in some embodiments three camera pairs are used such as in the FIG. 1 example in some but not all embodiments a camera array, e.g., the camera positions of the rig, is populated with only 2 of the 6-total cameras which may be used to support simultaneous 360-degree stereoscopic video. When the camera rig or assembly is configured with less than all 6 cameras which can be mounted in the rig, the rig is still capable of capturing the high-value, foreground 180-degree scene elements in real-time while manually capturing static images of the lower-value, background 180-degree scene elements, e.g., by rotating the rig when the foreground images are not being captured. For example, in some embodiments when a 2-camera array is used to capture a football game with the field of play at the 0-degree position relative to the cameras, the array is manually rotated around the nodal point into the 120-degree and 240-degree positions. This allows the action on the field of a sports game or match, e.g., foreground, to be captured in real time and the sidelines and bleachers, e.g., background areas, to be captured as stereoscopic static images to be used to generate a hybridized panorama including real time stereo video for the front portion and static images for the left and right rear portions. In this manner, the rig can be used to capture a 360 degree view with some portions of the 360 view being captured at different points in time with the camera rig being rotated around its nodal axis, e.g., vertical center point between the different points in time when the different view of the 360 scene area are captured. Alternatively, single cameras may be mounted in the second and third camera pair mounting positions and mono (non-stereoscopic) image content captured for those areas.

In other cases where camera cost is not an issue, more than two cameras can be mounted at each position in the rig with the rig holding up to 6 cameras as in the FIG. 1 example. In this manner, cost effect camera deployment can be achieved depending on the performance to be captured and, the need or ability of the user to transport a large number, e.g., 6 cameras, or the user's ability to transport fewer than 6 cameras, e.g., 2 cameras. In some embodiments an environmental depth map is generated from the images captured by the cameras in the camera rig 100.

FIG. 1 depicts a six (6) camera assembly 100 also sometimes referred to as a rig or camera array, along with a calibration target 115. The camera rig 100 illustrated in FIG. 1 includes a support structure (shown in FIGS. 4 and 5) which holds the cameras in the indicated positions, 3 pairs 102, 104, 106 of stereoscopic cameras (101, 103), (105, 107), (109, 111) for a total of 6 cameras. The support structure includes a base 720 also referred to herein as a mounting plate (see element 720 shown in FIG. 4) which supports the cameras and to which plates on which the cameras are mounted can be secured. The support structure maybe made of plastic, metal or a composite material such as graphite or fiberglass, and is represented by the lines forming the triangle which is also used to show the spacing and relationship between the cameras. The center point at which the doted lines intersect represents the center nodal point around which the camera pairs 102, 104, 106 can be rotated in some but not necessarily all embodiments. The center nodal point corresponds in some embodiments to a steel rod or threaded center mount, e.g., of a tripod base, around which a camera support frame represented by the triangular lines can be rotated. The support frame may be a plastic housing in which the cameras are mounted or tripod structure as shown in FIGS. 4 and 5.

In FIG. 1, each pair of cameras 102, 104, 106 corresponds to a different camera pair position. The first camera pair 102 corresponds to a 0 degree forward to front facing position and normally meant to cover the foreground where the main action occurs. This position normally corresponds to the main area of interest, e.g., a field upon which a sports game is being played, a stage, or some other area where the main action/performance is likely to occur. The second camera pair 104 corresponds to a 120 degree camera position (approximately 120 degree from the front facing) degree position) and is used to capture a right rear viewing area. The third camera pair 106 corresponds to a 240 degree viewing position (approximately 240 degree from the front facing) and a left rear viewing area. Note that the three camera positions are 120 degrees apart.

Each camera viewing position includes one camera pair in the FIG. 1 embodiment, with each camera pair including a left camera and a right camera which are used to capture images. The left camera captures what are sometimes referred to as a left eye images and the right camera captures what is sometime referred to as right eye images. The images may be part of a view sequence or still image captured at one or more times. Normally at least the front camera position corresponding to camera pair 102 will be populated with high quality video cameras. The other camera positions may be populated with high quality video cameras, lower quality video cameras or a single camera used to capture still or mono images. In some embodiments the second and third camera embodiments are left unpopulated and the support plate on which the cameras are mounted is rotated allowing the first camera pair 102 to capture images corresponding to all three camera positions but at different times. In some such embodiments left and right rear images are captured and stored and then video of the forward camera position is captured during an event. The captured images may be encoded and streamed in real time, e.g. while an event is still ongoing, to one or more playback devices.

The first camera pair 102 shown in FIG. 1 includes a left camera 101 and a right camera 103. The left camera has a first lens assembly 120 secured to the first camera and the right camera 103 has a second lens assembly secured to the right camera 103. The lens assemblies 120, 120' include lenses which allow for a wide angle field of view to be captured. In some embodiments each lens assembly 120, 120' includes a fish eye lens. Thus each of the cameras 102, 103 can capture a 180 degree field of view or approximately 180 degrees. In some embodiments less than 180 degrees is captured but there is still at least some overlap in the images captured from adjacent camera pairs in some embodiments. In the FIG. 1 embodiment a camera pair is located at each of the first (0 degree), second (120 degree), and third (240 degree) camera mounting positions with each pair capturing at least 120 degrees or more of the environment but in many cases with each camera pair capturing 180 degrees or approximately 180 degrees of the environment.

Second and third camera pairs 104, 106 are the same or similar to the first camera pair 102 but located at 120 and 240 degree camera mounting positions with respect to the front 0 degree position. The second camera pair 104 includes a left camera 105 and left lens assembly 122 and a right camera 107 and right camera lens assembly 122'. The third camera pair 106 includes a left camera 109 and left lens assembly 124 and a right camera 111 and right camera lens assembly 124'.

In FIG. 1, D represents the inter-axial distance of the first 102 stereoscopic pair of cameras 101, 103. In the FIG. 1 example D is 117 mm which is the same or similar to the distance between pupils of the left and right eyes of an average human being. Dashed line 150 in FIG. 1 depicts the distance from the panoramic array's center point to the entrance pupil of the right camera lens 120' (aka nodal offset). In one embodiment corresponding to the FIG. 1 which example the distance indicated by reference number 150 is 315 mm but other distances are possible.

In one particular embodiment the footprint of the camera rig 100 is relatively small. Such a small size allows the camera rig to be placed in an audience, e.g., at a seating position where a fan or attendance might normally be located or positioned. Thus in some embodiments the camera rig is placed in an audience area allowing a viewer to have a sense of being a member of the audience where such an effect is desired. The footprint in some embodiments corresponds to the size of the base to which the support structure including, in some embodiments a center support rod is mounted or support tower is located. As should be appreciated the camera rigs in some embodiments can rotate around the center point of the base which corresponds to the center point between the 3 pairs of cameras. In other embodiments the cameras are fixed and do not rotate around the center of the camera array.

The camera rig 100 is capable of capturing relatively close as well as distinct object. In one particular embodiment the minimum imaging distance of the camera array is 649 mm but other distances are possible and this distance is in no way critical.

The distance from the center of the camera assembly to the intersection point 151 of the views of the first and third camera parts represents an exemplary calibration distance which can be used for calibrating images captured by the first and second camera pairs. In one particular exemplary embodiment, an optimal calibration distance, where lens angles of view intersect and the maximum distortion of the lenses occur is 743 mm. Note that target 115 may be placed at a known distance from the camera pairs located at or slightly beyond the area of maximum distortion. The calibration target include a known fixed calibration pattern. The calibration target can be and is used for calibrating the size of images captured by cameras of the camera pairs. Such calibration is possible since the size and position of the calibration target is known relative to the cameras capturing the image of the calibration target 115.

Figure 2:
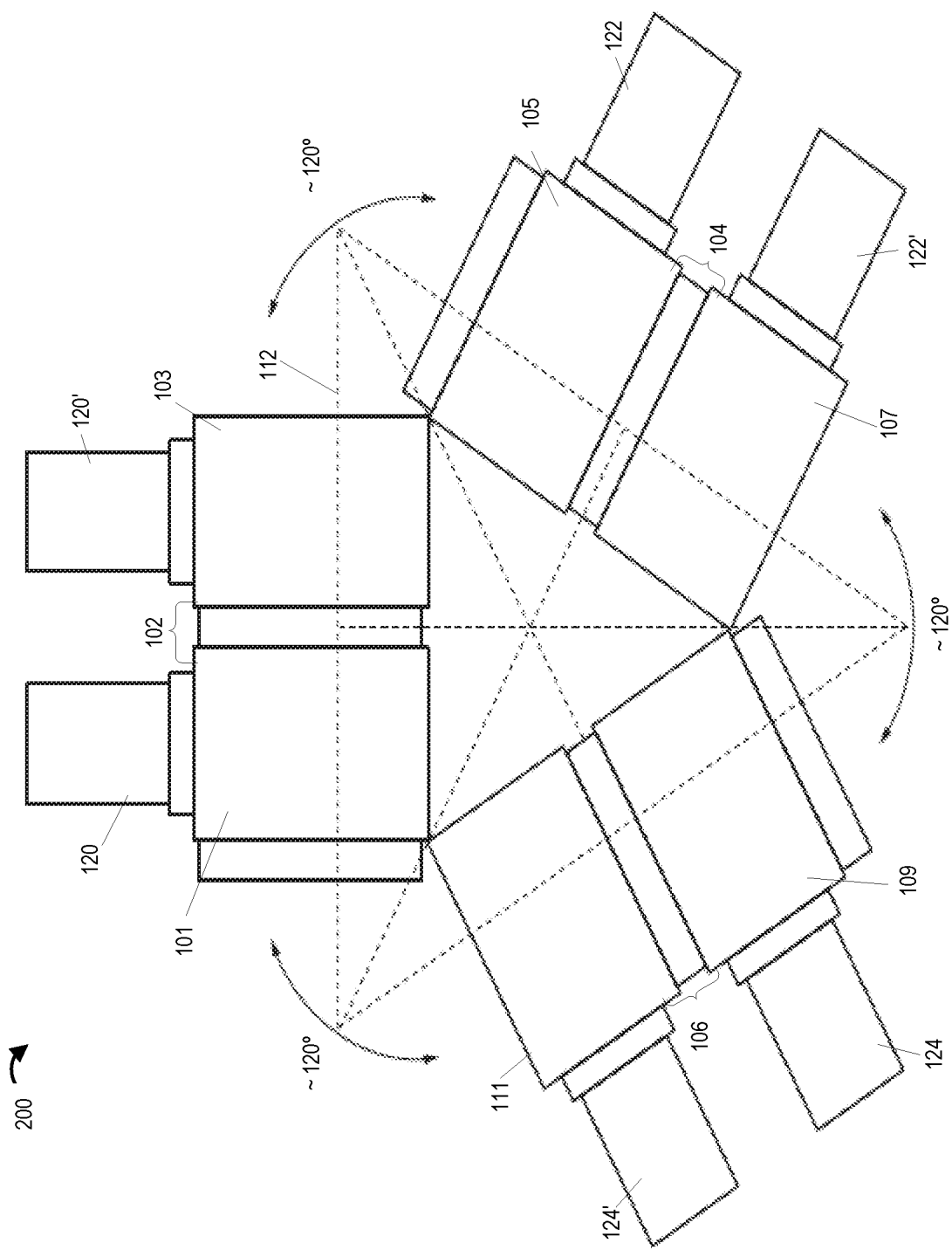
FIG. 2 illustrates the camera rig with three pairs of cameras, e.g., 3 pairs of cameras capturing stereoscopic image data, mounted in the camera rig.

FIG. 2 is a diagram 200 of the camera array 100 shown in FIG. 1 in greater detail. While the camera rig 100 is again shown with 6 cameras, in some embodiment the camera rig 100 is populated with only two cameras, e.g., camera pair 102 including cameras 101 and 103. As shown there is a 120 degree separation between each of the camera pair mounting positions. Consider for example if the center between each camera pair corresponds to the direction of the camera mounting position. In such a case the first camera mounting position corresponds to 0 degrees, the second camera mounting position corresponds to 120 degrees and the third camera mounting position corresponding to 240 degrees. Thus each camera mounting position is separated by 120 degrees. This can be seen if the center line extending out through the center of each camera pair 102, 104, 106 was extended and the angle between the lines measured.

In the FIG. 2 example, the pair 102, 104, 106 of cameras can, and in some embodiments do, rotate around the center point of the camera rig allowing for different views to be captured at different times without having to alter the position of the camera rig base. That is, the cameras can be rotated around the center support of the rig and allowed to capture different scenes at different times allowing for a 360 degree scene capture using the rig shown in FIG. 2 while it is populated with only two cameras. Such a configuration is particularly desirable from a cost perspective given the cost of stereoscopic cameras and is well suited for many applications where it may be desirable to show a background captured from the same point of view but at a different time than the time at which the front scene including the main action during a sporting event or other event may occur. Consider for example that during the event objects may be placed behind the camera that it would be preferable not to show during the main event. In such a scenario the rear images may be, and sometimes are, captured prior to the main event and made available along with the real time captured images of the main event to provide a 360 degree set of image data.

Various features also relate to the fact that the camera support structure and camera configuration can, and in various embodiments does, maintain a nodal offset distance in a range from 75 mm to 350 mm. In one particular embodiment, a nodal offset distance of 315 mm is maintained.

The support structure also maintains, in some embodiments an overall area (aka footprint) in a range from 400 mm$^2$ to 700 mm$^2$. In one particular embodiment, an overall area (aka footprint) of 640 mm$^2$ is maintained. The support structure also maintains a minimal imaging distance in a range from 400 mm to 700 mm. In one particular embodiment, a minimal imaging distance of 649 mm is maintained. In one particular embodiment the optimal calibration distance of the array is where lens angles of view intersect AND the maximum distortion of the lenses occur. In one particular exemplary embodiment this distance is 743 mm.

As discussed above, in various embodiments the camera array, e.g., rig, is populated with only 2 of the 6-total cameras which would normally be required for simultaneous 360-degree stereoscopic video for the purpose of capturing the high-value, foreground 180-degree scene elements in real-time while manually capturing static images of the lower-value, background 180-degree scene elements.

Figure 3:
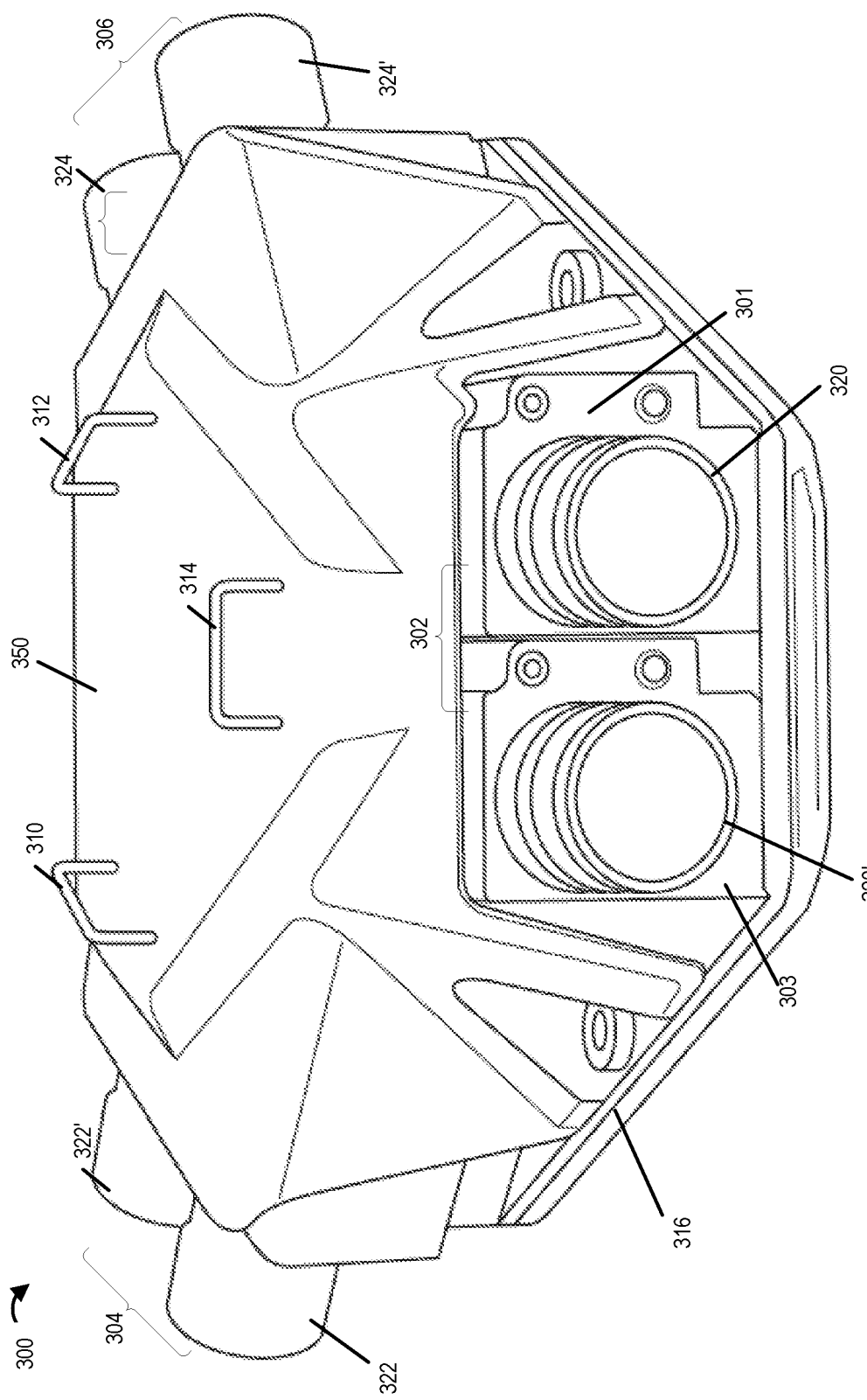
FIG. 3 illustrates an exemplary camera rig with an exemplary protective cover implemented in accordance with some exemplary embodiments.

FIG. 3 shows an exemplary camera rig 300 which is the same or similar to the rig of FIGS. 1 and 2 but without a support tripod and with a plastic cover 350 placed over the camera pairs. The plastic cover 350 includes handles 310, 312, 314 which can be used to lift or rotate, e.g., when placed on a tripod, the camera rig 300. The camera rig 300 is shown with three pairs of cameras, a first camera pair 302 including cameras 301, 303 with lens assemblies 320, 320', a second camera pair 304 including cameras with lens assemblies 322, 322', and a third camera pair 306 including cameras with lens assemblies 324, 324'. The plastic cover 350 is secured to the mounting platform 316, which may be implemented as a flat plate with one or more slots and screw holes. The plastic cover 350 is secured to the base with nuts or screws 330, 331 which can be removed or tightened by hand to allow for easy removal or attachment of the cover 350 and easy access to the cameras of the camera pairs. While six cameras are included in the rig 300 shown in FIG. 3, a single camera pair may be included and/or a single camera pair with one or more individual cameras located at the other camera mounting positions where the camera pairs are not mounted may be used.

FIG. 4 illustrates a drawing 800 showing one view of an exemplary camera rig 801 implemented in accordance with some exemplary embodiments. An array of cameras is included in the camera rig 801 some of which are stereoscopic cameras. In the illustrated view of the camera rig 801 in drawing 800, only a portion of the camera rig 801 is visible while a similar arrangement of cameras exist on the other sides (also referred to as different faces) of the camera rig 801 which cannot be fully seen in the drawing 800. In some but not all embodiments, the camera rig 801 includes 13 cameras secured by a top plastic body or cover 805 and a bottom base cover 842. In some embodiments 8 of these 13 cameras are stereoscopic cameras such as the cameras 804, 806, 812 and 814 in pairs while many other cameras are light field cameras such as cameras 802 and 810 which are visible in the drawing 800 and cameras 815 and 820 which are not fully but partially visible in drawing 800. Various other combinations of the cameras are possible. In some embodiments a camera 825 is also mounted on the top portion of the camera rig 801, e.g., top face 840 of camera rig 801, to capture images of a top hemisphere of an environment of interest. The plastic body/cover 805 includes handles 811, 813, 817 which can be used to lift or rotate the camera rig 801.

In some embodiments the camera rig 801 includes one light field camera (e.g., camera 802) and two other cameras (e.g., cameras 804, 806) forming a stereoscopic camera pair on each longer side of the camera rig 801. In some such embodiments there are four such longer sides (also referred to as the four side faces 830, 832, 834 and 836) with each longer side having one light field camera and one stereoscopic camera pair, e.g., light field camera 802 and stereoscopic camera pair 804, 806 on one longer side 836 to the left while another light field camera 810 and stereoscopic camera pair 812, 814 on the other longer side 830 to the right can be seen in drawing 800. While the other two side faces are not fully shown in drawing 800, they are shown in more detail in FIG. 8. In some embodiments at least some of the cameras, e.g., stereoscopic cameras and the light field cameras, in the camera rig 801 use a fish eye lens. In various embodiments each of the cameras in the camera rig 801 is protected by a corresponding lens/camera guard to protect the camera and/or lens against a physical impact and/or damage that may be caused by an object. For example cameras 802, 804 and 806 are protected by guards 845, 847 and 849 respectively. Similarly cameras 810, 812 and 814 are protected by guards 850, 852 and 854 respectively.

In addition to the stereoscopic camera pair and the light field camera on each of the four side faces 830, 832, 834 and 836, in some embodiments the camera rig 801 further includes a camera 825 facing in the upward vertical direction, e.g., towards the sky or another top ceiling surface in the case of a closed environment, on the top face 840 of the camera rig 801. In some such embodiments the camera 825 on the top face of the camera rig 801 is a light field camera. While not shown in drawing 800, in some other embodiments the top face 840 of the camera rig 801 also includes, in addition to the camera 825, another stereoscopic camera pair for capturing left and right eye images. While in normal circumstances the top hemisphere (also referred to as the sky portion) of a 360 degree environment, e.g., stadium, theater, concert hall etc., captured by the camera 825 may not include action and/or remain static in some cases it may be important or desirable to capture the sky portion at the same rate as other environmental portions are being captured by other cameras on the rig 801.

While one exemplary camera array arrangement is shown and discussed above with regard to camera rig 801, in some other implementations instead of just a single light field camera (e.g., such as cameras 802 and 810) arranged on top of a pair of stereoscopic cameras (e.g., cameras 804, 806 and 812, 814) on four faces 830, 832, 834, 836 of the camera rig 801, the camera rig 801 includes an array of light field cameras arranged with stereoscopic camera pair. For example in some embodiments there are 3 light field cameras arranged on top of a stereoscopic camera pair on each of the longer sides of the camera rig 801. In another embodiment there are 6 light field cameras arranged on top of stereoscopic camera pair on each of the longer sides of the camera rig 801, e.g., with two rows of 3 light field cameras arranged on top of the stereoscopic camera pair. Moreover in another variation a camera rig of the type shown in drawing 800 may also be implemented such that instead of four faces 830, 832, 834, 836 with the cameras pointed in the horizontal direction, there are 3 faces of the camera rig with cameras pointing in the horizontal direction.

In some embodiments the camera rig 801 may be mounted on a support structure such that it can be rotated around a vertical axis. In various embodiments the camera rig 801 may be deployed in an environment of interest, e.g., such as a stadium, auditorium, or another place where an event to be captured is taking place. In some embodiments the light field cameras of the camera rig 801 are used to capture images of the environment of interest, e.g., a 360 degree scene area of interest, and generate depth maps which can be used in simulating a 3D environment and displaying stereoscopic imaging content.

FIG. 5 illustrates a drawing 1100 showing a view of yet another exemplary camera rig 1101 implemented in accordance with some exemplary embodiments. The exemplary camera rig 1101 is similar to the camera rig 801 in most and many aspects and includes the same or similar configuration of cameras as discussed with regard to camera rig 801 above. The camera rig 1101 includes four side faces 1130, 1132, 1134, 1136 and a top face 1140 similar to camera rig 801. Each of the four side faces 1130, 1132, 1134, 1136 of the camera rig 1101 includes an array of cameras including a light field camera and a pair of stereoscopic camera pair while the top face 1140 of camera rig includes at least one camera device 1125 similar to what has been shown and discussed with regard to camera rig 801. However the camera rig 1101 further includes, in addition to the camera arrays on each of the five faces 1130, 1132, 1134, 1136 and 1140, a sixth bottom face 1142 including at least one camera 1126 facing vertically downward, e.g., towards the ground. In some such embodiments the bottom surface camera 1126 facing vertically downwards and the top face camera 1125 facing vertically upwards are light field cameras. In some embodiments each of the cameras 1125 and 1126 are part of a corresponding stereoscopic camera pair on the top and bottom faces 1140, 1142 of the camera rig 1101.

While the stereoscopic cameras of the camera rigs 801 and 1101 are used to capture stereoscopic imaging content, e.g., during an event, the use of light field cameras allows for scanning the scene area of interest and generate depth maps of various portions of the scene area captured by the light field cameras (e.g., from the captured images corresponding to these portions of the scene of interest). In some embodiments the depth maps of various portions of the scene area may be combined to generate a composite depth map of the scene area. Such depth maps and/or composite depth map may, and in some embodiments are, provided to a playback device for use in displaying stereoscopic imaging content and simulating a 3D environment which can be experienced by the viewers.

While the stereoscopic cameras of the camera rigs discussed above are used to capture stereoscopic imaging content, e.g., during an event, the use of light field cameras allows for scanning the scene area of interest and generate depth maps of various portions of the scene area captured by the light field cameras (from the captured images corresponding to these portions of the scene of interest). In some embodiments the depth maps of various portions of the scene area may be combined to generate a composite depth map of the scene area. Such depth maps and/or composite depth map may, and in some embodiments are, provided to a playback device for use in displaying stereoscopic imaging content and simulating a 3D environment which can be experienced by the viewers.

The use of light field camera on combination with the stereoscopic cameras allows for environmental measurements and generation the environmental depth maps in real time, e.g., during an event being shot, thus obviating the need for deployment of environmental measurements to be performed offline ahead in time prior to the start of an event, e.g., a football game.

While the depth map generated from each image corresponds to a portion of the environment to be mapped, in some embodiments the depth maps generated from individual images are processed, e.g., stitched together, to form a composite map of the complete environment scanned using the light field cameras. Thus by using the light field cameras a relatively complete environmental map can be, and in some embodiments is generated.

In the case of light field cameras, an array of micro-lenses captures enough information that one can refocus images after acquisition. It is also possible to shift, after image capture, one's viewpoint within the sub-apertures of the main lens, effectively obtaining multiple views. In the case of a light field camera, depth cues from both defocus and correspondence are available simultaneously in a single capture. This can be useful when attempting to fill in occluded information/scene portions not captured by the stereoscopic cameras.

The depth maps generated from the light field camera outputs will be current and is likely to accurately measure changes in a stadium or other environment of interest for a particular event, e.g., a concert or game to be captured by a stereoscopic camera. In addition, by measuring the environment from the same location or near the location at which the stereoscopic camera are mounted, the environmental map, at least in some embodiments, accurately reflects the environment as it is likely to be perceived from the perspective of the stereoscopic cameras that are used to capture the event.

In some embodiments images captured by the light field cameras can be processed and used to fill in for portions of the environment which are not captured by a stereoscopic camera pair, e.g., because the position and/or field of view of the stereoscopic camera pair may be slightly different from that of the light field camera and/or due to an obstruction of view from the stereoscopic cameras. For example, when the light field camera is facing rearward relative to the position of the stereoscopic pair it may capture a rear facing view not visible to a forward facing stereoscopic camera pair. In some embodiments output of the light field camera is provided to a playback device separately or along with image data captured by the stereoscopic camera pairs. The playback device can use all or portions of the images captured by the light field camera when display of a scene area not sufficiently captured by the stereoscopic camera pairs is to be displayed. In addition a portion of an image captured by the light field camera may be used to fill in a portion of the a stereoscopic image that was occluded from view from the position of the stereoscopic camera pair but which a user expects to be able to see when he or she shifts his or her head to the left or right relative to the default viewing position corresponding to the location of the stereoscopic camera pair. For example, if a user leans to the left or right in an attempt to peer around a column obstructing his/her view in some embodiments content from one or more images captured by the light field camera will be used to provide the image content which was not visible to the stereoscopic camera pair but which is expected to be visible to the user from the shifted head portion the user achieves during playback by leaning left or right.

Various exemplary camera rigs illustrated in FIGS. 1-9 may be equipped with a variety of different cameras, e.g., normal cameras, stereoscopic camera pairs, light field cameras etc. The exemplary camera rigs are used in various embodiments to capture, e.g., using the equipped cameras, environmental information, e.g., measurements and images, to support various applications in accordance with the features of the present invention.

Figure 6:
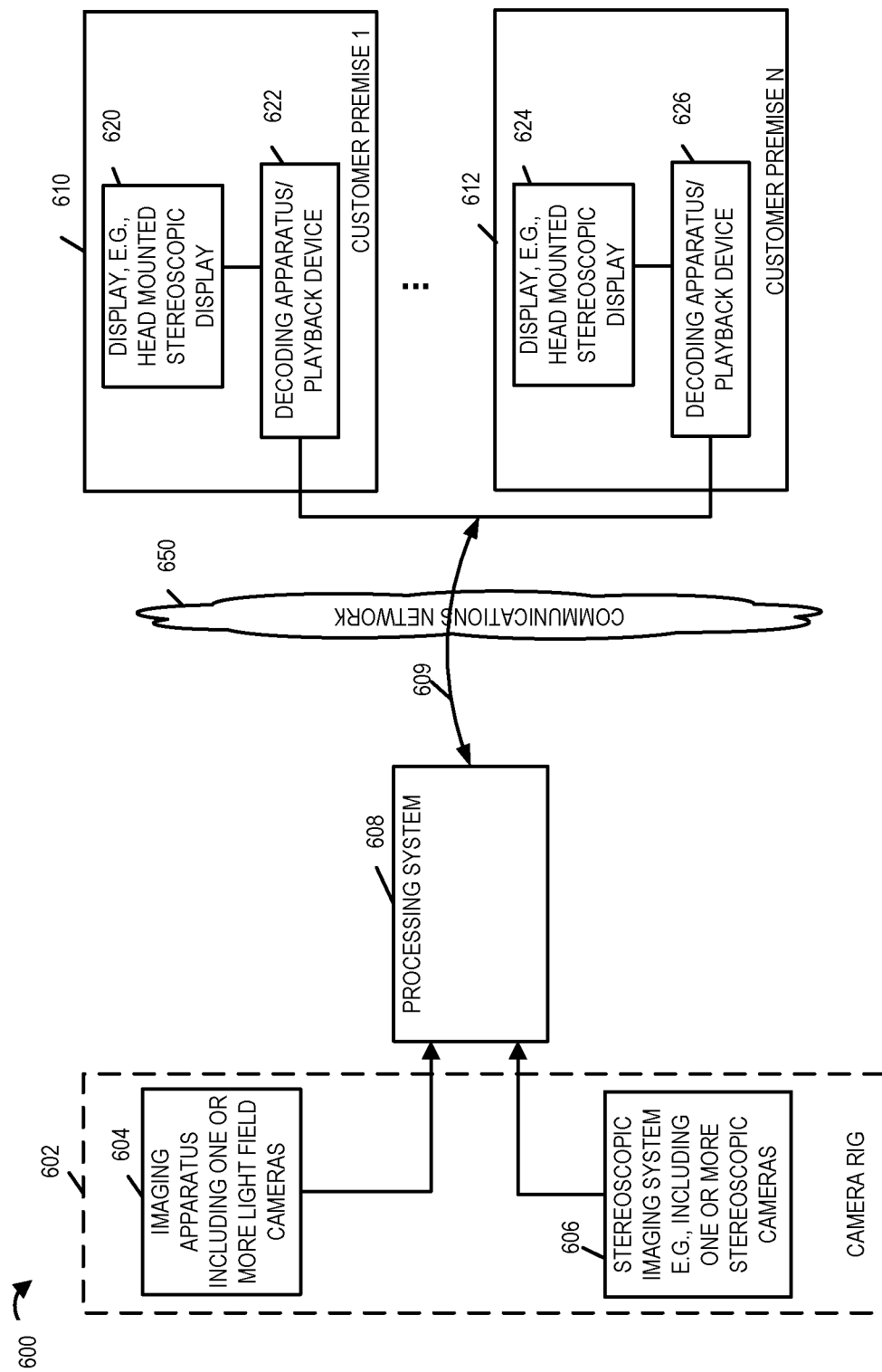
FIG. 6 illustrates an exemplary system implemented in accordance with some embodiments of the invention.

FIG. 6 illustrates an exemplary system 6600 implemented in accordance with some embodiments of the invention. The system 600 supports environmental information measurement and capture including image capture, processing and delivery, e.g., imaging content, environmental model and/or texture map delivery, to one or more customer devices, e.g., playback devices/content players, located at customer premises. The system 600 includes an exemplary imaging apparatus 604, a stereoscopic imaging system 606, a processing system 608, a communications network 650, and a plurality of customer premises 610, . . . , 612. The imaging apparatus 604 includes one or more light field cameras while stereoscopic imaging system 606 includes one or more stereoscopic cameras. In some embodiments the imaging apparatus 604 and the stereoscopic imaging system 606 are included in an exemplary camera rig 602 which may be any of the camera rigs discussed earlier with regard to FIGS. 1-5. The camera rig 602 may include additional imaging and/or environmental measurement devices in addition to the light field camera apparatus and the stereoscopic imaging system 606. The imaging apparatus 602 captures and processes imaging content in accordance with the features of the invention. The communications network 650 may be, e.g., a hybrid fiber-coaxial (HFC) network, satellite network, and/or internet.

The processing system 608 is configured to process imaging data received from the one or more light field cameras 604 and one or more stereoscopic cameras included in the stereoscopic imaging system 606, in accordance with the invention. The processing performed by the processing system 608 includes, e.g., generating depth map of the environment of interest, generating 3D mesh models and UV maps, processing image content received from one or more camera devices positioned at one or more location in the environment, e.g., encoding image in one or more different formats, extract occluded image data in accordance with the features of the present invention, and communicating the image content as well as environmental model information and UV maps to one or more playback devices in accordance with the features of the invention. In some embodiments the processing system 608 may include a server with the server responding to requests for content and/o environmental information for use in rendering content, e.g., depth maps corresponding to environment of interest, and/or 3D environmental mesh models, UV maps and/or imaging content.

The playback devices may, and in some embodiments do, use such information to simulate a 3D environment and render 3D image content.

The processing system 608 is configured to stream, e.g., transmit, imaging data and/or environmental information to one or more customer devices, e.g., over the communications network 650. Via the network 650, the processing system 608 can send and/or exchange information with the devices located at the customer premises 610, 612 as represented in the figure by the link 609 traversing the communications network 650. The imaging data and/or information may be encoded prior to delivery to one or more playback devices.

Each customer premise 610, 612 may include a plurality of devices/players, which are used to decode and playback/display the imaging content, e.g., captured by stereoscopic cameras 606 and/or other cameras deployed in the system 600. The imaging content is normally processed, e.g., formatted and/or encoded, prior to being communicated to the playback devices by the processing system 608. The customer premise 1 610 includes a decoding apparatus/playback device 622 coupled to a display device 620 while customer premise N 612 includes a decoding apparatus/playback device 626 coupled to a display device 624. In some embodiments the display devices 620, 624 are head mounted stereoscopic display devices. In some embodiments the playback devices 622, 626 receive and use the environmental model (also referred to as the 3D mesh model), UV map and imaging content received from the processing system 608 in rendering 3D imaging content and displaying the 3D imaging content to the user.

In various embodiments playback devices 622, 626 present the imaging content on the corresponding display devices 620, 624. The playback devices 622, 626 may be devices which are capable of decoding stereoscopic imaging content captured by stereoscopic camera, generate imaging content using the decoded content and rendering the imaging content, e.g., 3D image content, on the display devices 620, 624.

FIG. 7, which comprises the combination of FIGS. 7A, 7B, 7C and 7D shows method 700 of generating information, e.g., environmental model and UV map information, and for generating and streaming content corresponding images captured in the environment. The methods and apparatus can support the capture, processing and streaming of content in real time while an event is ongoing but can also be used for non-real time content generation and streaming. While shown as a complete process from image capture to streaming, it should be appreciated that the model generation and processing of images to generate content in a format for streaming can be performed by a separate system from the apparatus or system that streams the content. For example, once content is generated in one or more formats it can be loaded onto one or more servers which receive and respond to content requests, e.g., as described in FIG. 7. Thus while the steps of FIG. 7 will be explained using an example wherein a single system performs the content generation and streaming related steps, different portions of the method 700 can, and in some embodiments are, performed by different devices.

The method 700 starts in step 702, e.g., with a content processing and streaming system such as the one shown in FIG. 6 or any of the other figures of the application being powered on. In step 704, the system receives environmental model information indicating the shape of the environment, e.g., depth information from one or more sources. The environmental model information may be depth information measuring the shape of an environment where images are to be captured. For example the information may be depth information measured at a sports stadium from a default viewing position, e.g., a camera or seat position, from which images of an event which occurs in the environment will be captured. LIDAR may be used to make the environmental depth measurements. A light field camera may alternatively or in addition be used to capture depth information. Additional depth information may be obtained from optical images which are captured, e.g., by a camera rig placed at the default viewing location. Static model information of the shape of the stadium or environment may also be used to generate a model of the environment.

The model information received in step 704, from one or more sources which may include cameras of the camera rig shown in FIG. 4, operation proceeds to step 706 in which one or more models of the environment are generated. In some embodiments the models are mesh models with the mesh modeling one or more surfaces in the environment onto which textures, e.g., captured images, can be applied to generate images that a user can view during playback.

Operation proceeds from step 704 to step 706 in which one or more environmental models are generated. The environment may be a stadium, theater, outdoor environment or any environment from which images may be captured, e.g. by using one or more camera rigs. For example the camera rig in FIG. 4 or any of the other figures in this application maybe used to capture images of the environment. Step 706 includes one or more or all of steps 708, 710 and 712.

In step 708 a model of the surfaces of the environment visible from the default viewing location, e.g., a first environmental model, is generated. The first model generated in step 708 maybe, and sometimes is, a mesh model generated from images and/or depth measurements made from the default viewing location, and/or static information about the shape of the environment. The first model, in some embodiments, models model surfaces in the environment which are visible from the default viewing location as a set of segments connected by nodes hence the reference to a "mesh model". Each segment represents a surface onto which a texture, e.g., an image, maybe applied as part of generating an image to be displayed to a user of a playback device. Thus the first mesh model represents the shape of the environment which is modeled as would be perceived by someone located at the default viewing location looking out towards the modeled surfaces, e.g., walls, support columns, stage, etc, of the environment from the default viewing location.

As should be appreciated, from the default viewing location some surfaces, e.g., of objects in the environment, may not be visible from the default viewing location. Such surfaces are referred to as "occluded object or surfaces" because they are occluded from view when a person observes the environment or a camera captures images of the environment from the default location. Thus for purposes of explaining the invention an occluded surface or object is to be considered an object or surface which is not visible from the default viewing location while a non-occluded object or surface is to be considered an object or surface viewable from the default viewing location, e.g., as a user turns his or her head without shifting left or right, up or down, from the default viewing location. For example a rear side of a column or an object behind a column would be an occluded object if it is not visible from the default viewing location. An occluded image or occluded image portion refers to an image of an occluded surface or object or a portion of an image of an occluded surface or object.

Fans at a sporting event or another event are accustomed to viewing the event in the environment where the event is presented from a seat or other generally fixed viewing location. The position from which images of the environment from where content is captured may, and sometimes does, correspond to a seating position at a sporting event or other event.

While participants at events are accustomed to having assigned seats, they are also accustomed to being able to lean left or right in the seat and stand up or haunch down while at the event. Such an action normally is limited in the distance from which a viewer may change his/her head position and can be thought of as a shift or offset from the default viewing position, e.g., the head position of a fan if the fan was seated at the event. Such movements are often done in an attempt to view a portion of the environment obscured, i.e., occluded, from view from the default viewing position. Unlike a simple head rotation or head tilt where a users head position may change but the location of the user's head in the environment remains generally at the same location in the environment, an offset left or right, up or down, from the default viewing location is normally accompanied by an expectation that the fan or user will be able to see some portion of the environment which was not visible from the default viewing location.

The first environmental model which models surfaces visible from the default viewing location normally does not include segments and/or nodes corresponding to surfaces which are not visible from the default viewing location. This is because assuming a user stays at the default location he/she is not likely to view other surfaces and including such details about portions of the environment which are not likely to be used would be wasteful from a data storage and/or transmission perspective.

For devices which can not support changes in viewing location to an offset location, the first environmental model should be adequate and well suited for purposes of supporting playback of content captured in the environment. However, for devices to support a user's ability of change his/her viewing position from the default position model information regarding additional surfaces, e.g., surfaces which may be viewed if a user changes his viewing location, would be desirable. For example, it might be useful to model all or a portion of a column or wall or an inside surface of a box not visible from the default viewing location if by changing viewing location the user would expect to be able to see the surface. For example, by moving his head up a user might expect to be able to see into a box in front of him which the user could see the top of but not inside while at the default viewing location. Consider also that the user may expect to be able to see the back or a portion of a rear side of a column by leaning to the side and shifting his/her head location to the left or right of the default viewing location. The occluded surfaces a user is likely to be able to see by leaning left or right, or standing vs sitting, are likely to be a relatively small portion of the environment. However, to provide a realistic virtual reality experience it can be desirable to be able to accurately present such occluded portions of an environment to a user in response to detecting a change in the location of the user's head.

In order to support the display of occluded objects and surfaces, in some embodiments auxiliary model information is generated in step 712 modeling portions of the environment which are not visible from the first default viewing location. The auxiliary model information can be based on images captured by a camera or distance measurement device portioned in the environment at a different location, e.g., a location offset from the default viewing location, and/or based on detailed environmental model information such as a detailed stadium model which includes information of surfaces which are not visible from the default viewing position. Many stadiums and/or other locations have been measured in detail from a variety of angles to produce an accurate 3D model of the environment and such models are a good source of the auxiliary model information when real time measurements are not possible.

The auxiliary model information may be in the form of supplemental mesh information which can be combined with the first mesh model to generate a more detailed model of the environment which includes segments and nodes corresponding to at least some portions/surfaces which are not visible from the default viewing position. Depending on the embodiment, the auxiliary model information and the first environmental model information can be combined to form a second environmental model as done in step 710. The second environmental model generated in step 710 includes segments and nodes corresponding to surfaces visible from the default viewing location and also segments and nodes corresponding to portions of the environment which are not visible from the first default viewing position but which are visible from one or more other locations, e.g., a second location offset from the default viewing position.

While the second environmental model may be used even if occluded environmental content is not to be displayed, in cases where a device is not capable of supporting multiple viewing locations, use of the first model is more efficient since occluded image portions will not be displayed since the playback device lacks the capability to support alternative viewing locations. This can be expected where a device is not powerful enough to decode the primary content and the occluded content at the desired frame rate.

However, in cases where a user may shift his head position it can be useful to send the second environmental model or a combination of the first environmental model and auxiliary information, so that a playback device has reliable model information for the non-occluded image surfaces, also sometimes referred to herein as main or primary environmental surfaces, as well as the occluded surfaces. As will be discussed below, depending on playback device capabilities and/or the format in which content is supplied to a playback device it might be desirable to supply: i) the first environmental model, ii) the second environmental model or ii) a combination of the first environmental model and the auxiliary model information. If supplied with the first environmental model and the auxiliary model information the receiving device can modify the first model based on the node and segment information included in the auxiliary model information to generate the second model which includes information modeling non-occluded surfaces as well as at least some occluded surfaces.

The environmental models and/or model information generated in step 706 is stored, e.g., in memory or other storage, in step 714 so that it is available to be provided to playback devices seeking to playback content corresponding to the modeled environment.

Operation proceeds from step 714 to step 716 in which a UV map or maps are generated to be used with image content which is to be mapped onto the first or second environmental models. Whether one or more UV maps are generated depends on whether one or more frames, e.g., 2D images, are used to communicate textures to be applied to the environmental model being used for playback.

The image content to be used as a texture is, in some embodiments, images captured from the default viewing location or a location offset from the default viewing location which are to be used as textures which can be applied to the segments in one or more of the environmental models.

Each UV map indicates how to divide up a 2D image and map segments in the UV map to corresponding segments of the 3D mesh model of the environment. Normally 1 segment of a UV map corresponds to one segment of the 3D environmental model.

The UV maps can be used for mono images, e.g., where a single image is transmitted for display to both the left and right eyes of a user. The UV map can also be used to map left eye image content onto the 3D model to generate a left eye image and to map a right eye image onto the 3D model to generate a right eye image to be displayed. In such an embodiment the same UV map and 3D environmental model may be used for both the left eye image and right eye images of a stereo image pair but with the input image for the left eye differing from the input image used to generate the right eye image. The manner in which 2D images are encoded and transmitted may vary depending on the particular embodiment. In some stereo embodiments left and right eye input images of the environment to be used as textures are transmitted in different frames. In other embodiments both left and right eye images are incorporated into a single frame, e.g., with one image on the top of the frame and the other image below the first image or with the left and right eye images being communicated in an interlaced fashion, e.g., with odd lines of a frame being used for a left eye image and even lines being used for a right eye image. Before application of a UV map the playback device may separate the left and right eye images and then use the UV map to determine how to apply the left eye input image to the 3D map and separately use the UV map a second time to determine how to apply the right eye input image to the 3D mesh model to generate a right eye image for display.

Since the way in which left and right eye images may be packed into a frame for transmission of a stereo image pair to a playback device may occur in one of a variety of ways, Applicant will try to limit the discussion of such options in the present application to the extent possible.

Step 716 may include one, more or all of steps 718, 720 and 722. In step 718 a first UV map for mapping portions of a 2D image, e.g., frame, onto the first environmental map is generated. The portions of the frame to be mapped in generating the first UV map may and normally does include portions which are images of corresponding portions of the environment visible from the default viewing location. The first UV map may be, and in some embodiments is, for a 360 view of the environment but may be for a smaller portion of the environment.

In step 720 a second UV map is generated for mapping portions of a frame including image portions corresponding to portions of the environment which are visible from the default viewing position and also including image portions corresponding to occluded portions of the environment visible from one or more locations other than the default viewing location. For example a majority of a frame may be dedicated to communicating an image of the environment captured from the default viewing location for use as a texture to be applied to non-occluded segments of the modeled environment and another smaller, e.g., bottom portion of the frame dedicated to transmitting images corresponding to occluded surfaces. The size of the segments of a frame used for communicating texture information for occluded objects may be, and sometimes are, smaller than the size of segments in the UV map used to map non-occluded image portions to same size segment of the 3D model. In such a case the use of a small portion of the transmitted frame and UV map to communicate a texture for a occluded portion of the environment results in the texture being of lower resolution than the non-occluded image portions. However, the use of lower resolution textures for occluded image portions than non-occluded portions allows for efficient use of the available pixels in a frame since the non-occluded image portions are much more likely to be viewed then the occluded image portions.

By using a single frame to communicate both non-occluded image data and a small amount of occluded image data, the display of occluded image content can be supported without significantly increasing the amount of data which needs to be transmitted as compared to the case where frames including only non-occluded image data are transmitted. To support the transmission of occluded image data in a frame with non-occluded image data the non-occluded image data may be, and sometimes is, down sampled slightly, e.g., by 10 percent or less as compared to the case where occluded data is not packed into the frame with the non-occluded image data.

Rather than pack the occluded image data into a frame with non-occluded image data, the occluded image data may be packed into a frame transmitted in an auxiliary content stream which is multiplexed with a first content stream communicating frames of non-occluded image data, e.g., image portions corresponding to non-occluded portions of the modeled environment. In cases where an auxiliary frame is used to communicate image portions corresponding to occluded surfaces, in step 722 an auxiliary UV map is generated for mapping portions of the Auxiliary frame to segments in the 3D mesh model which correspond to occluded portions of the environment. The auxiliary map may and sometimes does include portions corresponding to different primary frames. For example, different ⅕ portions of the auxiliary frame may communicate content to be used with different frames of a primary content stream, e.g., a set of M frames in the primary content stream. In such a case different portions of the auxiliary frame will be used at different times based on the information included in the UV map so that the content in a single auxiliary frame can be combined with the content in the primary frame for purposes of application to the mesh model to generate an image corresponding to a frame time.

With the different mesh models having been generated in step 716 to support each of a first, second and third content streaming format, operation proceeds to step 724 in which the generated first UV map, second UV map and Auxiliary UV map are stored in memory, e.g., with the mesh model information so that it can be supplied as needed to a playback device requesting content.

Operation proceeds from step 724 to steps 726 and, via connecting node A 727, to step 729. Step 726 marks the start of processing of image content, e.g., one or more streams of images captured by a camera rig at the default viewing portion in the environment. Thus step 726 in which captured image content is received relates to the receipt of non-occluded image content. In step 726 the processing system receives image content captured by a first camera or a first camera pair, including the first camera and a second camera, located at the default viewing position. In the case where mono-images are being supported the first camera alone will be used. In cases where stereoscopic image capture is supported the first camera will be used to capture, e.g., a left eye image, and the second camera will be used to capture, e.g., a right eye image.

Operation proceeds from step 726 to step 728 in which received image content received from the first camera or first camera pair which is to be encoded, is selected for inclusion in a first frame, e.g., a frame used to communicate image data intended to be used as textures for segments of the 3D environmental mesh model. Step 728 may involve cropping of a received image or images and/or extraction of different portions of a received image or images corresponding to different portions of the environment to be included in a frame or frames to be transmitted to the playback device. The selection performed in step 728 takes into consideration which portions of a received image or images are to be mapped onto the model with such portions being selected for inclusion in the frame to be transmitted.

Operation proceeds from step 728 to steps 732 and 734 via connecting node B 730. In step 732, the image content selected in step 728 is formatted for encoding in accordance with a first format. This step may involve further cropping, scaling and/or performing selective resolution reduction and/or combining of content from different images for inclusion in a single frame. For example if left and right eye images are to be packed into a single frame step 732 will format the images so that the images can be placed in the same frame which will often involve downsampling. In the case of stereoscopic embodiments where the left and right eye images are to be transmitted as separate frames, step 732 would output a pair of images forming to a stereoscopic frame pair as opposed to a single frame including both the left and right eye images.

Data 736 represents the image or image pair formatted for encoding in the first format which output by step 732 and supplied as input to step 741 in which encoding is performed on data 736 to generate an encoded frame or frames from the captured image images. Operation proceeds from step 741 to step 744 where the encoded frame or frames 746 in the first format are stored in a content store, e.g., memory, for possible future streaming in a first content stream using a first stream format and/or a third content stream using a third content stream format.

The received image content which was selected in step 728 is subjected to processing to generate frames in a second format in some embodiments. The generation of the frames in the second format includes steps 734, 740, 742 and uses occluded image data extracted in step 731 from an alternative image source e.g., a second camera. The second format frames include occluded image data, e.g., portions of images of occluded objects, in addition to image portions corresponding to non-occluded objects which normally occupy the majority of the frame in the second format.

Figure 7A:
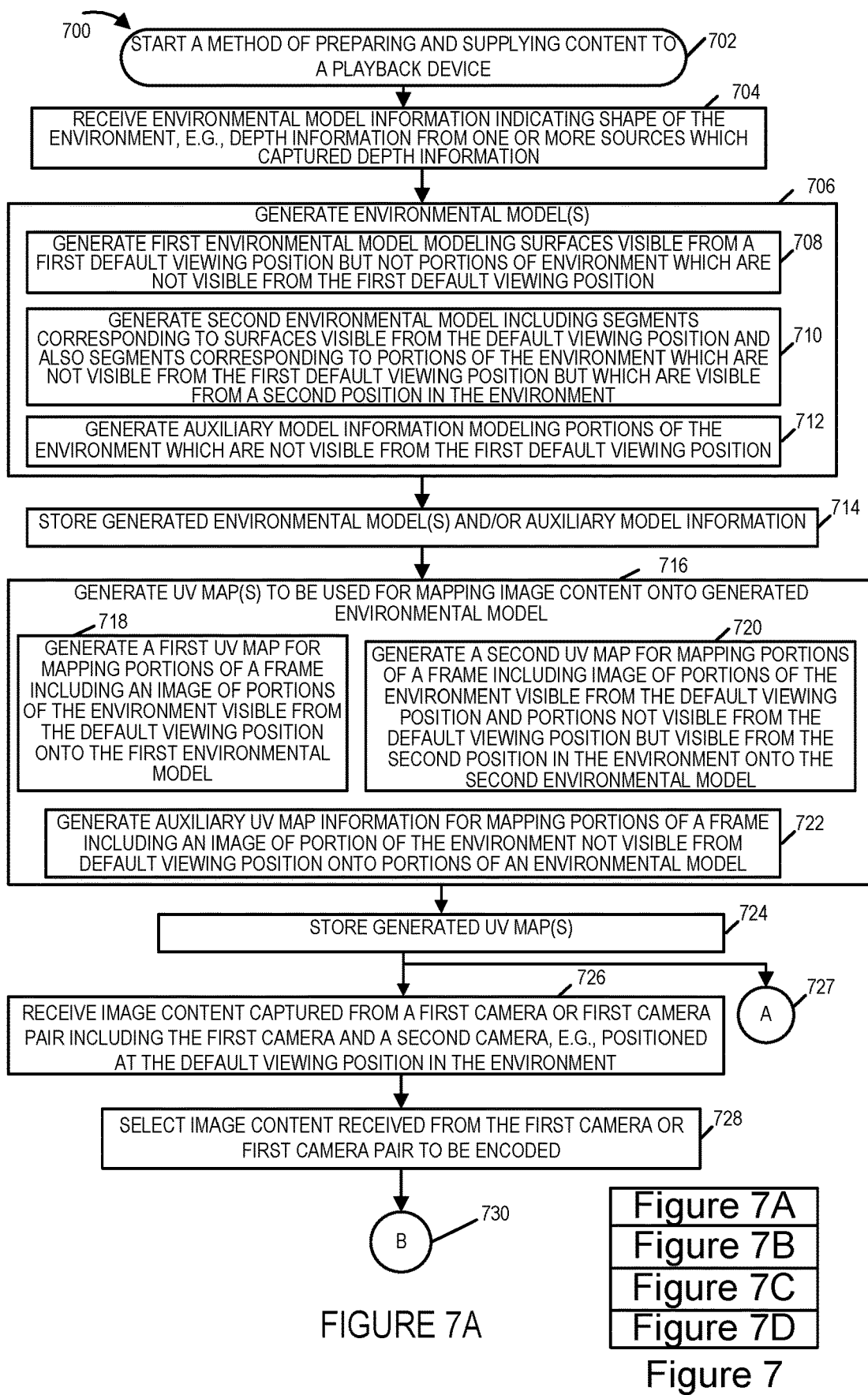
FIG. 7A is a first part of FIG. 7 which illustrates a flowchart of an exemplary method of operating an exemplary processing system in accordance with some embodiments.
Figure 7B:
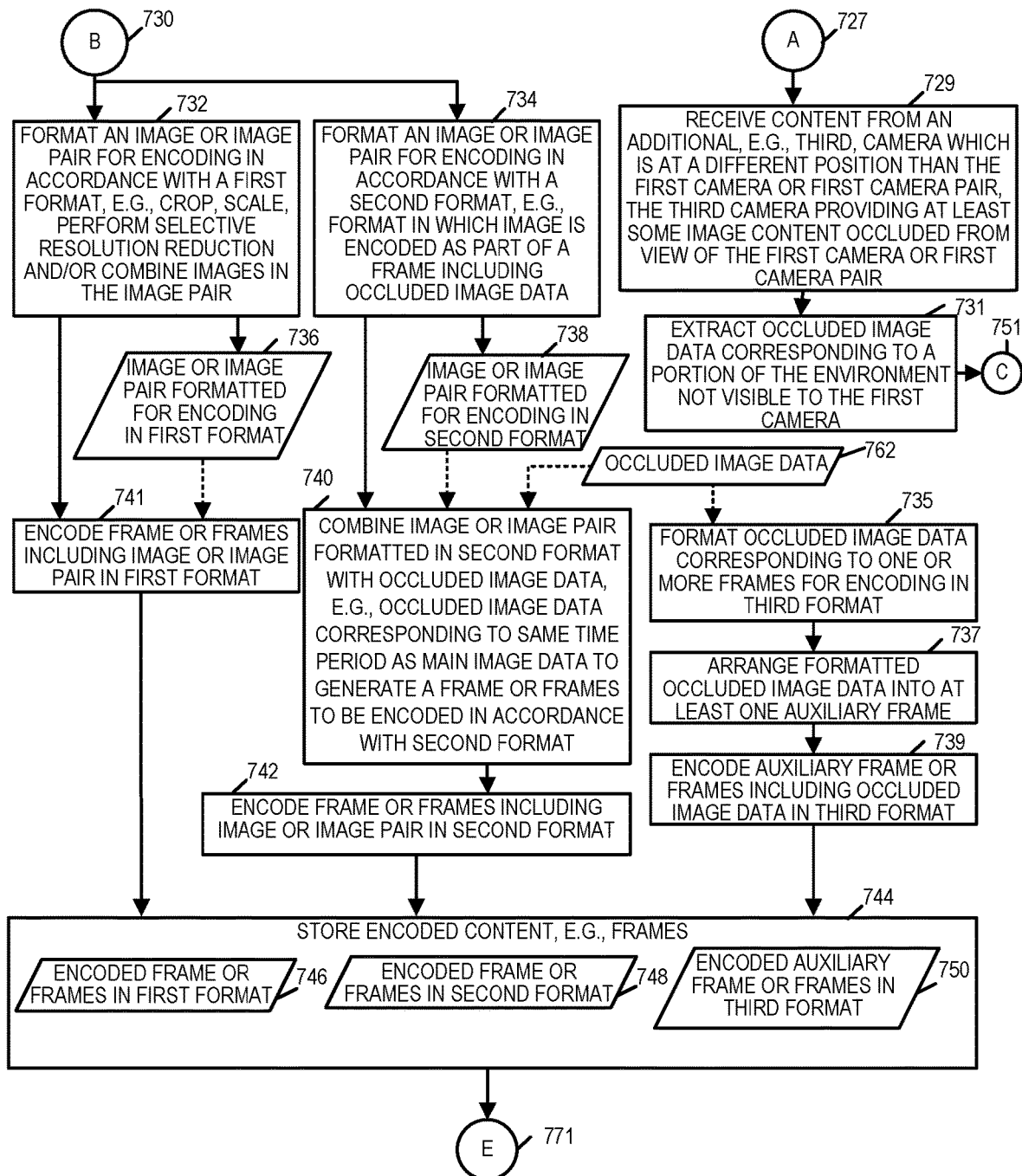
FIG. 7B is a second part of FIG. 7 which illustrates a flowchart of an exemplary method of operating the processing system.
Figure 7C:
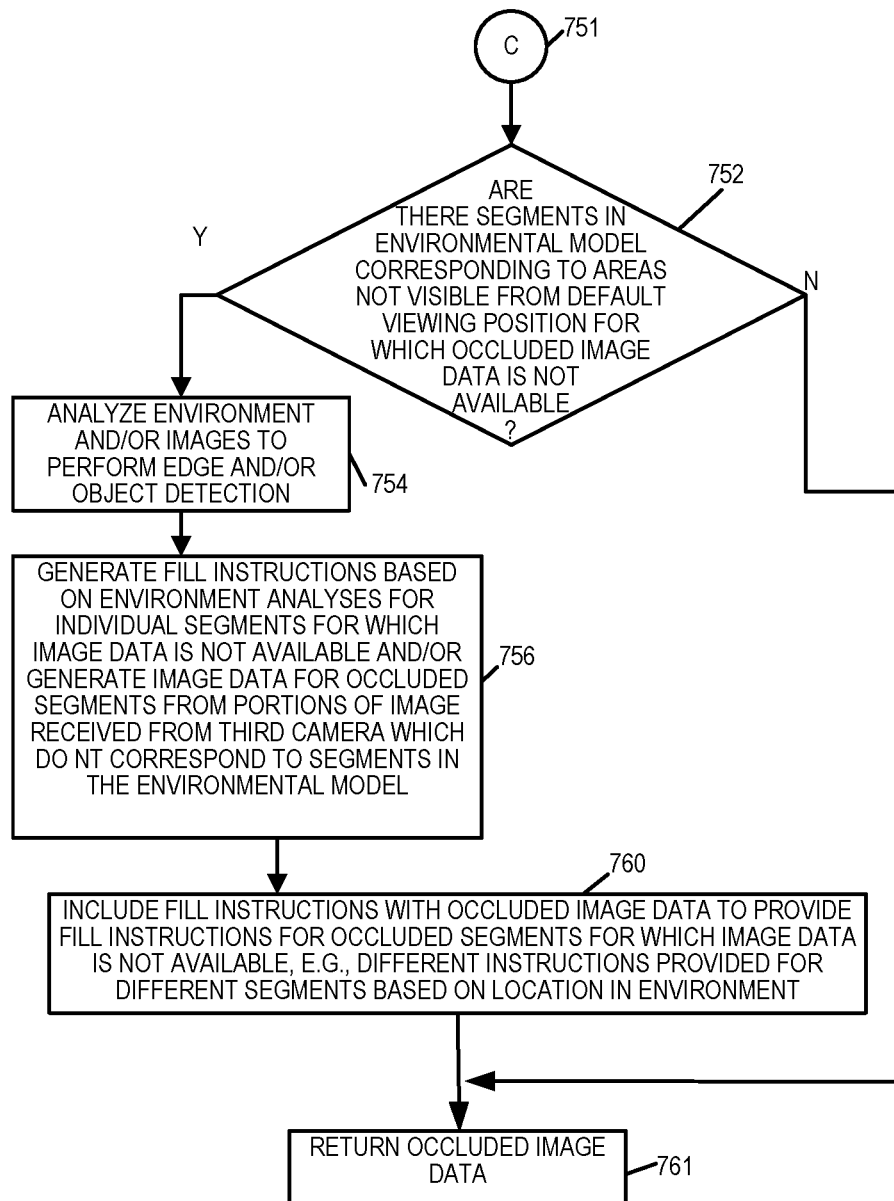
FIG. 7C is a third part of FIG. 7 which illustrates a flowchart of an exemplary method of operating the processing system.

In step 734 an image or image pair is formatted for encoding in accordance with the second frame format in which a single frame includes both image portions corresponding to non-occluded portions of the environment and image portions corresponding to occluded portions of the environment. Step 734 may include downsampling of all or some portions of the non-occluded image portions to make space in the frame or frames for occluded image content. Thus in the second frame format a fewer number of pixels may be dedicated to non-occluded environmental portions than when the first format is used assuming frames of the same size in terms of pixel number are used for both the first and second frame formats. The image or image pair formatted for encoding generated in step 734 is represented in FIG. 7B by data 738 which serves as input to step 740. Another input to step 740 is occluded image data 762 which is to be included in a frame in accordance with the second frame format. Generation of the occluded image data 762 will be discussed further below with regard to the processing of an image or images from a camera at a location which is offset from the default viewing location and is thus capable of capturing images of at least some occluded objects.

In step 740 the formatted image data 738 is combined with the occluded image data 762 to generated a frame or frames to be encoded in accordance with the second format. In the case of mono where one frame is generated per frame period or stereo where left and right eye images are packed into a single frame, a single frame will be generated for each playback frame period. In the case where different frames are to be used to communicate left and right eye images, a left eye image and a right eye image will be generated in step 740 to form a stereoscopic frame pair. In step 742 the formatted frame or frames generated in step 742 are encoded. The encoded frame or frames 748 in the second frame format, which include both non-occluded image portions and occluded image portions, are stored in step 744, e.g., for use in responding to subsequent content requests.

After UV map generation and storage, processing proceeds to step in step 729 via connecting node A 727. Step 729 can be performed in parallel with steps 732, 734 and is shown in parallel but could also be performed sequentially as long as the occluded image data is made available for use in step 740.

In step 729 one or more images are received from an additional camera, e.g., a third camera located at a different location than said first camera and/or said first camera pair located at said default viewing location. The third camera captures in its images at least some portions of the environment which are occluded from view from the default viewing and primary image capture location.

In step 731 image portions, e.g., occluded image data, corresponding to one or more portions of the environment which are not visible to the first camera or camera pair are extracted from the image or images received from the third camera. The extracted portions may correspond to the back of a column, inside of a box, or some other surface not visible from the default viewing location. The extracted occluded image portions may be non-contiguous image portions intended to be used as textures for segments of the environmental which are occluded segments. Processing of the extracted occluded image segments proceeds from step 731 to step 752 shown in FIG. 7C via connecting node C 751. In step 752 a check is made to determine if there are any segments, occluded environmental segments, in the environmental model corresponding to areas not visible from the default viewing location for which occluded data is not available, e.g., based on image data missing from the set of extracted occluded image data for one or more occluded segments of the environment which was obtained in step 731. If there is no missing occluded image data the extracted occluded image data is complete and the extracted occluded image data is supplied in step 761 to one or more other processing steps, e.g., step 740, as occluded image data 762.

If in step 752 it is determined that occluded image data is missing for some of the segments in the environmental model corresponding to occluded portions of the environment, operation proceeds from step 752 to step 754. In step 754 the environment and/or images of the environment included the occluded image portions are analyzed to determine how best to generate textures from available image portions of the environment to fill the occluded segments where captured image content is not available. In some embodiment's edge and/or object detection is used to determine if a segment for which image content is not available is part of an object or surface for which image content is available. Edges in captured images of the environment are used to identify surfaces and/or objects. In some embodiments rather than supply a texture, e.g., image portion, instructions are generated on how the playback device should fill the occluded segment for which an image portion is not available. This may, and in some embodiments does, include an instruction to average or copy one or more specific occluded image portions corresponding to the same surface or object and use the resulting image content as the missing image portion to be applied as a texture to the segment for which image data was not captured. In other embodiments in step 756 a texture, e.g., image portion, is generated from other occluded image portions in step 756 and then included in the occluded image data as if it was captured by a camera. In some embodiments the occluded image data is an occluded portion of the environment which was captured by a camera but does not correspond directly to the occluded segment for which an image was not captured, e.g., it may correspond to an adjacent occluded portion of the environment. Since such image data would not be available absent it being included in the occluded image data, by considering whether or not content is available for all occluded image segments of the environmental model allows the device processing the images from the third camera to make better substitutions and/or provide instructions than a playback device which does not have direct access to the images captured by the third camera could make.

Operation proceeds from step 756 to step 760 in which the generated fill instructions and/or substitute image data generated for occluded image segments missing such data is combined with the extracted occluded image data. The generated set of occluded image data is then returned in step 761 as occluded image data 762 for use in one or more other steps such as steps 740 and step 735.

The processing performed in step 740 has already been described. Accordingly, the discussion will now turn to the processing of the occluded image data in step 735 of FIG. 7B. In step 735 the occluded image data 762 is formatted for encoding in a third format, e.g., the format used for use in generating auxiliary frames including occluded image portions, e.g., small portions of an image which correspond to an occluded object that is not visible from the default viewing location. In step 735 occluded image data, to be used with one or more primary frames is formatted, e.g. cropped, downsampled and combined into a set of pixel data which can be communicated in an auxiliary frame or portion of an auxiliary frame. The occluded image data may be a set of cutouts from the third image which are to be used as textures for occluded portions of the environment. These small image portions may be downsampled to reduce their size in terms of the number of pixels which will be used to transmit the occluded image data. With the occluded image data having been selected and formatted in step 735 operation proceeds to step 737 where the occluded image data, e.g., snippets or small image portions corresponding to occluded surfaces, are arranged to be included in one or more auxiliary frames. While in the case of non-occluded image data where images of adjacent portions of the environment are normally arranged next to each other, e.g., adjacent one another in a manner consistent with where they will be placed in the environment, the occluded image data which is a combination of image portions corresponding to multiple objects may be, and sometimes is, arranged to maximize the use of the available space in an auxiliary frame or frame portion. Thus in the case of auxiliary image data corresponding to occluded objects the arrangement of the image portions in the frame may be very different from the arrangement of the occluded image portions in the actual environment with the UV map associated with the auxiliary frame controlling where an image portion will be used in the environment as a texture.

In the auxiliary frame, pixels corresponding to non-adjacent object in the environment are sometimes placed next to each other with the understanding that the UV map corresponding the auxiliary frame which controls where the image, e.g., texture, is applied in the modeled environment based on information provided by the UV map indicating how the auxiliary frame portions should be mapped to the environmental model segments. Similarly, when occluded image content is included in a frame generated in the second format, pixels corresponding to non-adjacent occluded objects may be placed next to each other in the frame for transmission purposes with the UV map that is used in conjunction with such a frame controlling to which segments of the environmental mesh model the occluded image content will be applied as textures. Thus, unlike the primary or non-occluded image data where adjacent pixels normally correspond to adjacent segments in the mesh model, with regard to occluded image data adjacent pixels in a frame may, and often do, correspond to non-adjacent surfaces or objects, e.g., occluded object surfaces not visible from the default viewing location which are not adjacent one another. For example, an image of a rear portion of a column may be included next to, e.g., adjacent, an image of an inside of a box in the occluded image data set used to form a frame or portion of a frame in the case of auxiliary data even though the rear portion of the column and inside of the box are located at different non-adjacent locations in the environment. Thus in the arrangement of occluded image data as part of step 737 adjacent image portions in the actual environment may be non-adjacent in the arranged set of occluded image data and images of occluded objects which are non-adjacent objects in the environment may be arranged to be adjacent in the auxiliary frame or occluded set of image data included in a frame of the second format.

Given that the occluded image portions tend to be a much smaller portion of the environment which is modeled than the non-occluded image portions, when occluded image data is sent in an auxiliary frame the occluded image data corresponding to multiple different primary frames maybe included in a single auxiliary frame. In addition the auxiliary frame size may be different, e.g., smaller than the primary frame size. The playback device can recover the occluded image data corresponding to different frames of a primary stream and use the recovered image data with the corresponding frame of the primary, e.g., non-occluded image content stream. Thus, by using a different, e.g., smaller, frame size in terms of the number of pixels in a frame and/or by packing occluded image data for multiple different non-occluded image frames into a single auxiliary frame occluded image content can be provided with relatively little overhead as compared to the amount of data required to transmit the primary content stream. In some embodiments the occluded image content stream, e.g., auxiliary content stream, has a data rate of 1/10th or less than the data rate of the primary non-occluded content stream. The frame rate of the auxiliary data stream, in cases where the auxiliary frame included occluded image content to multiple primary frames, will normally be a fraction of the frame rate of the primary stream. In some embodiments the frame rate of the auxiliary content stream providing occluded image data to be used as textures is 1/5, 1/10 or less than the frame rate of the primary content stream.

Once the occluded image content from one or more frames has been arranged into a frame or frames in step 737, operation proceeds to step 739 in which the auxiliary frame or frames are encoded, e.g., compressed, for storage and/or transmission. The encoded auxiliary frame or frames 750 are then stored in step 744, e.g., for future streaming and/or processing.

Figure 7D:
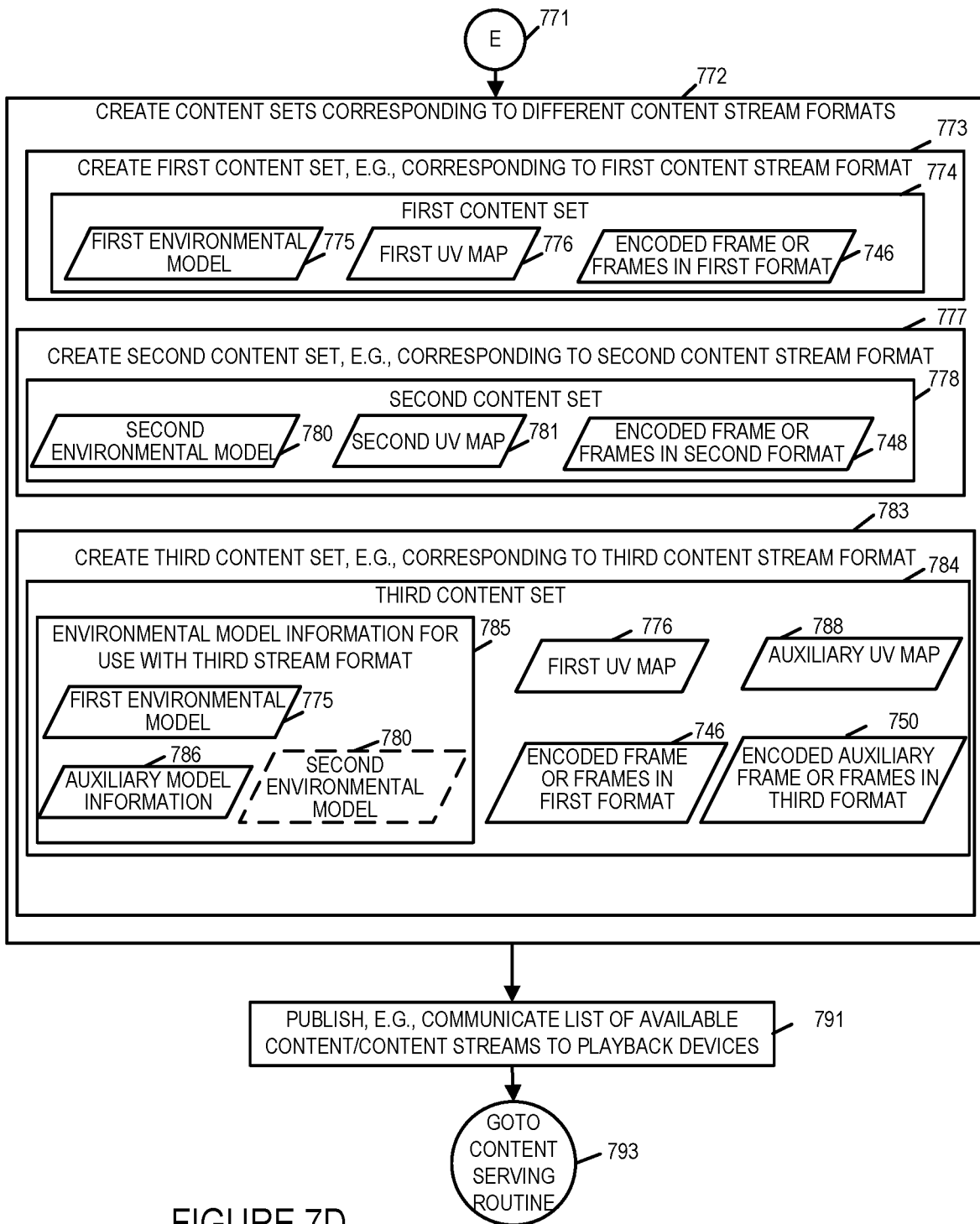
FIG. 7D is a fourth part of FIG. 7 which illustrates a flowchart of an exemplary method of operating the processing system.

Operation proceeds from step 744, in which the encoded content which can be used to generate streams in various formats is stored, to step 772 of FIG. 7D via connecting node E 771. In step 772 content sets corresponding to different stream formats are generated to facilitate streaming of content in response to content requests. Step 772 includes steps 773, 777, and 783.

In step 773 a first content set 774 corresponding to a first content stream format is generated. The generated first content set 774 includes the first environmental model 775 which includes segments corresponding to the non-occluded segments of the environment, a first UV map 776 for mapping frames of images corresponding to the environment to segments of the first environmental model 775 and encoded frames in the first format 746 which can be sent as a content stream. The encoded frames 746 do not include occluded image content. Since the first set of content 774, includes content, map and model information which relates to non-occluded image portions and does not include information for occluded image portions, it is well suited for streaming to devices which do not support the display of occluded image data, e.g., devices which for processing power limitation reasons or data transmission constraint reasons will process and display non-occluded image portions but not occluded image portions.

In step 777 a second content set 778, e.g., corresponding to a second content stream format, is generated, e.g., from the previously created second environmental model 780, second UV map 781 and encoded frame or frames 748 in the second format. In the case of the second format frames the frames include both non-occluded and occluded image content. The second environmental model 780 includes segments corresponding to non-occluded portions of the environment and occluded portions of the environment. The second UV map 781 includes information on how to map non-occluded image portions as well as occluded image portions to the second environmental model 780. Thus, in the second stream format case while a separate content stream with occluded image data is not sent, a portion of the frames which are sent are used to provide image portions corresponding to occluded surfaces in the second environmental model 780. While the second content stream format may require the same or approximately the same amount of data to transmit as the first content stream format, for devices which can not use the occluded image data it would be better to receive a content stream in the first format since more of the transmitted frame is used for non-occluded, e.g., primary, image portions potentially allowing for better quality of the primary image portions visible from the default viewing position than would be possible if less data, e.g., a smaller portion of each transmitted frame, was used for communicating non-occluded image content.

In step 783 a third content set 784 is generated. The third content set 784 corresponds to a third content stream format. In accordance with the third content stream format, a program or other content is streamed using a multiplex of frames corresponding to non-occluded image content in a primary content stream and frames used to provide occluded image content in an auxiliary content stream. In some embodiment the each auxiliary frame provides occluded image content to be used with multiple different primary content stream frames. Thus for each of M frames transmitted in the primary content stream, 1 frame is transmitted in the auxiliary content stream, where M is 1 or larger and often greater than 5 or 10. This is because a much smaller amount of the available bandwidth is dedicated to transmitting auxiliary frames, e.g., occluded image content in some embodiments, rather than primary frames. In some embodiments the auxiliary content stream requires ⅕ or less data than the primary content stream and in many cases ¹⁄₁₀ or less data than the primary, e.g., non-occluded image content stream.

Step 783 includes in some embodiments creating a content set which includes environmental model information 785 for use with the third stream format which includes model information for both non-occluded and occluded portions of the environment. In some embodiments environmental model information 785 includes first environmental model information 775 and auxiliary model information 786 which can be used in combination to generate an environmental model with both non-occluded and occluded segments. In other embodiments the environmental module information 785 includes the second environmental model 780 which includes segments corresponding to non-occluded and occluded portions of the environment. By including the second environmental module 780 in a content stream the playback device does not have to combine the first environmental model 775 and auxiliary model information 786 to create the environmental model to be used and can simply rely on the second environmental module 780 which already includes non-occluded and occluded segments.

In addition to third model information the third content set 784 includes the first UV map 776 and a frame or frames 746 encoded in the first format, e.g., a format which includes non-occluded image content but not occluded image portions. The first UV map 776 can be used to map portions of frames in the first format, i.e., non-occluded image portions, onto segments of the second environmental model 780 which correspond to non-occluded portions of the environment. In addition to the non-occluded image content 746, in the third stream format occluded image portions are communicated in auxiliary frames sent in an auxiliary content stream. Accordingly, the third content set 784 includes an auxiliary UV map 788 for mapping occluded image portions onto segments of the second environmental module 780 which correspond to occluded portions of the environment. Information about such occluded segments is included in the auxiliary model information 786 when the content stream includes first environmental model information 775 and auxiliary module information 786 which allows the playback device to generate the second environmental model 780.

With the content sets for the various streams generated and stored in step 772, they are available for streaming. As should be appreciated for a given program title, the corresponding content may be provided using the first stream format, the second stream format or the third stream format by streaming content and related model/UV map information to a playback device. While for a given program title multiple different content streams maybe available, individual content streams maybe identified by a specific content identifier. A playback device can request content by providing a content identifier, e.g., a program title or number identifying a program for which one or more content sets exist, and allowing the device, e.g., server providing the content, to select the content set 774, 778 or 784 to provide or the playback device can request content in a specific steam format by including in a content request a content set or stream identifier corresponding to a specific one of the stored content sets 774, 778, 784.

In order to facilitate content requests in step 791 the system which created and stored the content sets 774, 778, 784 publishes, e.g., communicates to playback devices a list of the available content and/or available content streams. The list of available content may include a program title or program identifier while available stream information may include stream identifiers indentifying content corresponding to an indicated title in a specific content stream format. A playback device receiving the published available content information can use it to request content, e.g., from a server which stores and streams the content sets 774, 778, 784 in response to requests. Devices with different capabilities maybe and sometimes are streamed different versions of the same title with, e.g., a device which does not support the display of occluded images being supplied with content set 774, a second device with a single decoder and which supports the display of occluded images being supplied content set 778 and with a device that supports multiple decoders, e.g., a primary stream decoder and an auxiliary stream decoder, being supplied with content set 784.

Figure 8:
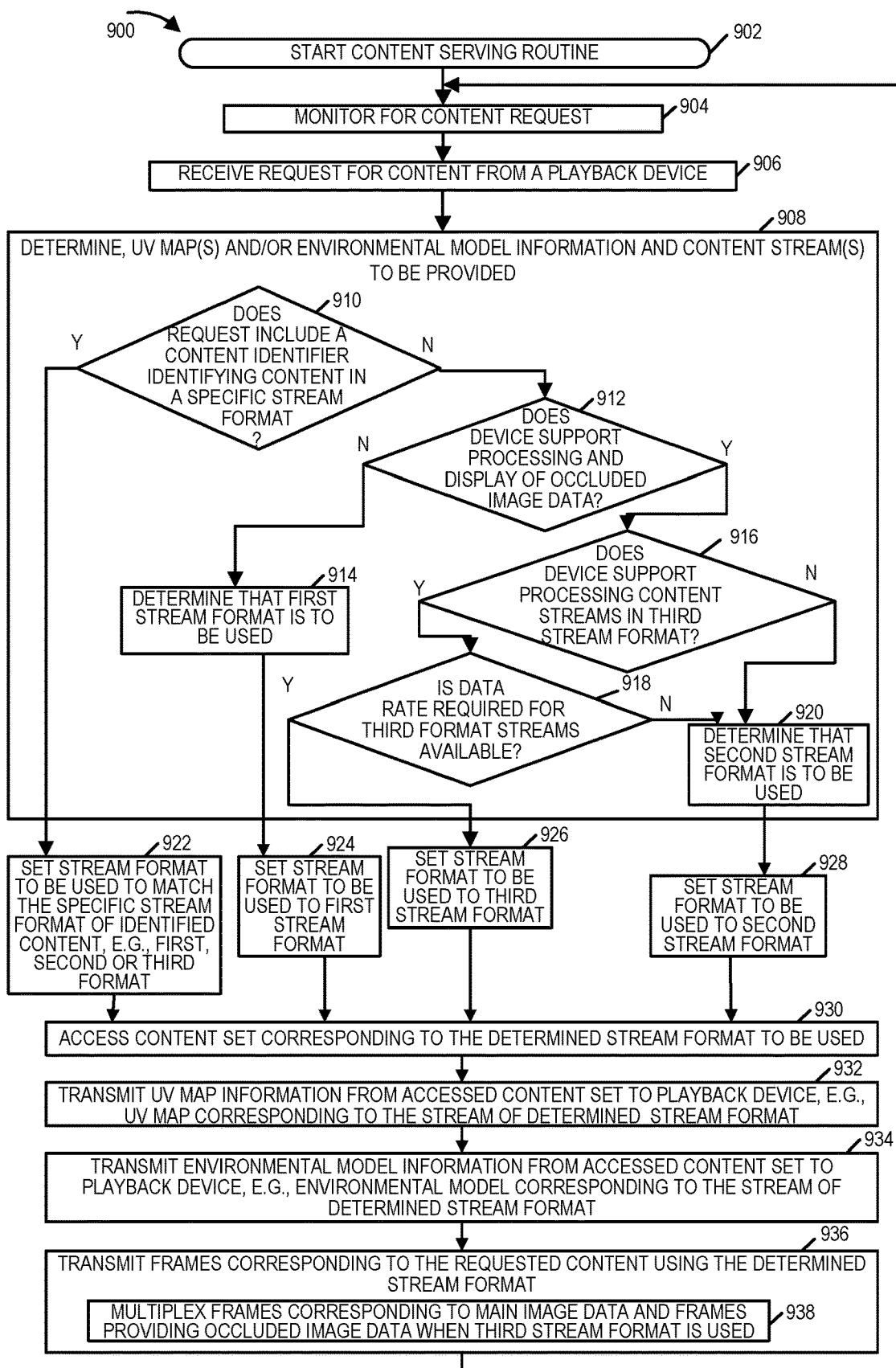
FIG. 8 illustrates the steps of an exemplary content serving routine which is implemented in some embodiments as part of the method of flowchart of FIG. 7.

With the list of available titles being distributed to playback devices in step 791 to facilitate the making of content requests, operation proceeds to content serving routine 900 shown in FIG. 8 via go to step 793.

Before discussing the content serving routine 900 shown in FIG. 8, a brief discussion of the various formats of the content streams which may be served may be helpful to understanding the serving routine.

FIG. 9 shows a first stream format 1000 which is used to serve, e.g., stream or download content which does not include occluded image portions, e.g., content corresponding to images which can be viewed from a default viewing location. In accordance with the first format, an environmental model 1002, e.g., a mesh model of the environment corresponding to where the images to be streamed were captured is provided along with a UV map 1004 for mapping portions of frames 1006, to the environmental model. In the first stream format the provided model 1002, UV map 1004 and image content 1006 correspond to non-occluded portions of the environment, e.g., portions which are visible from a default viewing position in the environment. The first stream format does not involve the communication of occluded image content, e.g., portions of images which correspond to areas of the environment which are not visible from the default viewing position.

FIG. 10 shows a second stream format 1050 which is used to serve, e.g., stream or download content, which includes non-occluded image portions and occluded image portions in a frame, e.g., content corresponding to images which can be viewed from a default viewing location as well as content corresponding to image which can not be viewed from the default viewing position but which are visible from a location offset from the default viewing position. In accordance with the second format, a second environmental model 1052, e.g., a mesh model of the environment corresponding to where the images to be streamed were captured is provided along with a UV map 1053. In accordance with the second format a frame or frames 1057 are encoded to include image content 1058 corresponding to a non-occluded portion of the environment and image content 1060 corresponding to occluded portions of the environment. While in FIG. 10 the upper portion of the frame 1057 is shown providing non-occluded image content and the lower portion of the frame providing occluded image content other configurations are possible, e.g., with occluded image content being provided on both the top and bottom or left and right portions of the frame. In some embodiments the non-occluded image portions correspond to a contiguous area in the frame 1057 while occluded image content may be located at various locations, e.g., left and right sides, bottom and top of the frame. Using a contiguous portion of the frame 1057 for non-occluded image data is not mandatory but may facilitate extraction and application of the non-occluded image portions to the environmental model. In the second stream format, since the communicated frames include both non-occluded image content corresponding to the primary viewing area and occluded image content, the UV map 1053 includes a first portion 1054 indicating a mapping of the non-occluded image content to segments of the mesh model 1052 and a second portion 1056 indicating a mapping of occluded image portions to segments of the mesh model 1052.

Figure 11:
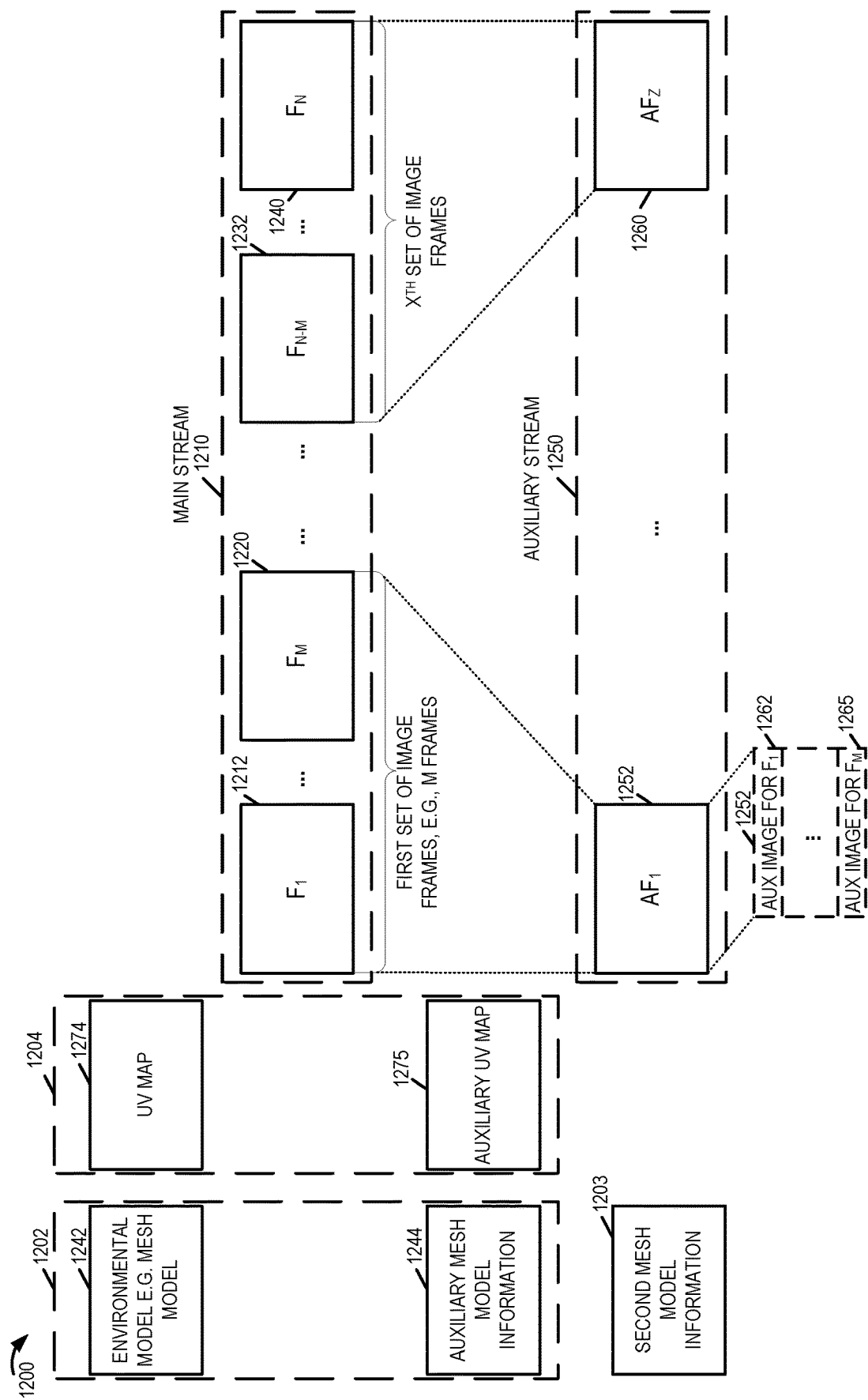
FIG. 11 illustrates a third stream format which is used to serve, e.g., stream or download content, which includes non-occluded image portions being transmitted in frames of a main or primary content stream and occluded image portions in an auxiliary stream.

FIG. 11 shows a third stream format 1200 which is used to serve, e.g., stream or download content, which includes non-occluded image portions being transmitted in frames of a main or primary content stream 1210 and occluded image portions in an auxiliary stream 1250. In order facilitate use the main stream frames 1212, 1220 providing non-occluded image content and corresponding auxiliary stream frames 1252 providing occluded image content, a playback device is the playback device, is supplied as part of the third stream format environmental mesh model information in the form of a second mesh module 1203 which includes segments for non-occluded and occluded portions of the environment or information sufficient to construct such a model 1203 or information 1202 sufficient to generate such a model. The information 1202 sufficient to form such a model 1203 includes a mesh model 1242 of the surfaces visible from the default viewing location, e.g., non-occluded surfaces, and auxiliary mesh model information 1244 which provides information on how to add nodes and/or segments to the mesh model 1242 to generate the second mesh model 1203.

In addition in the case of the third stream format since different frames are used to supply primary non-occluded image content to be used as textures and an auxiliary stream is used to supply frames which provide occluded image content to be used as textures, separate UV maps 1274, 1275 are provided. UV map 1274 provides information on how to map segments of a transmitted frame onto segments, of the second mesh model 1203, corresponding to non-occluded portions of the environment. Auxiliary UV map 1275 includes information on how to map a segment of a transmitted auxiliary frame onto segments of one or more non-occluded segments of the mesh model 1203.

In the FIG. 11 embodiment for each M frames (1212, 1220) (1232, 1240) of primary non-occluded image content, one auxiliary frame 1252, 1260 with occluded image content is generated and included in the auxiliary content stream 1250. For transmission purposes the frames of the main stream 1210 corresponding to a program and the frames of the auxiliary stream 1250 corresponding to the same program may be and often are multiplexed. Thus a content stream corresponding to a program may include data corresponding to a main stream 1210 and another set of data corresponding to auxiliary stream 1250. The content of the streams 1210, 1250 may be, and often is, packetized with a multiplexer mixing the packets together but with the streams to which they correspond being identifiable from the use of different stream ideas included in the packet headers of different packets. On playback the content of the streams 1210 and 1250 can be easily demultiplexed based on the stream identification information communicated with the packets of each stream.

While M maybe 1 or greater it is normally at least 5 or larger since the amount of occluded image data is usually ⅕ or less than the amount of primary frame data for each primary frame. Since the main stream 1210 includes M frames for each frame of the auxiliary stream 1250, the frame rate of the main stream 1210 will be M times the frame rate of the auxiliary stream 1250. In cases where a single auxiliary frame includes auxiliary image content for multiple frames, the auxiliary content corresponding to different primary frame $F_1$ 1212 to $F_M$ 1220 may be arranged in a predetermined manner into a single auxiliary frame $AF_1$ 1252. For example, as shown in FIG. 11, the auxiliary frame $AF_1$ 1252 includes auxiliary image content for frame $F_1$ 1262 and each of the other frames in the first set of M frames. Thus, auxiliary frame $AF_1$ includes auxiliary image data 1262 for primary frame $F_1$, image data for other frames in the first set as represented by the use of three dots, and auxiliary data 1265 for primary frame $F_M$ 1220.

In some embodiments playback device uses different decoders for decoding the main and auxiliary encoded frames. While a hardware decoder or graphics processor is often used in a playback device such as a cell phone to decode the frames 1212, 1220, 1232, 1240 of the primary content stream providing non-occluded image data, the general purpose processor of the decoder is configured to decode the lower rate frames of the auxiliary stream 1250. In other cases where the hardware decoder is fast enough, it can be used in the playback device to switch between decoding encoded frames of the main stream 1210 and encoded frames 1250 of the auxiliary stream. Given that a slower decoder, e.g., slower than the decoder used to decode frames of the main stream, maybe used to decode the auxiliary frames in some embodiments the auxiliary frame 1252 corresponding to a set of primary frames (1212, 1220) is sent to the playback device prior to the corresponding set of primary frames to make sure that the auxiliary image content is available in decoded form at the same time as the corresponding primary frame with which it is to be used.

FIG. 8 illustrates a content serving method 900 that maybe implemented by a server in accordance with one exemplary embodiment of the present invention. While operation of the exemplary content server will be described in the context of an example where the server stores and can provide, e.g., content in each of the first, second and third stream formats it should be appreciated that the sever need not support all formats and, depending on the embodiment may support a single one of the first, second or third formats or two of the three formats.

The method 900 starts in step 902, e.g., with a serving routine being loaded and executed by a processor of the content server implementing the method. Operation proceeds from start step 902 to monitoring step 904 in which the server monitors for content requests, e.g., from playback systems and/or devices at one or more different customer premises In step 906 a request for content is received from a playback device. Depending on the information available to the playback device the device may indicate in the content request a particular content title leaving it up to the server to select which format to stream or the playback device can identify a specific content stream, e.g., a content stream corresponding to a user selected title and in a content stream format selected by the playback device. From a device identifier included in or sent with the content request or from device capability information provided by the playback device, the server can determine if the playback device can support the display of occluded data and if so whether the first and/or second stream formats can be supported. The server may also know the data rate of the channel that can be used to serve the playback device from information provided by the playback device or from monitoring of the network connection between the server and playback device.

With a content request having been received, operation proceeds from step 906 to step 908. In step 908 the server determines the environmental model information, UV map or UV maps to be provided and which content stream or streams to supply to the playback device in response to the received request. The decision maybe and sometimes is based on the capabilities of the playback device and/or the data rate to the playback device that can be supported for content delivery.

Step 908 includes one or more substeps. In the FIG. 8 example, step 908 begins with substep 910 in which a check is made to determine if the received content request includes a content identifier identify a content in a specific stream format. For example is a stream identifier corresponding to requested content was included in the content request, the answer to question 910 would be yes and operation would proceed from step 910 to 922. In step 922 the stream format to be used would be set to match the stream format of the specific content stream indicated in the content request, e.g., the stream format to be used would be set to the one of the first, second or third stream formats that matches the format of the specifically requested stream. Operation proceeds from step 922 to step 930.

If the content request does not specifically identify a content stream having a particular format, operation proceeds from step 910 to step 912 in which device capability is checked to determine if the playback device from which the request was received supports processing and display of occluded image data. Such a determination can be made based on device capability information included in the request, e.g., device capability indicating support for the first, second and/or third stream formats and/or by looking up capability information based on the identifier of the playback device included in the received request.

In step 912 if it is determined that the playback device requesting content does not support the processing and display of occluded image data operation proceeds to from step 912 to step 914. In step 914 it is determined that the first stream format, e.g., the format which does not supply occluded image data, is to be used. Operation then proceeds from step 914 to step 924 in which the stream format to be used is set to the first stream format and then operation proceeds to step 930.

If in step 912 it is determined that the playback device which sent the request supports the processing and display of occluded image content, operation proceeds from step 912 to step 916 in which the server determines if the playback device processing of content streams in the third stream format, e.g., the format in which a primary and auxiliary content stream are provided in a multiplexed stream, e.g., program stream including the primary stream, auxiliary stream and one or more other streams such as audio streams.

Because the third format involves transmission of a primary frame stream and an auxiliary data stream providing occluded image content it normally requires a high data transmission rate than the second data stream format to support content delivery. If in step 916 it is determined that the third stream format can be supported by the playback device operation proceeds to step 918. In step 918, a check is made to determine if the data rate required for a content stream in the third format available for use in delivering content to the requesting playback device. This can be determined based on data rate information received from another device, determined by the server and/or reported from the playback device requesting the content. If in step 918 it is determined that the data rate required for the third stream format can be supported, operation proceeds to step 926 where the stream format to be used is set to the third stream format prior to operation proceeding to step 930. If in step 918 it is determined that the data rate required to support the third stream format is not available to the playback device from which the request was received, operation proceeds to step 920. Also, if in step 920 it was determined that the playback device requesting content does not support the third stream format, operation proceeds from step 916 to step 920 in which it is determined that the second stream format is to be used. Operation proceeds from step 920 to step 928. In step 928 the stream format to be used is set to the second stream format and then operation proceeds to step 930.

In step 930 a content set corresponding to the determined stream format to be used and requested content is accessed, e.g., retrieved from memory. If the determined stream format to be used is the first stream format the content set in FIG. 9 is accessed. If the determined stream format to be used is the second stream format the content set in FIG. 10 is accessed. If the determined stream format to be used is the third stream format the content set in FIG. 11 is accessed.

Operation proceeds from step 930 to step 932 in which the UV map information, e.g., UV map or maps, from the accessed content set is sent to the playback device. Operation proceeds from step 932 to step 934 in which the environmental model information, e.g., environmental model or models, is sent to the playback device. The playback device can use the transmitted UV map information and model information to render images using content, e.g., frames, transmitted from the accessed set of content corresponding to the requested program.

From step 934 operation proceeds to step 936 in which frames corresponding to the requested content are transmitted in accordance with the determined stream format. In the case of the third stream format, in step 938 which is preformed when the third stream format is used, frames of main image data will be multiplexed with auxiliary frames providing occluded image data.

Operation is shown proceeding form step 936 to step 904 to show that monitoring for requests occurs on an ongoing basis. As requests are received, they are processed and the content is supplied to the requesting playback device.

As a result of serving different devices and their content requests, the steps of FIG. 900 maybe implemented in response to a content from a first device which does not support use of occluded image data in which case in step 936 the first device would be stream a content stream corresponding to the first stream format. A second device which supports the second content stream format and use of occluded image data but not the third format would be responded to differently when the same content is requested but the stream format is not specified. For example if the second device requested the same program as the first device it would be provided the program content stream which complies with the second stream format. If a third device supporting a high data rate and the third content stream format requested the same program it would be responded to with the server providing the requested program content in the third content stream format. Thus the server may and sometimes does supply content corresponding to the same program in different content stream formats to different devices at the same time depending on the devices capabilities and/or the data rates that can be used to deliver content to the devices. The processing described with regard to FIGS. 7 and 8 is performed under control of a processor in some embodiments. Accordingly, in some embodiments the image processing system includes a processor configured to control the processing system to implement the steps shown in FIGS. 7 and 8. The transmission and receiving steps are performed via the interfaces (which include transmitters and receivers) of the playback devices.

Figure 12:
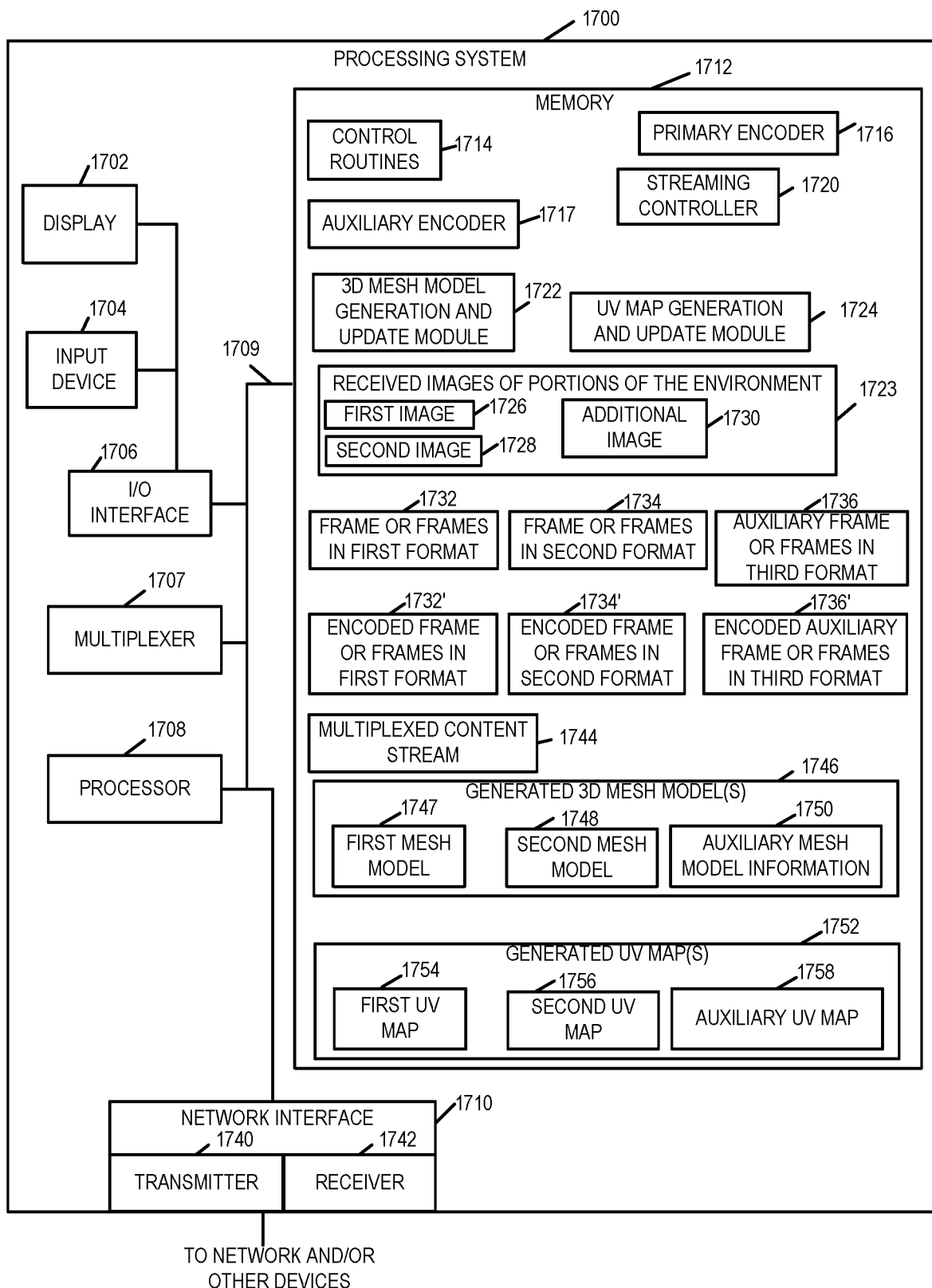
FIG. 12 illustrates an exemplary processing system implemented in accordance with an exemplary embodiment.

FIG. 12 illustrates an exemplary processing system 1700 in accordance with the features of the invention. The processing system 1700 can be used to implement one or more steps of the method of flowcharts 700 and/or 900. The processing system 1700 includes encoding capability that can be used to encode and stream imaging content in a variety of formats. The exemplary processing system 1700 may be used as the processing system 608 of system 600.

The processing system 1700 may be, and in some embodiments is, used to generate environmental models, UV maps, and image content that can be used for 3D image rendering, storage, and transmission and/or content output in accordance with the features of the invention. The processing system 1700 may also include the ability to decode and display processed and/or encoded image data, e.g., to an operator.

The system 1700 includes a display 1702, input device 1704, input/output (I/O) interface 1706, a multiplexer 1707, a processor 1708, network interface 1710 and a memory 1712. The various components of the system 1700 are coupled together via bus 1709 which allows for data to be communicated between the components of the system 1700.

The memory 1712 includes various routines and modules which when executed by the processor 1708 control the system 1700 to implement the composite environmental depth map generation, environmental depth map reconciling, encoding, storage, and streaming/transmission and/or output operations in accordance with the invention.

The display device 1702 may be, and in some embodiments is, a touch screen, used to display images, video, information regarding the configuration of the processing system 1700, and/or indicate status of the processing being performed on the processing device. In the case where the display device 602 is a touch screen, the display device 602 serves as an additional input device and/or as an alternative to the separate input device, e.g., buttons, 1706. The input device 1704 may be, and in some embodiments is, e.g., keypad, touch screen, or similar device that may be used for inputting information, data and/or instructions.

Via the I/O interface 1706 the processing system 1700 may be coupled to external devices and exchange information and signaling with such external devices, e.g., such as the camera rig 801 and/or other camera rigs shown in the figures and/or other external cameras. The I/O interface 1606 includes a transmitter and a receiver. In some embodiments via the I/O interface 1706 the processing system 1700 receives images captured by various cameras, e.g., stereoscopic camera pairs and/or light field cameras, which may be part of a camera rig such as camera rig 801. In some embodiments the cameras providing images to the system 1700 are positioned at different locations and thus provide image of portions of an environment of interest captured from different locations.

The multiplexer 1707 is configured to multiplex various frames including image content to generate the multiplexed content stream 1744. In some embodiments the multiplexer 1707 is configured to multiplex a frame in first format (e.g., 1732') and an auxiliary frame (e.g., 1736'). In some embodiments the multiplexer 1707 is configured, as part of being configured to multiplex the first frame and the auxiliary frame, to incorporate the auxiliary frame in the multiplexed content stream before the first frame such that a device receiving the multiplexed content stream will receive said auxiliary frame before the first frame.

The processor 1708, e.g., a CPU, executes routines 1714 and uses the various modules to control the system 1700 to operate in accordance with the invention. The processor 1708 is responsible for controlling the overall general operation of the system 1700, e.g., by controlling the processing system to perform a set of operations in accordance with the invention, e.g., such as discussed in detail in the flowcharts 700 and 900. In various embodiments the processor 1708 is configured to perform functions that have been discussed as being performed by the processing system 1700.

The network interface 1710 allows the processing system 1700 to be able to receive and/or communicate information to an external device over a communications network, e.g., such as communications network 105. The network interface 1710 includes a transmitter 1740 and a receiver 1742. The transmitter 1740 allows the processing system 1700 to transmit, e.g., broadcast and/or unicast, encoded image content to various customer devices. In some embodiments the processing system 1700 transmits different portions of a scene, e.g., 180 degree front portion, left rear portion, right rear portion etc., to customer devices via the transmitter 1740. Furthermore, in some embodiments via the transmitter 1740 the processing system 1700 also transmits an environmental depth map, one or more 3D environmental mesh models, one or more UV maps, and/or image content, e.g., stereoscopic imaging content, to individual customer devices. In some embodiments the transmitter 1740 is configured to transmit the multiplexed content stream 1744 including the first frame in a primary content stream and the auxiliary frame in an auxiliary content stream, to one or more playback devices.

The memory 1712 includes various modules and routines, which when executed by the processor 1708 control the operation of the system 1700 in accordance with the invention. The processor 1708, e.g., a CPU, executes control routines and uses data/information stored in memory 1712 to control the system 1700 to operate in accordance with the invention and implement one or more steps of the method of flowchart of FIGS. 7 and 8.

The memory 1712 includes control routines 1714, a primary image encoder 1716, an auxiliary encoder 1717, streaming controller 1720, a 3D mesh model generation and update module 1722, a UV map generation and update module 1722, received images 1723 of environment of interest captured by one or more cameras, generated frames of image content including frame of frames in first format 1732, frame of frames in second format 1734, and auxiliary frame of frames in third format 1736, encoded image content including encoded frame of frames in first format 1732', encoded frame of frames in second format 1734', and encoded auxiliary frame of frames in third format 1736', multiplexed content stream 1744, generated environmental mesh models 1746, generated UV map(s) 1752.

In some embodiments the modules are, implemented as software modules. In other embodiments the modules are implemented outside the memory 1712 in hardware, e.g., as individual circuits with each module being implemented as a circuit for performing the function to which the module corresponds. In still other embodiments the modules are implemented using a combination of software and hardware. In the embodiments where one or more modules are implemented as software modules or routines, the modules and/or routines are executed by the processor 1708 to control the system 1700 to operate in accordance with the invention and implement one or more operations discussed with regard to flowcharts 700 and/or 900.

The control routines 1714 include device control routines and communications routines to control the operation of the processing system 1700. The primary encoder 1716 may, and in some embodiments do, include a plurality of encoders configured to encode received image content, e.g., stereoscopic images of a scene and/or one or more scene portions, in accordance with the features of the invention. In some embodiments the primary encoder 1716 is configured to encode frame or frames in the first format and frame or frames encoded in the second format. The encoded frame or frames in the first and second format 1732' and 1734' are output of the primary encoder 1716 which are stored in the memory for streaming to customer devices, e.g., playback devices. In some embodiments the auxiliary encoder 1717 is configured to encode frame or frames in the third format to output the encoded frame or frames in the third format 1736'. The encoded content can be streamed to one or multiple different devices via the network interface 1710 in some embodiments.

The streaming controller 1720 is configured to control streaming of encoded content for delivering the encoded image content to one or more customer playback devices, e.g., over the communications network 605. In various embodiments the streaming controller 1720 is further configured to communicate, e.g., control transmission via the transmitter 1740, one or more environmental mesh models and UV maps to one or more customer playback devices, e.g., via the network interface 1710.

The 3D environmental mesh model generation and update module 1722 is configured to generate the various types of 3D environmental mesh models in accordance with the features of the present invention as discussed in detail with regard to flowchart 700. In some embodiments the generated 3D mesh model(s) 1746, which is the output of the 3D environmental mesh model generation and update module 1722, includes one or more 3D mesh models generated by module 1722 including a first environmental mesh model 1747, a second environmental mesh model 1748 and auxiliary environmental mesh model information 1750. The UV map generation and update module 1722 is configured to generate UV maps in accordance with the features of the invention to be used in wrapping frames onto a corresponding 3D environmental mesh model. The generated UV map(s) 1752, which is the output of the UV map generation module 1722, includes a first UV map 1754, second UV map 1756 and auxiliary UV map 1758. In some embodiments the modules are configured to perform the functions corresponding to various steps discussed in FIGS. 7 and 8.

Received images 1723 includes images received from one or more cameras, e.g., such as those included in the rig 801 or other cameras deployed to capture images in an environment of interest. The received images 1723 includes a first image 1726 corresponding to a portion of an environment, said first image including a non-occluded image portion corresponding to a portion of the environment visible from a first location, a second image 1728 corresponding to a portion of an environment from the second camera, said second image including a second non-occluded image portion corresponding to the portion of the environment visible from the first location and an additional image 1730 of the environment including at least a first occluded image portion corresponding to a portion of the environment occluded from view from said first location In some embodiments the processor 1708 is configured to control the image processing system 1700 to implement the steps shown in FIGS. 7 and 8. The transmission and receiving steps are performed via the interfaces (which include transmitters and receivers) of the playback devices. In some embodiments the processor 1708 is configured to control the system 1700 to receive (e.g., via interface 1706 or via receiver 1742) a first image corresponding to a portion of an environment, said first image including a non-occluded image portion corresponding to a portion of the environment visible from a first location, receive (e.g., via interface 1706 or via receiver 1742) an additional image of the environment including at least a first occluded image portion corresponding to a portion of the environment occluded from view from said first location, generate a first frame including image content from said non-occluded image portion of said first image and image content from said first occluded image portion of the additional image; and store (e.g., in memory 1712) said first frame in a storage device or transmit said first frame to another device.

Figures 13, 13B:
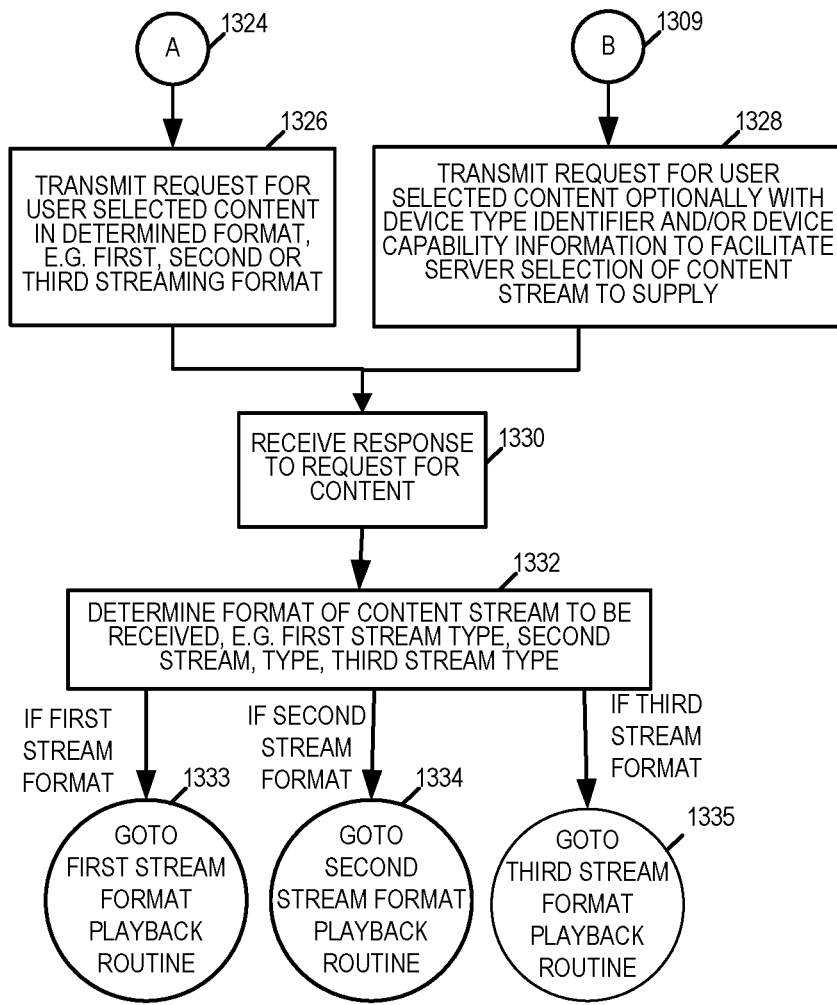
FIG. 13B is a second part of FIG. 13 which illustrates a flowchart of an exemplary method of operating the rendering and playback device.
FIG. 13 comprises the combination of FIGS. 13A and 13B.
Figure 13A:
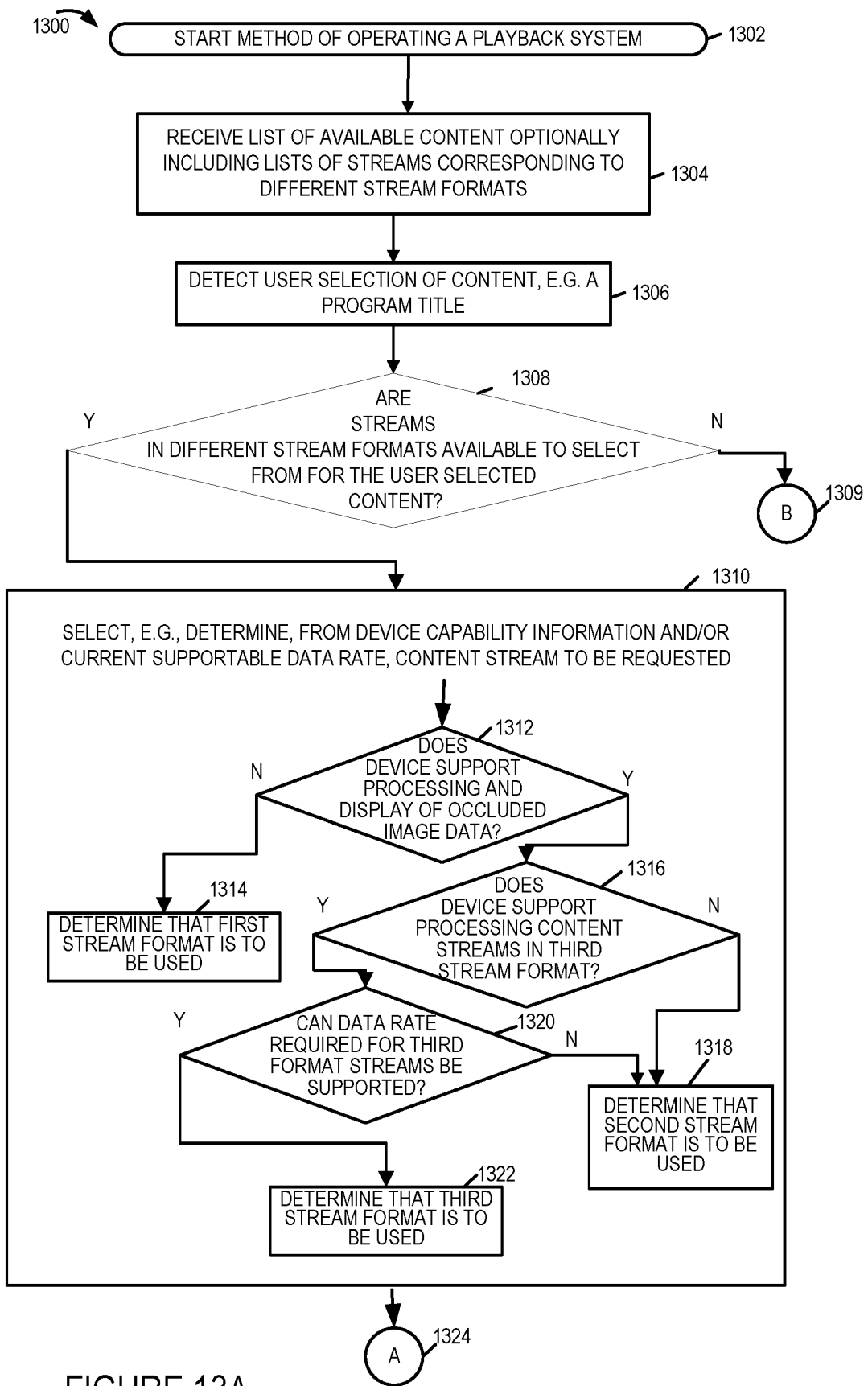
FIG. 13A is a first part of FIG. 13 which illustrates a flowchart of an exemplary method of operating an exemplary rendering and playback device in accordance with an exemplary embodiment.

FIG. 13, which comprises the combination of FIGS. 13A and 13B, illustrates the steps of a method 1300 of operating a playback device in one exemplary embodiment. In some embodiments the playback and rendering system 1900 is used to implement the steps of the method of flowchart 1300. In the FIG. 13 exemplary embodiment the playback device receives information, e.g., available content stream information, indicating various content streams available for delivery that the playback device may request.

The method of flowchart 1300 begins in start step 1302 with a playback device, e.g., such as a game console and display or head mounted display assembly, being powered on and set to begin receiving, storing and processing 3D related image data and information, e.g., frames representing texture information, environmental model information and/or UV maps to be used in rendering images. Operation proceeds from start step 1302 to step 1304 in which information communicating a list of available content streams optionally including list of streams corresponding to different stream formats is received, e.g., from the processing system, and stored, e.g., in memory. The list of content includes, e.g., information indicating various content items, e.g., titles, available that the playback device can request to be streamed for playback. Each title may be available in a variety of stream formats. While stream formats information, e.g., the list of streams corresponding to different stream formats, may be communicated by the processing system to the playback device in some embodiments it may not always be the case.

In step 1306 the playback device which normally monitors for user input detects user selection of content, e.g., user selection of a title. Operation proceeds from step 1306 to step 1308 in which the playback device determines if streams in different stream formats are available to select from for the user selected content, e.g., the playback device determines whether user selected content is available in more than one stream format. The playback device may be able to make the determination based on stream formats information if such information was received by the playback device. If such information is available to the playback device and the device determines that user selected content in available in multiple stream formats the operation proceeds to step 1310.

First referring to the processing along the path of step 1310, in step 1310 the playback device determines, based on device capability information and/or current data rate supportable by the playback device, a content stream to be requested, e.g., from the different available streams in different stream formats. As part of step 1310 in some embodiments the playback device performs one or more of 1312 through 1322. In step 1312 the device checks if processing and display of occluded image data is supported by the playback device, e.g., based on device capability, current processing power and/or hardware and/or software availability or other constraints. If it is determined that for whatever reasons at that point in time processing and display of occluded image data is not supported or desired by the playback device the operation proceeds from step 1312 to step 1314 where the playback device determines and decides that the first stream format is to be used and thus a stream supporting the first stream format for the user selected content is to be requested.

If however in step 1312 it is determined that processing and display of occluded image data is supported by the playback device, the operation proceeds from step 1312 to step 1316 wherein it is determined whether the playback device supports processing content streams in third stream format, e.g., third stream format being a format supporting a multiplex of sub-streams with a first sub-stream providing content corresponding to main, e.g., non-occluded data, and another sub-stream providing content corresponding to occluded data. If it is determined that the playback device does not support third stream format the processing proceeds from step 1316 to step 1318 wherein it is determined that the second stream format is to be used. If in step 1316 it is determined that the playback device supports the third stream format the processing proceeds to step 1320 wherein the device checks if the data rate required for receiving and processing content stream in the third stream format can be supported at the given time. If it is determined that such data rate can be supported the processing proceeds from step 1320 to step 1322, otherwise, the operation proceeds to step 1318. In step 1322 it is determined that the third stream format is to be used thereby concluding the determination step 1310.

Following the determination regarding the content stream to be requested the operation proceeds from step 1310 to step 1326 via connecting node A 1324. In step 1326 the playback device transmits a request for user selected content in determined format, e.g., first, second or third stream format, as determined in accordance with step 1310. Operation proceeds from step 1326 to step 1330.

Returning to step 1308. If in step 1308 it is determined that streams in different stream formats are mot available to select from for the user selected content and/or if the playback device is unable to make the determination of step 1308 due to unavailability of stream format information the operation proceeds from step 1308 to step 1328 via connecting node B 1309. In step 1328 the playback device transmits a request for user selected content, optionally with a device type identifier and/or device capability information to facilitate server selection of content stream to supply. Operation proceeds from step 1328 to step 1330.

In step 1330 a response to the request for content is received by the playback device, e.g., from the processing server acknowledging that the request for user selected content was received. Operation proceeds from step 1330 to step 1332. In step 1332 the playback device determines the format of the content stream to be received, e.g., corresponding to first stream format, second stream format, or third stream format. Upon determining the stream type to be received the playback device configures its hardware, software and/or firmware to allow the playback device to receive, decode and process the content stream.

Figure 14:
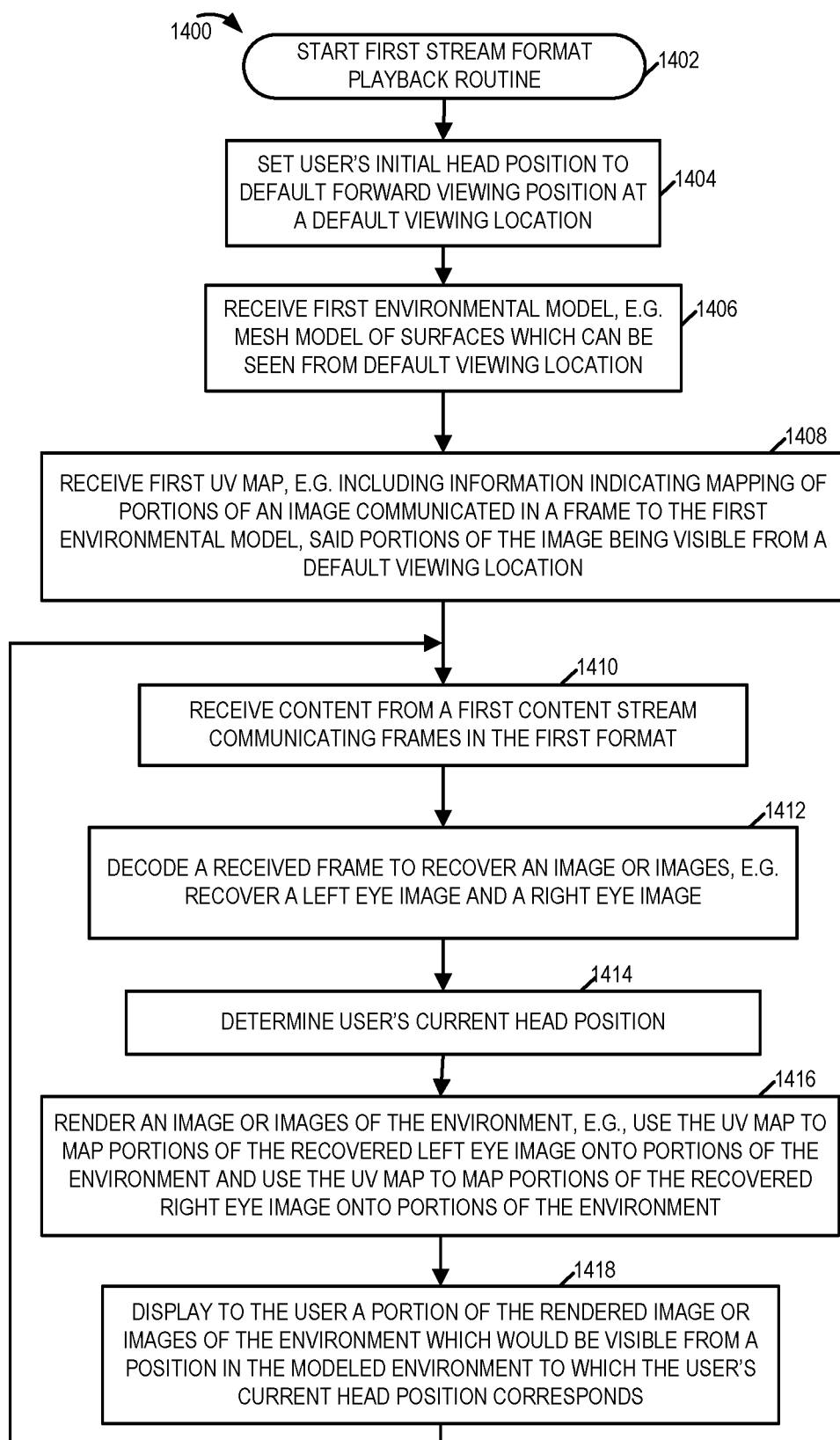
FIG. 14 illustrates the steps of an exemplary first stream format playback routine which is implemented by the playback device of the present invention as part of performing the method of FIG. 13.

Depending on the type of content stream format in which the content stream is to be received the operation proceeds along one of the three paths corresponding to steps 1333, 1334 and 1335 as illustrated. If the user selected content is to be received in a content stream in the first stream format, the operation proceeds from step 1332 to step 1333 wherein the first stream format playback routine is invoked which is illustrated in FIG. 14 discussed in detail below. If the user selected content is to be received in a content stream in the second stream format, the operation proceeds from step 1332 to step 1334 where the second stream format playback routine is called which is illustrated in FIG. 15. If the user selected content is to be received in a content stream in the third stream format, the operation proceeds from step 1332 to step 1335 where the third stream format playback routine is called which is illustrated in FIG. 16.

FIG. 14 illustrates the steps of an exemplary first stream format playback routine 1400 which is called and implemented by the playback device of the present invention as part of performing the method of flowchart 1300. The processing of routine 1400 begins in step 1402 with the playback device calling, e.g., executing, the first stream format playback routine 1400. Operation proceeds from step 1402 to step 1404 where the playback device sets the user's initial head position default forward viewing position at a default viewing location. The default viewing location may correspond to the initial seating position of the user facing forward from where the user would be able to view a scene in the environment of interest, e.g., including the main scene area visible from the default viewing position.

Operation proceeds from step 1404 to step 1406. In step 1406 the playback device receives a first environmental model, e.g., 3D mesh model of surfaces which can be seen from default viewing location. Operation proceeds from step 1406 to step 1408 where a first UV map, e.g., texture map including information indicating mapping of portions of an image communicated in a frame to the first environmental model is received, with the portions of the image being portions which are visible from a default viewing location.

Operation proceeds from step 1408 to step 1410. In step 1410 the playback device receives content from a first content stream communicating frames, e.g., of image content, in the first format. Next in step 1412 the playback device decodes a received frame to recover an image or images, e.g., recovering a left eye image and a right eye image in the case of receiving a frame of stereoscopic image pair.

Operation proceeds from step 1412 to step 1414 where user's current head position, e.g., head position at the given time, is determined. Operation proceeds from step 1414 to step 1416 in which the playback device renders an image or images of the environment. In various embodiments rendering an image includes using the received UV map to map portions of the recovered left and right eye images onto portions of the first environmental model. Next in step 1418 a portion of the rendered image or images of the environment which would be visible from a position in the modeled environment to which the user's current head position corresponds is displayed to the user, e.g., on a display device. Thus in this manner images corresponding to the portions of the environment which are visible from the default viewing location are rendered and displayed to the user. Operation may proceed from step 1418 back to step 1410 as indicated by the loopback and various steps may be repeated for additional received content frames.

Figure 15B:
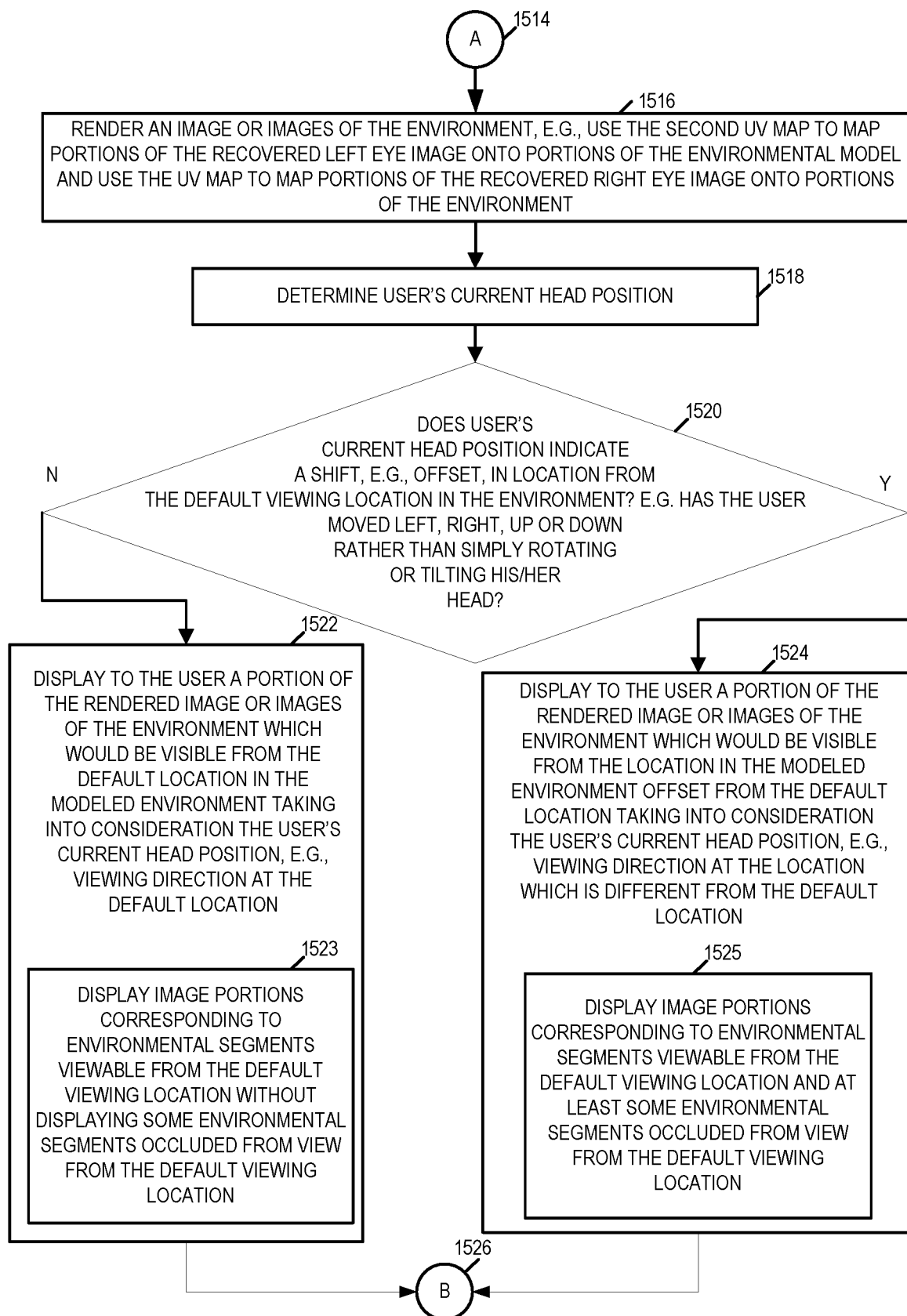
FIG. 15B is a second part of FIG. 15 which illustrates the steps of the exemplary second stream format playback routine implemented by the playback device as part of performing the method of FIG. 13.

FIG. 15, which comprises the combination of FIGS. 15A and 15B, illustrates the steps of an exemplary second stream format playback routine 1500 which is called and implemented by the playback device in some embodiments of the present invention as part of performing the method of flowchart 1300. The second stream format playback routine 1500 is called in some embodiments if the user selected content is to be received in a content stream in the second stream format. The processing of routine 1500 begins in step 1502 with the playback device calling, e.g., executing, the second stream format playback routine 1500. Operation proceeds from step 1502 to step 1504 where the playback device sets the user's initial head position default forward viewing position at the default viewing location. Operation proceeds from step 1504 to step 1506. In step 1506 the playback device receives a second environmental model, e.g., 3D mesh model of surfaces which can be seen from default viewing location and at least some portions which can not be seen from the default viewing location in the environment. It should be noted that in comparison the first 3D mesh model, the second environmental model provides additional data corresponding to portions which can not be seen from the default viewing location. Operation proceeds from step 1506 to step 1508 where the playback device receives a second UV map including information indicating mapping of portions of an image communicated in a frame having the second format to the second environmental model is received, with the portions of the image being images of portions of the environment visible from the default viewing location and portions of the environment not visible from the default viewing location but one or more other location, e.g., offset from the default viewing location. In some embodiments the second UV map optionally includes information on how to generate image content for one or more segments not visible from the default location in the absence of image content being supplied for such occluded segments.

Operation proceeds from step 1508 to step 1510. In step 1510 the playback device receives content from a second content stream communicating frames in the second format which includes image portions corresponding to at least some occluded portions of the environment. Next in step 1512 the playback device decodes a received frame of the second content stream to recover an image or images, e.g., recovering a left eye image and a right eye image in the case of receiving a frame of stereoscopic image pair.

Operation proceeds from step 1512 to step 1516 via connecting node A 1514. In step 1516 the playback device renders an image or images of the environment, e.g., using the second UV to map portions of the recovered left eye image onto portions of the second environmental model and using the second UV to map portions of the recovered right eye image onto portions of the second environmental model.

Operation proceeds from step 1516 to step 1518. In step 1518 user's current head position, e.g., head position at the given time, is determined. Next in step 1520 the playback device determines if the user's current head position indicates a shift, e.g., offset, in location from the default viewing location in the environment. For example based on determined current head position of the user it is determined if the user has moved left, right, up or down rather than simply rotating or tilting his/her head. This can be determined based on detected changes in the user's current position relative to the user's initial head position. Based on the determination of step 1520 the operation proceeds to one of the steps 1522 or 1524.

If in step 1520 it is determined that the user's current head position does not indicate a shift in location from the default viewing location in the environment the operation proceeds from step 1520 to step 1522 where the playback device displays a portion of the rendered image or images of the environment which would be visible from the default viewing location in the modeled environment taking into consideration the user's current head position, e.g., viewing direction at the default location. Thus if no shift/offset is detected in user's current head position it can be safely considered that the user has not moved from the default viewing location and accordingly image content corresponding to portions visible from the default viewing location are displayed. In some embodiments as part of step 1522 the playback device performs step 1523 where image portions corresponding to environmental segments viewable from the default viewing location are displayed without displaying some environmental segments occluded from view from the default viewing location. Operation proceeds from step 1522 back to step 1510 via connecting node B 1526 as illustrated and various steps may be repeated for additional received content frames.

On the other hand if in step 1520 it is determined that the user's current head position indicates a shift in location from the default viewing location in the environment the operation proceeds from step 1520 to step 1524 where the playback device displays a portion of the rendered image or images of the environment which would be visible from the offset location in the modeled environment offset from the default viewing location taking into consideration the user's current head position, e.g., viewing direction at the location which is different from the default viewing location. In some embodiments as part of step 1524 the playback device performs step 1525 where image portions corresponding to environmental segments viewable from the default viewing location are displayed along with at least some environmental segments occluded from view from the default viewing location. Thus if a shift/offset in user's current head position is detected, the playback device is configured to display image content corresponding to at least some environmental portions occluded from view from the default viewing location in addition to portions visible from the default viewing location. Operation proceeds from step 1524 back to step 1510 via connecting node B 1526 as illustrated and various steps may be repeated for additional received content frames.

FIG. 16, which comprises the combination of FIGS. 16A, 16B, 16C and 16D, illustrates the steps of an exemplary third stream format playback routine 1600 which is called and implemented by the playback device in some embodiments as part of performing the method of flowchart 1300. The third stream format playback routine 1600 is called in some embodiments if the user selected content is to be received in a content stream in the third stream format. The processing of routine 1600 begins in step 1602 with the playback device calling, e.g., executing, the third stream format playback routine 1600.

Operation proceeds from step 1602 to step 1604 where the playback device sets the user's initial head position default forward viewing position at the default viewing location. Operation proceeds from step 1604 to step 1606. In step 1606 the playback device receives environmental model information for surfaces visible from the default viewing location and at least some surfaces not visible from the default location, e.g., primary 3D mesh model of surfaces which can be seen from default viewing location and supplemental, e.g., auxiliary, mesh model information which can be combined with primary mesh model to generate a third environmental model. Alternatively in some embodiments the playback device receives third environmental model including nodes and segments corresponding to environmental surfaces visible from default viewing location and nodes and segments corresponding to some surfaces which are not visible from default viewing location but visible from a different viewing location offset from the default location.

Operation proceeds from step 1606 to optional step 1608 in some embodiments. Step 1608 is performed in embodiments where the playback device receives the first, e.g., primary, mesh model along with auxiliary environmental information corresponding to at least some surfaces not visible from the default location. In step 1608 the playback device generates the third mesh model of the environment by combining the primary mesh model and the auxiliary environmental model information corresponding to at least some surfaces not visible from the default location. The generated third mesh model includes nodes and segments corresponding to the environmental surfaces visible from the default viewing location and some surfaces not visible from the default location but visible from a different location such as a location offset from the default viewing location. Thus irrespective of which form the environmental information is received, the playback device gets the environmental model information for surfaces visible from the default viewing location and at least some surfaces not visible from the default location.

Operation proceeds from step 1608 (or from step 1606 in embodiments where step 1608 is skipped) to step 1612 via connecting node A 1610. In step 1612 the playback device receives primary UV map and auxiliary UV map. As part of step 1612 in some embodiments steps 1614 and 1616 are performed. In step 1614 the playback device receives a primary UV map including information indicating mapping of portions of an image communicated in a frame of a main/primary content stream, e.g., first content stream, to segments of the third environmental model which correspond to surfaces visible from the default viewing location. In step 1616 the playback device receives an auxiliary UV map including information indicating mapping of image portion communicated in an auxiliary frame to segments of the third environmental model which correspond to surfaces not visible from the default viewing location but visible from one or more other locations, e.g., offset from the default location. In some embodiments the auxiliary UV map provides mapping information for occluded objects for one or more different frames included in the primary content stream.

Operation proceeds from step 1612 to step 1620. In step 1620 the playback device receives a multiplexed content stream corresponding to the third stream format providing both the primary frame(s) and auxiliary frame(s) communicating image content. As part of receiving image content frames in step 1620 the playback device receives a frame or set of frames from primary content stream in sub-step 1622 and receives a frame or frames from the auxiliary content stream in sub-step 1624. Operation proceeds from step 1620 to step 1630 via connecting node B 1626.

In step 1630 the playback device demultiplexes the multiplexed content stream and outputs primary and auxiliary frames for further processing, e.g., decoding. To facilitate a better understanding the output of the demultiplex operation performed on the multiplexed content stream is shown as two data sets 1632 and 1642 coming out of the demultiplex step 1630. The first set of frames 1632, e.g., primary frames, includes frames 1 to M of image content corresponding to portions visible from the default viewing position while the auxiliary frame set 1642 includes auxiliary frame or frames of image content corresponding to portions not visible from the default viewing position. The two data sets 1632 and 1642 serve as input to two different decoders in some embodiments. The first set of frames 1632 is supplied to a primary decoder which may be a dedicated hardware decoder configured to decode and recover data communicated by primary frames corresponding to portions visible from the default viewing position. As shown in step 1634 the primary decoder is used to decode image content corresponding to primary frames. The output of the decoding performed by the primary decoder in step 1634 is the set of decoded primary frames 1636 including decoded frame 1 1638 to decoded frame M 1640. Operation proceeds from step 1634 to step 1656 in which the decoded primary frames 1636 serves as an input.

In some embodiments the auxiliary frame or frames 1642 is supplied to a secondary/auxiliary decoder which the playback device uses to decode and recover data communicated by auxiliary frames of image content corresponding to portions not visible from the default viewing position as shown in step 1644, e.g., providing occluded image data. The output of the decoding performed by the auxiliary decoder in step 1644 is the decoded auxiliary frame or frames 1646, e.g., frame or frames providing images of occluded segments of the environment for one or more primary frames. In the example of FIG. 16 the decoded auxiliary frame or frames 1646 includes a single decoded auxiliary (aux) frame 1648 including occluded image content corresponding to multiple primary frames. The decoded aux frame 1648 in this example is in such a format that it packs occluded image content for frame 1 1650, occluded image content for frame 2 1652, . . . , and occluded image content for frame M 1654. Operation proceeds from step 1634 to step 1656 in which the decoded aux frame 1646 serves as an input.

Figure 16A:
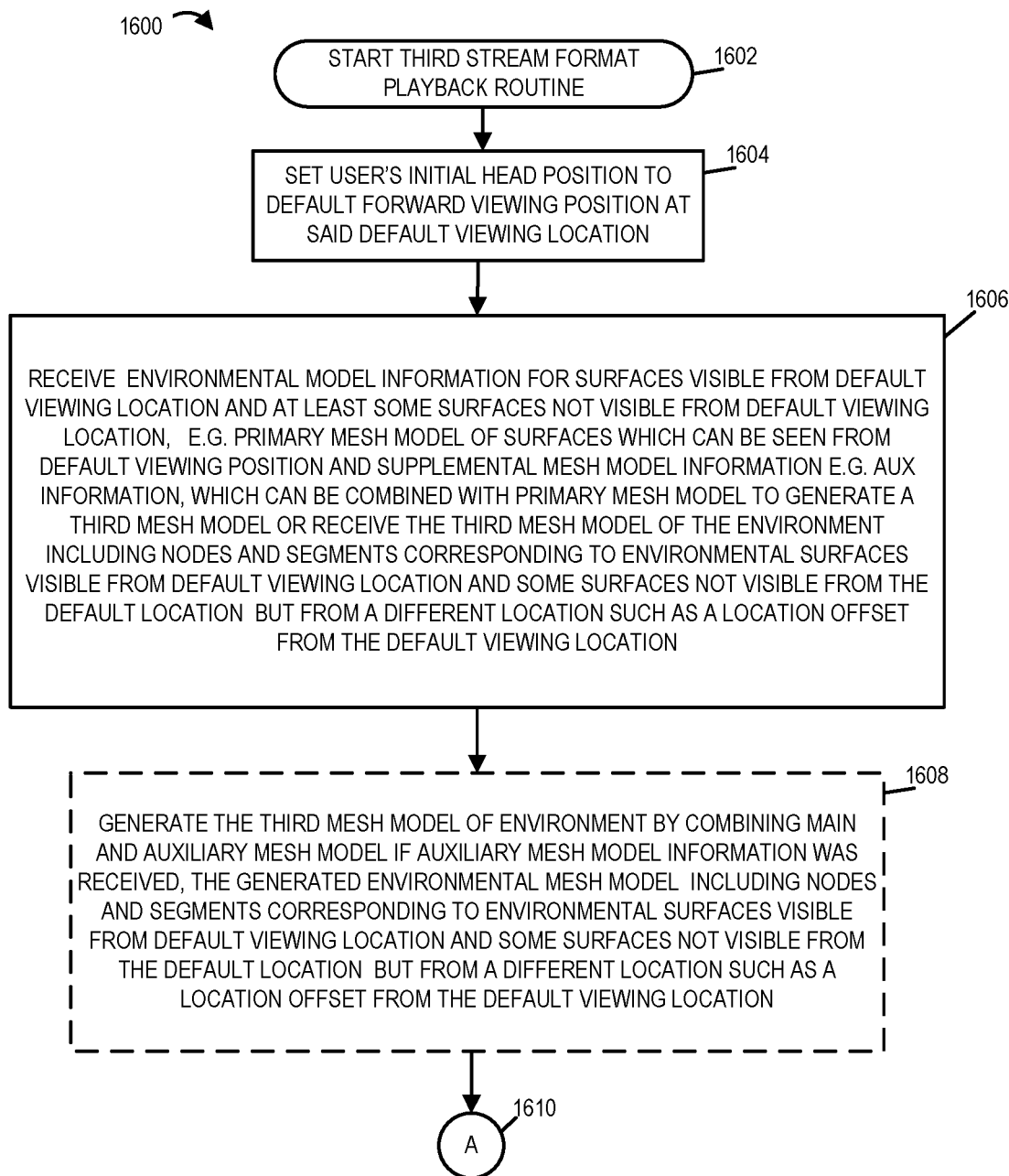
FIG. 16A is a first part of FIG. 16 which illustrates the steps of an exemplary third stream format playback routine which is implemented by the playback device as part of performing the method of FIG. 13.
Figure 16B:
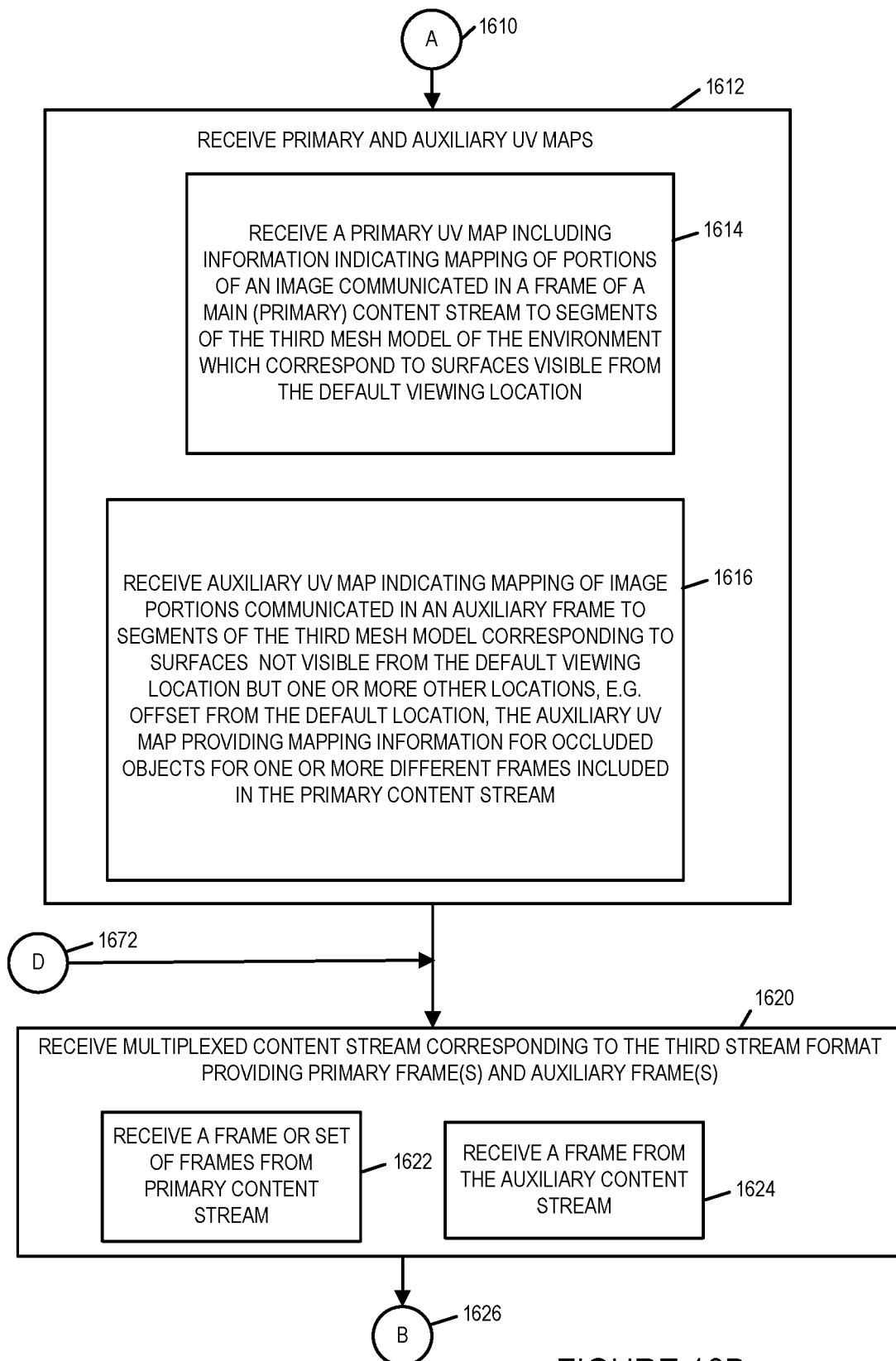
FIG. 16B is a second part of FIG. 16 which illustrates the steps of the exemplary third stream format playback routine implemented by the playback device as part of performing the method of FIG. 13.
Figure 16C:
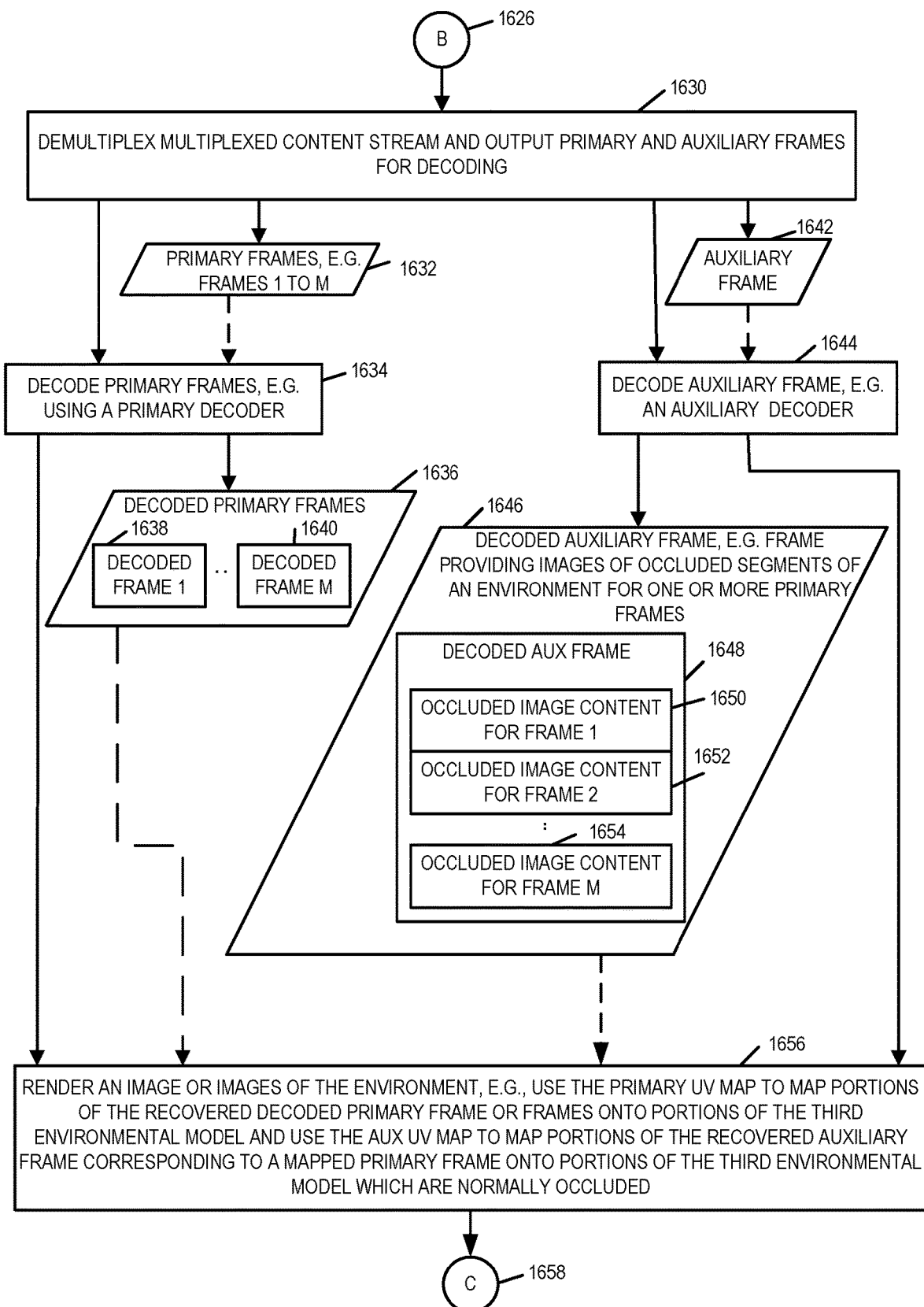
FIG. 16C is a third part of FIG. 16 which illustrates the steps of the exemplary third stream format playback routine implemented by the playback device as part of performing the method of FIG. 13.
Figure 16D:
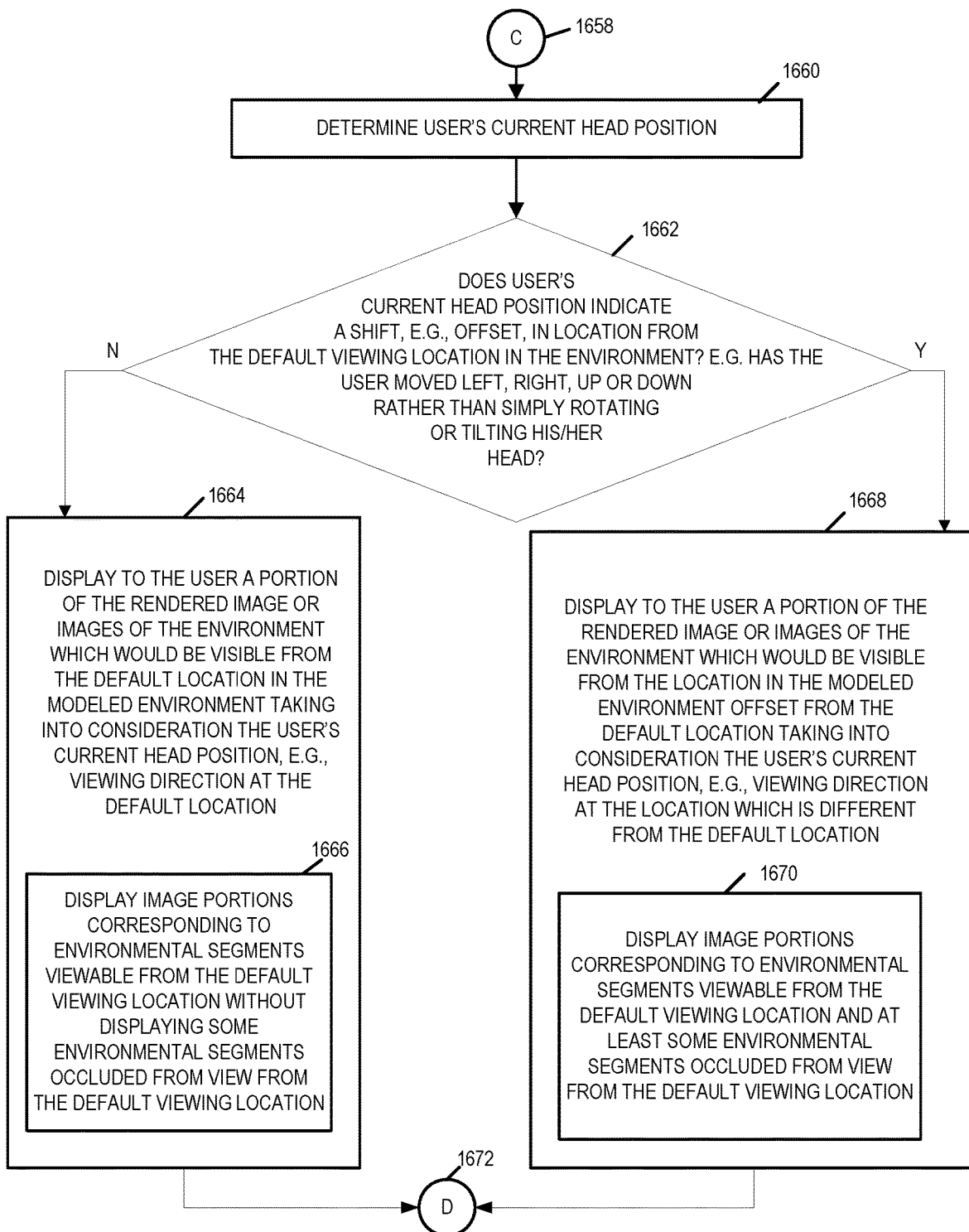
FIG. 16D is a fourth part of FIG. 16 which illustrates the steps of the exemplary third stream format playback routine implemented by the playback device as part of performing the method of FIG. 13.

While in figure the use of a primary decoder 1920 and secondary decoder 1921 are shown in FIG. 16C, in some embodiments the primary decoder 1920 is used on a time shared basis to decode both the primary and the auxiliary frame. In such embodiments the primary decoder 1920 and thus also serves as the ancillary frame decoder 1921. For such embodiments it is useful to have the primary and auxiliary frames to be of the same size to minimize the amount of decoder reconfiguration required to support switching between decoding the primary frames and decoding the auxiliary frames.

In some other embodiments the primary decoder 1920 is a different decoder, e.g., a decoder implemented as a separate processor or processor core from the auxiliary decoder. In some embodiments the primary decoder is implemented as a dedicated hardware video decoder while the auxiliary decoder is implemented on a general purpose processor, e.g., CPU, of the playback device such as the cell phone. The auxiliary decoder maybe slower and/or have less processing power than the primary decoder. In some embodiments, e.g., when the auxiliary decoder is less powerful than the primacy decoder, the auxiliary frames are of smaller size and/or include less pixels than the primary decoder. This facilitates auxiliary decoder implementation using software or a less powerful decoder than is used for the primary decoder. This is particular helpful where the playback device is a cell phone including decoder circuitry or a graphics processor which can be used as the primary decoder and also includes a general purpose processor which can be configured, e.g., under stored instructions, to operate as the auxiliary decoder.

In step 1656 the playback device renders an image or images of the environment, e.g., with the playback device using the primary UV map to map image portions included in the recovered decoded primary frame or frames onto the portions of the third environmental model and use the auxiliary UV map to map image portions included in the recovered decoded aux frame corresponding to a mapped primary frame onto the portions of the third environmental model which are normally occluded.

Operation proceeds from step 1656 to step 1660 via connecting node C 1658. In step 1660 user's current head position, e.g., head position at the given time, is determined. Next in step 1662 the playback device determines if the user's current head position indicates a shift, e.g., offset, in location from the default viewing location in the environment, e.g., determine if the user has moved left, right, up or down rather than simply rotating or tilting his/her head. Based on the determination of step 1662 the operation proceeds to one of the steps 1664 or 1668.

If in step 1662 it is determined that the user's current head position does not indicate a shift in location from the default viewing location in the environment the operation proceeds from step 1662 to step 1664 where the playback device displays to the user a portion of the rendered image or images of the environment which would be visible from the default viewing location in the modeled environment taking into consideration the user's current head position, e.g., viewing direction at the default location. In some embodiments as part of step 1664 the playback device performs step 1666 where image portions corresponding to environmental segments viewable from the default viewing location are displayed without displaying some environmental segments occluded from view from the default viewing location. Operation proceeds from step 1664 back to step 1620 via connecting node D 1672 as illustrated and various steps may be repeated for additional received content frames.

If in step 1662 it is determined that the user's current head position indicates a shift in location from the default viewing location in the environment the operation proceeds from step 1662 to step 1668 where the playback device displays a portion of the rendered image or images of the environment which would be visible from the offset location in the modeled environment offset from the default viewing location taking into consideration the user's current head position, e.g., viewing direction at the location which is different from the default viewing location. In some embodiments as part of step 1668 the playback device performs step 1670 where image portions corresponding to environmental segments viewable from the default viewing location are displayed along with at least some environmental segments occluded from view from the default viewing location. Thus if a shift/offset in user's current head position is detected, the playback device is configured to display image content corresponding to at least some environmental portions occluded from view from the default viewing location in addition to portions visible from the default viewing location. Operation proceeds from step 1668 back to step 1620 via connecting node D 1672 as illustrated and various steps may be repeated for additional received content frames.

The processing described with regard to FIG. 13 is performed under control of a playback device processor. Accordingly, in some embodiments the playback device includes a processor configured to control the playback device to implement the steps shown in FIG. 13. The transmission and receiving steps are performed via the interfaces (which include transmitters and receivers) of the playback devices.

In some embodiments the playback device includes instructions which, when executed by a processor of the playback device, control the playback device to implemented the steps shown in FIG. 13. Separate processor executable code can be and sometimes is included for each of the steps shown in FIG. 13. In other embodiments a circuit is included in the playback device for each of the individual steps shown in FIG. 13.

Figure 17:
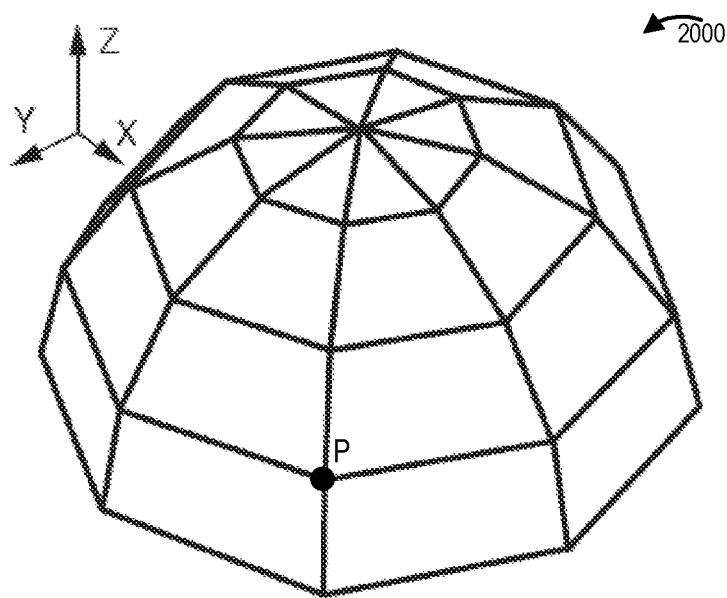
FIG. 17 illustrates an exemplary 3D environmental mesh model that may be used in various embodiments with a plurality of nodes illustrated as the point of intersection of lines used to divide the 3D model into segments.

FIG. 17 illustrates an exemplary 3D mesh model 2000 that may be used in various embodiments with a plurality of nodes illustrated as the point of intersection of lines used to divide the 3D model into segments. Note that the model of FIG. 17 is shown in 3D space and can be expressed as a set of [X,Y,Z] coordinates defining the location of the nodes in the mesh in 3D space assuming the shape of the segments is known or the rules for interconnecting the nodes is known or defined in the 3D model. In some embodiments the segments are predetermined to have the same number of sides with each node connecting to a predetermined number of adjacent nodes by straight lines. In the FIG. 17 example the top portion of the model 2000 is a set of triangular segments while the side portions are formed by a plurality of four sided segments. Such a configuration, e.g., top portion being formed of 3 sided segments and a side portion formed by 4 sided segments may be included in the information forming part of the 3D model or predetermined. Such information is provided to the customer rendering and playback devices along with or as part of the mesh model information.

Figure 18:
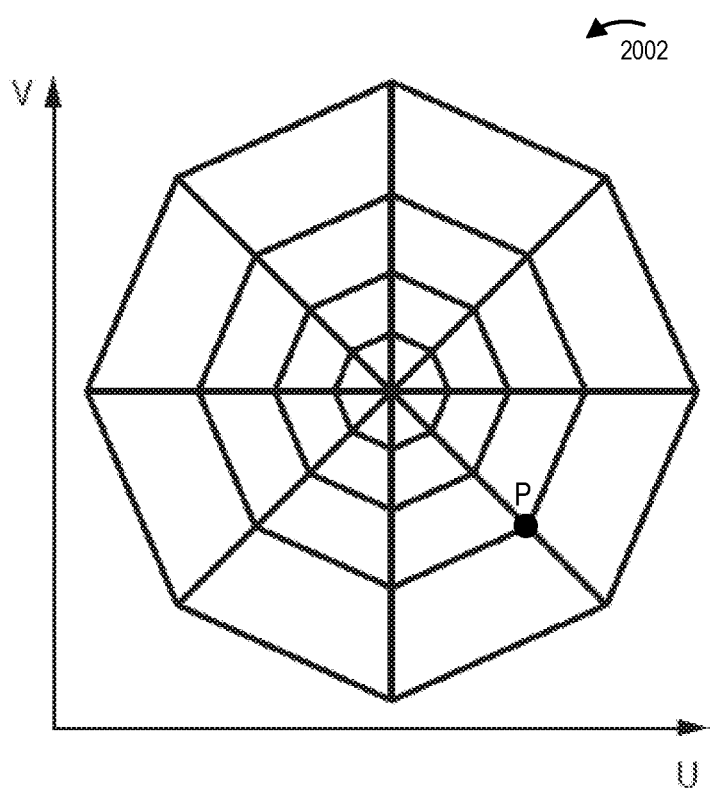
FIG. 18 illustrates an exemplary UV map that can be used for mapping portions of a 2D frame, providing a texture, to the mesh model of FIG. 17.

FIG. 18 shows an exemplary UV map 2002 which may be used in mapping a frame in what is sometimes referred to as 2D UV space to the 3D model 2000 shown in FIG. 18. Note that the UV map 2002 includes the same number of nodes and segments as in the 3D model 2000 with a one to one mapping relationship. Frames which provide what is sometimes referred to as texture, but which normally include content of images captured from the vantage point of a camera rig in a real environment, at a location corresponding to the position [0, 0, 0] within the 3D model 2000 of the simulated environment, may be applied, e.g., wrapped, on to the 3D model 2000 in accordance with the map 2002 as part of an image rendering operation.

In FIGS. 17 and 18, exemplary node P which is shown as a dot for emphasis, like each of the other mesh nodes, appears in both the UV map 2002 and the 3D model 2000. Note that the node P[X, Y, Z] corresponds to the node P[U,V], where X, Y, Z specify the position of node P in X, Y, Z space and U,V specify the location of the corresponding node P in the two dimensional space. Each U,V pair represents the X, Y of a single pixel of the 2D image texture, e.g., a frame. Surrounding pixels are mapped from the 2D frame to the 3D mesh during the rendering process by interpolating between nearby U,V pairs.

Figure 19:
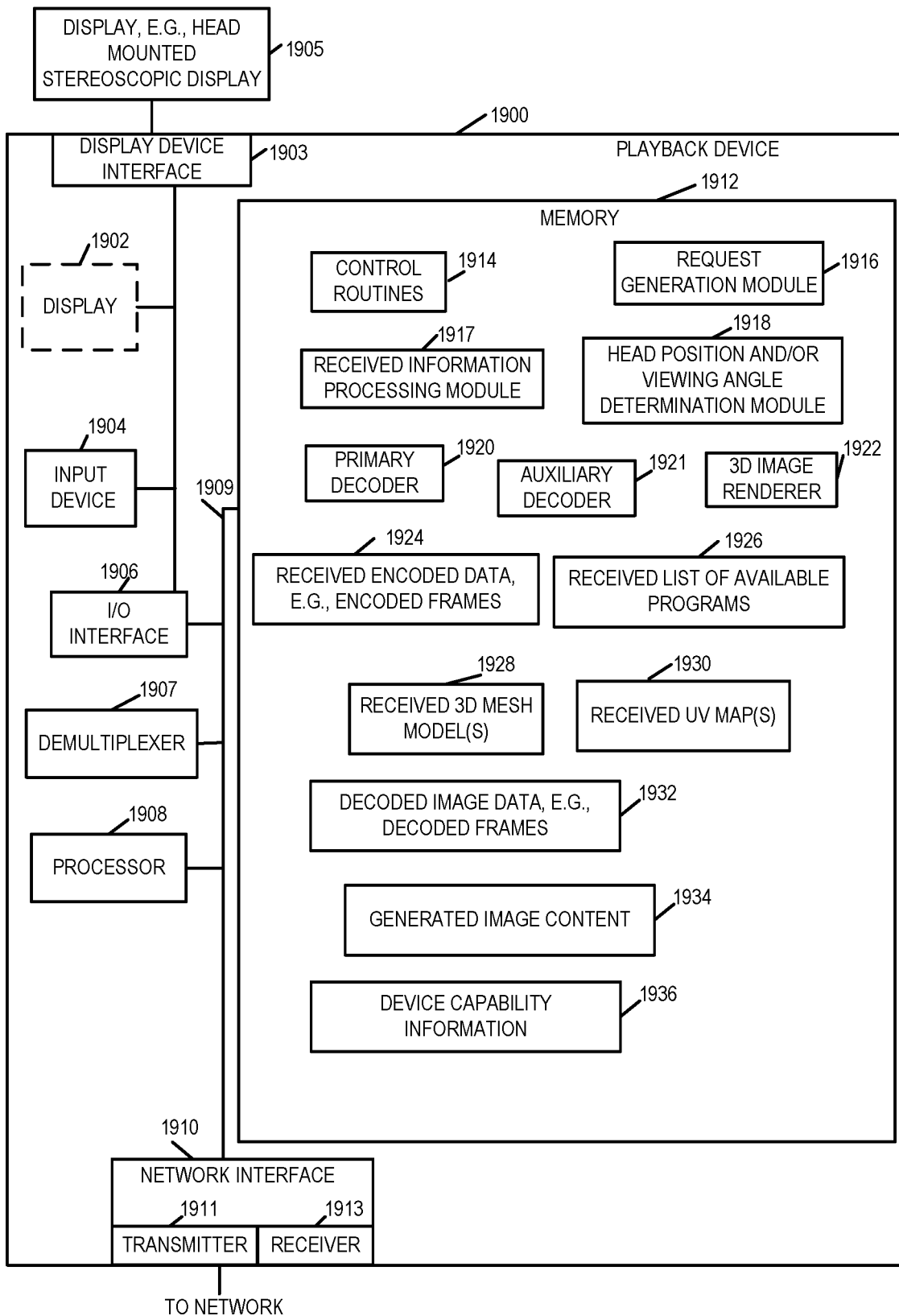
FIG. 19 illustrates an exemplary rendering and playback device implemented in accordance with an exemplary embodiment.

FIG. 19 illustrates an exemplary playback device, e.g., system, 1900 that can be used to receive, decode and display the content streamed by one or more sub-systems of the system 600 of FIG. 12, e.g., such as the processing system 608/1700. The exemplary rendering and playback system 1900 may be used as any of the rendering and playback devices shown in FIG. 12. In various embodiments the playback system 1900 is used to perform the various steps illustrated in flowcharts shown in FIGS. 13-16.

The rendering and playback system 1900 in some embodiments include and/or coupled to 3D head mounted display 1905. The system 1900 includes the ability to decode the received encoded image data and generate 3D image content for display to the customer. The playback system 1900 in some embodiments is located at a customer premise location such as a home or office but may be located at an image capture site as well. The playback system 1900 can perform reception, decoding, rendering, display and/or other operations in accordance with the invention.

The playback system 1900 includes a display 1902, a display device interface 1903, a user input interface device 1904, input/output (I/O) interface 1906, a demultiplexer 1907, a processor 1908, network interface 1910 and a memory 1912. The various components of the playback system 1900 are coupled together via bus 1909 which allows for data to be communicated between the components of the system 1900.

While in some embodiments display 1902 is included as an optional element as illustrated using the dashed box, in some embodiments an external display device 1905, e.g., a head mounted stereoscopic display device, can be coupled to the playback system 1900 via the display device interface 1903. The head mounted display 1902 maybe implemented using the OCULUS RIFT™ VR (virtual reality) headset which may include the head mounted display 1902. Other head mounted displays may also be used. The image content is presented on the display device of system 1900, e.g., with left and right eyes of a user being presented with different images in the case of stereoscopic content. By displaying different images to the left and right eyes on a single screen, e.g., on different portions of the single screen to different eyes, a single display can be used to display left and right eye images which will be perceived separately by the viewer's left and right eyes. While various embodiments contemplate a head mounted display to be used in system 1900, the methods and system can also be used with non-head mounted displays which can support 3D image.

The operator of the playback system 1900 may control one or more parameters and/or provide input via user input device 1904. The input device 1904 may be, and in some embodiments is, e.g., keypad, touch screen, or similar device that may be used for inputting information, data and/or instructions.

Via the I/O interface 1906 the playback system 1900 may be coupled to external devices and exchange information and signaling with such external devices. In some embodiments via the I/O interface 1906 the playback system 1900 receives images captured by various cameras, e.g., stereoscopic camera pairs and/or other cameras, receive 3D mesh models and UV maps.

The demultiplexer 1907 is configured to demultiplex multiplexed frames corresponding to image content communicated in a multiplexed content stream, e.g., from the processing system 1700. In some embodiments the demultiplexer 1907 is configured to demultiplex a primary content stream and an auxiliary content stream which are multiplexed.

The processor 1908, e.g., a CPU, executes routines 1914 and uses the various modules to control the system 1900 to operate in accordance with the invention. The processor 1908 is responsible for controlling the overall general operation of the system 1900, e.g., by controlling the system 1900 to perform various operations in accordance with the features of the present invention. In various embodiments the processor 1908 is configured to perform functions that have been discussed as being performed by the rendering and playback system 1900.

The network interface 1910 includes a transmitter 1911 and a receiver 1913 which allows the playback system 1900 to be able to receive and/or communicate information to an external device over a communications network, e.g., such as communications network 650. In some embodiments the playback system 1900 receives, e.g., via the interface 1910, encoded frames including image content 1924, 3D mesh model(s) 1928, UV map(s) 1930, from the processing system 1700 over the communications network 650.

The memory 1912 includes various modules, e.g., routines, which when executed by the processor 1908 control the playback system 1900 to perform operations in accordance with the invention. The memory 1912 includes control routines 1914, a request generation module 1916, a received information processing module 1917, a head position and/or viewing angle determination module 1918, a primary decoder 1920, an auxiliary decoder 1921, a 3D image renderer 1922 also referred to as a 3D image generation module, received encoded image content 1924, received list of available programs 1926, received 3D mesh model(s) 1928, received UV map(s) 1930, decoded image content 1932, generated image content 1934 and device capability information 1934.

The control routines 1914 include device control routines and communications routines to control the operation of the system 1900. The request generation module 1916 is configured to generate request for content, e.g., upon user selection of an item for playback. The received information processing module 1917 is configured to process information, e.g., image content, audio data, environmental models, UV maps etc., received by the system 1900, e.g., via the receiver of interface 1906 and/or 1910, to provide the received information to an appropriate element of the system 1900 for use in rendering and playback. The head position and/or viewing angle determination module 1918 is configured to determine a user's current head position, e.g., position of the head mounted display, in accordance with the features of the present invention.

The primary decoder 1920 is configured to decode frames received in a primary content stream, e.g., encoded frames in first format (included in the received encoded data 1924) received from the processing system 1700 to produce decoded image data corresponding to frames in first format which is stored in the memory and included in decoded data 1932. The auxiliary decoder 1921 is configured to decode auxiliary frame or frames in the third format (included in the received encoded data 1924) to produce decoded image data corresponding to frames in the third format included in decoded data 1932. In some embodiments the auxiliary decoder 1921 is slower than the primary decoder 1920.

In some other embodiments the primary decoder 1920 is used to decode a received first frame including both non-occluded image content corresponding to a portion of an environment visible from a first location in the environment and occluded image content corresponding to a portion of the environment which is not visible from said first location. In such embodiments the decoded image data 1932 includes decoded frame or frames including both non-occluded image content and occluded image content. The In various embodiments the encoded image content is decoded prior to image rendering.

The 3D image renderer 1922 uses decoded image data 1932 to generate 3D image content in accordance with the features of the invention for display to the user on the display 1902 and/or the display device 1905. In some embodiments the 3D image renderer 1922 is configured to render, using a 3D mesh model at least some of received image content. In some embodiments the 3D image renderer 1922 is further configured to use a first UV map to determine how to wrap an image included in received image content onto the first 3D mesh model. The generated image content 1934 is the output of the 3D image rendering module 1922.

The received 3D environmental mesh model(s) 1928 may include a first mesh model, a second mesh model 1928 and auxiliary mesh mode information. The received UV map(s) 1930 include a first UV map and/or a second UV map and/or an auxiliary UV map. The received encoded image content 1924 includes, e.g., frames of left and right eye image pairs of non occluded image content corresponding to a portion of an environment of interest visible from a first location in the environment and one or more auxiliary frames including occluded image content corresponding to a portion of the environment which is not visible from the first location. In some embodiments the system 1900 receives a first frame including both non-occluded image content corresponding to a portion of the environment visible from a first location in the environment and occluded image content corresponding to a portion of the environment which is not visible from said first location. Thus in some embodiments the received encoded image content 1924 includes the frame including both non-occluded image content and occluded image content.

As discussed earlier the first UV map indicates a mapping between portions of a frames including non-occluded image content to segments of a first model of the environment which correspond to portions of the environment visible from said first location while the auxiliary UV map indicates a mapping between portions of the auxiliary frame including occluded image content to segments of the first model of the environment which correspond to portions of said environment which are not visible from said first location. When a received from includes both non-occluded image content and occluded image content, a second UV map is used which indicates a mapping between portions of the frame and segments of a corresponding environmental model, e.g., second 3D mesh model. The device capability information 1936 includes information regarding the processing and/or display capability of system 1900 indicating whether the playback device 1900 is capable of supporting the display of occluded image content corresponding to portions of the environment which are not visible from the first location and/or indicating content stream formats that can be supported by the playback device 1900. In some embodiments device capability information 1936 is in the form of an identifier that can be used, e.g., by the processing system 1700, to determine capabilities of the playback device 1900.

In some embodiments some of the modules are implemented, e.g., as circuits, within the processor 1908 with other modules being implemented, e.g., as circuits, external to and coupled to the processor. Alternatively, rather than being implemented as circuits, all or some of the modules may be implemented in software and stored in the memory of the playback device 1900 with the modules controlling operation of the playback device 1900 to implement the functions corresponding to the modules when the modules are executed by a processor, e.g., processor 1908. In still other embodiments, various modules are implemented as a combination of hardware and software, e.g., with a circuit external to the processor 1908 providing input to the processor 1908 which then under software control operates to perform a portion of a module's function.

While shown in FIG. 19 example to be included in the memory 1912, the modules shown included in the memory 1912 can, and in some embodiments are, implemented fully in hardware within the processor 1908, e.g., as individual circuits. In other embodiments some of the elements are implemented, e.g., as circuits, within the processor 1908 with other elements being implemented, e.g., as circuits, external to and coupled to the processor 1908. As should be appreciated the level of integration of modules on the processor and/or with some modules being external to the processor may be one of design choice.

While shown in the FIG. 19 embodiment as a single processor 1908, e.g., computer, within device 1900, it should be appreciated that processor 1908 may be implemented as one or more processors, e.g., computers. When implemented in software, the modules include code, which when executed by the processor 1908, configure the processor, e.g., computer, to implement the function corresponding to the module. In some embodiments, processor 1908 is configured to implement each of the modules shown in memory 1912 in FIG. 19 example. In embodiments where the modules are stored in memory 1912, the memory 1912 is a computer program product, the computer program product comprising a computer readable medium, e.g., a non-transitory computer readable medium, comprising code, e.g., individual code for each module, for causing at least one computer, e.g., processor 1908, to implement the functions to which the modules correspond.

As should be appreciated, the modules illustrated in FIG. 19 control and/or configure the system 1900 or elements therein respectively such as the processor 1908 to perform the functions of corresponding steps of the methods of the present invention, e.g., such as those illustrated and/or described in the flowcharts 1300, 1400, 1500 and 1600.

In one exemplary embodiment the processor 1908 is configured to control the playback device 1900 to receive, e.g., via receiver 1913, a first frame including non-occluded image content corresponding to a portion of an environment visible from a first location in the environment and occluded image content corresponding to a portion of the environment which is not visible from said first location; detect a head position of a user, and output to a display an image of portions of the environment as a function of the detected head position.

Various additional exemplary embodiments illustrating different aspects and features of the invention will now be described.

A method embodiment 1 of operating an image processing system, the method comprising: receiving a first image corresponding to a portion of an environment, said first image including a non-occluded image portion corresponding to a portion of the environment visible from a first location; receiving an additional image of the environment including at least a first occluded image portion corresponding to a portion of the environment occluded from view from said first location; generating a first frame including image content from said non-occluded image portion of said first image and image content from said first occluded image portion of the additional image; and storing said first frame in a storage device or transmitting said first frame to another device.

A method embodiment 2 of operating an image processing system, the method embodiment 1 further comprising: generating a UV map to be used for mapping portions of said first frame to segments of an environmental model.

A method embodiment 3 of operating an image processing system, the method embodiment 1 further comprising:

generating an environmental model including segments corresponding to non-occluded surfaces of said environment and segments corresponding to occluded surfaces of said environment.

A method embodiment 4 of operating an image processing system, the method embodiment 3 wherein said UV map maps image content in said first frame corresponding to said non-occluded image portion of said first frame to a first segment of said environmental model which corresponds to a portion of said environment which is visible from said first location.

A method embodiment 5 of operating an image processing system, the method embodiment 4 wherein said UV map further maps image content in said first frame corresponding to said first occluded image portion to a second segment of said environmental model which corresponds to a portion of said environment which is not visible from said first location.

A method embodiment 6 of operating an image processing system, the method embodiment 1 wherein receiving a first image includes receiving said first image from a first camera in said environment; and receiving an additional image of the environment includes receiving said additional image from a camera at a location in said environment offset from a location at which said first camera is positioned in said environment.

A method embodiment 7 of operating an image processing system, the method embodiment 6 wherein said first camera is a camera of a stereoscopic camera pair including said first camera and said second camera, said stereoscopic camera pair being positioned at said first location, the method further comprising: receiving a second image corresponding to a portion of an environment from the second camera, said second image including a second non-occluded image portion corresponding to the portion of the environment visible from the first location.

A method embodiment 8 of operating an image processing system, the method embodiment 7 further comprising: including in said first frame at least a portion of said second image.

A method embodiment 9 of operating an image processing system, the method embodiment 1 wherein said first frame is in a second frame format, the method further comprising: generating a frame in a first frame format, said frame in the first format including image content from said non-occluded image portion of said first frame and no image content corresponding to an occluded portion of the environment; and storing said frame in the first format in the storage device.

A method embodiment 10 of operating an image processing system, the method embodiment 9 wherein the first frame and the frame in the first format correspond to a first program, the method further comprising: receiving a first request for content corresponding to the first program from a first playback device which supports the display of occluded image content; and sending said first frame in the second format to the first device in response to said first request for content.

A method embodiment 11 of operating an image processing system, the method embodiment 10 further comprising: determining from device capability information, prior to sending the first frame in the second format, that the first playback device supports the display of occluded image content.

A method embodiment 12 of operating an image processing system, the method embodiment 10 further comprising: receiving a second request for content corresponding to the first program from a second playback device which does not support the display of occluded image content; and sending said frame in the first format to the second playback device in response to said second request for content.

A method embodiment 13 of operating an image processing system, the method embodiment 12 further comprising: determining from device capability information corresponding to the second playback device, prior to sending the frame in the first format, that the second playback device does not support the display of occluded image content.

A method embodiment 14 of operating an image processing system, the method embodiment 13 wherein said first frame in the second format and the frame in the first format are the same size and include the same number of pixels.

A method embodiment 15 of operating an image processing system, the method embodiment 14 further comprising: transmitting to the second playback device an environmental model which does not include segments corresponding to portions of the environment occluded from view from the first location; and transmitting to the second playback device a UV map to be used for mapping portions of the frame in the first format to the environmental model which does not include segments corresponding to portions of the environment occluded from view from the first location.

Another exemplary embodiment includes a non-transitory computer readable medium for use in a system, said non-transitory computer readable medium including computer executable instructions which, when executed by a computer, control the system to: receive a first image corresponding to a portion of an environment, said first image including a non-occluded image portion corresponding to a portion of the environment visible from a first location; receive an additional image of the environment including at least a first occluded image portion corresponding to a portion of the environment occluded from view from said first location; generate a first frame including image content from said non-occluded image portion of said first image and image content from said first occluded image portion of the additional image; and store said first frame in a storage device or transmit said first frame to another device.

An image processing system embodiment 1 comprising: a processor configured to control said image processing system to: receive a first image corresponding to a portion of an environment, said first image including a non-occluded image portion corresponding to a portion of the environment visible from a first location; receive an additional image of the environment including at least a first occluded image portion corresponding to a portion of the environment occluded from view from said first location; generate a first frame including image content from said non-occluded image portion of said first image and image content from said first occluded image portion of the additional image; and store said first frame in a storage device or transmit said first frame to another device.

An image processing system embodiment 2, the image processing system embodiment 1 wherein said processor is further configured to control said image processing system to generate a UV map to be used for mapping portions of said first frame to segments of an environmental model.

An image processing system embodiment 3, the image processing system embodiment 1 wherein said processor is further configured to control said image processing system to generate an environmental model including segments corresponding to non-occluded surfaces of said environment and segments corresponding to occluded surfaces of said environment.

An image processing system embodiment 4, the image processing system embodiment 3 wherein said UV map maps image content in said first frame corresponding to said non-occluded image portion of said first frame to a first segment of said environmental model which corresponds to a portion of said environment which is visible from said first location.

An image processing system embodiment 5, the image processing system embodiment 4 wherein said UV map further maps image content in said first frame corresponding to said first occluded image portion to a second segment of said environmental model which corresponds to a portion of said environment which is not visible from said first location.

An image processing system embodiment 6, the image processing system embodiment 1 wherein said first image is received from a first camera in said environment; and wherein said additional image is received from a camera at a location in said environment offset from a location at which said first camera is positioned in said environment.

An image processing system embodiment 7, the image processing system embodiment 6 wherein said first camera is a camera of a stereoscopic camera pair including said first camera and said second camera, said stereoscopic camera pair being positioned at said first location wherein said processor is further configured to control said image processing system to receive a second image corresponding to a portion of an environment from the second camera, said second image including a second non-occluded image portion corresponding to the portion of the environment visible from the first location.

An image processing system embodiment 8, the image processing system embodiment 7 wherein said processor is further configured to control said image processing system to include in said first frame at least a portion of said second image.

An image processing system embodiment 9, the image processing system embodiment 1 wherein said first frame is in a second frame format; and wherein said processor is further configured to control said image processing system to: generate a frame in a first frame format, said frame in the first format including image content from said non-occluded image portion of said first frame and no image content corresponding to an occluded portion of the environment; and store said frame in the first format in the storage device.

An image processing system embodiment 10, the image processing system embodiment 9 wherein the first frame and the frame in the first format correspond to a first program; wherein said processor is further configured to control said image processing system to: receive a first request for content corresponding to the first program from a first playback device which supports the display of occluded image content; and send said first frame in the second format to the first device in response to said first request for content.

An image processing system embodiment 11, the image processing system embodiment 10 wherein said processor is further configured to control said image processing system to determine from device capability information, prior to sending the first frame in the second format, that the first playback device supports the display of occluded image content.

An image processing system embodiment 12, the image processing system embodiment 10 wherein said processor is further configured to control said image processing system to: receive a second request for content corresponding to the first program from a second playback device which does not support the display of occluded image content; and send said frame in the first format to the second playback device in response to said second request for content.

An image processing system embodiment 13, the image processing system embodiment 12 wherein said processor is further configured to control said image processing system to determine from device capability information corresponding to the second playback device, prior to sending the frame in the first format, that the second playback device does not support the display of occluded image content.

An image processing system embodiment 14, the image processing system embodiment 13 wherein said first frame in the second format and the frame in the first format are the same size and include the same number of pixels.

An image processing system embodiment 15, the image processing system embodiment 14 wherein said processor is further configured to control said image processing system to: transmit to the second playback device an environmental model which does not include segments corresponding to portions of the environment occluded from view from the first location; and transmit to the second playback device a UV map to be used for mapping portions of the frame in the first format to the environmental model which does not include segments corresponding to portions of the environment occluded from view from the first location.

A method embodiment 16 of operating an image processing system, the method embodiment 16 comprising: receiving a first image corresponding to a portion of an environment, said first image including a non-occluded image portion corresponding to a portion of the environment visible from a first location; generating a first frame including image content from said non-occluded image portion of said first image; receiving an additional image of the environment including at least a first occluded image portion corresponding to a portion of the environment occluded from view from said first location; generating an auxiliary frame including image content from said first occluded image portion of the additional image; and storing said first frame and said auxiliary frame in a storage device or transmitting said first frame to another device.

A method embodiment 17 of operating an image processing system, the method embodiment 16 further comprising: generating a first UV map indicating a mapping of portions of said first frame to segments of an environmental model which correspond to portions of said environment which are visible from said first location; and generating an auxiliary UV map indicating a mapping of portions of said auxiliary frame to segments of an environmental model which correspond to portions of said environment which are not visible from said first location.

A method embodiment 18 of operating an image processing system, the method embodiment 17 further comprising: generating an environmental model including segments corresponding to non-occluded surfaces of said environment and segments corresponding to occluded surfaces of said environment.

A method embodiment 19 of operating an image processing system, the method embodiment 16 wherein said auxiliary frame is smaller than said first frame and includes fewer pixels than said first frame.

A method embodiment 20 of operating an image processing system, the method embodiment 18 further comprising: multiplexing said first frame and said auxiliary frame; and transmitting a multiplexed content stream including said first frame in a primary content stream and said auxiliary frame in an auxiliary content stream.

A method embodiment 21 of operating an image processing system, the method embodiment 20 wherein multiplexing said first frame and said auxiliary frame includes incorporating said auxiliary frame in said multiplexed content stream before said first frame such that a device receiving said multiplexed content stream will receive said auxiliary frame before said first frame.

A method embodiment 22 of operating an image processing system, the method embodiment 20, further comprising: receiving a second image corresponding to said portion of the environment, said second image including a second non-occluded image portion; receiving a second additional image of the environment including at least a second occluded image portion; and generating a second frame including image content from said second non-occluded image portion of said second image.

A method embodiment 23 of operating an image processing system, the method embodiment 22 wherein generating the auxiliary frame includes: including image content from said second occluded image portion of the second additional image in said auxiliary frame with said first occluded image portion.

A method embodiment 24 of operating an image processing system, the method embodiment 23 wherein said auxiliary frame includes occluded image portions corresponding to M different frames in the primary content stream, M being a non-zero integer; and wherein generating the auxiliary frame includes including image content from said second occluded image portion of the second additional image in said auxiliary frame.

A method embodiment 25 of operating an image processing system, the method embodiment 24 wherein said auxiliary frame is the same size as said first frame and includes the same number of pixels as said first frame.

A method embodiment 26 of operating an image processing system, the method embodiment 16 further comprising: receiving a first request for content corresponding to a first program from a first playback device which supports the display of occluded image content; and sending said first frame and the auxiliary frame to the first playback device in response to said first request for content.

A method embodiment 27 of operating an image processing system, the method embodiment 26 further comprising: sending the first UV map and the auxiliary UV map to the first playback device.

A method embodiment 28 of operating an image processing system, the method embodiment 26 further comprising: determining from device capability information, prior to sending the first frame and the auxiliary frame, that the first playback device supports the display of occluded image content.

A method embodiment 29 of operating an image processing system, the method embodiment 26 further comprising: receiving a second request for content corresponding to the first program from a second playback device which does not support the display of occluded image content; and sending said first frame to the second playback device in response to said second request for content without sending said auxiliary frame to the playback second device.

A method embodiment 30 of operating an image processing system, the method embodiment 26 further comprising: sending the first UV map to the second playback device but not sending the auxiliary UV map to the playback device.

A method embodiment 31 of operating an image processing system, the method embodiment 29 further comprising: determining from device capability information, prior to sending the first frame to the second playback device without sending the auxiliary frame that the second playback device does not support the display of occluded image content.

An embodiment including a non-transitory computer readable medium for use in a system, said non-transitory computer readable medium including computer executable instructions which, when executed by a computer, control the system to: receive a first image corresponding to a portion of an environment, said first image including a non-occluded image portion corresponding to a portion of the environment visible from a first location; generate a first frame including image content from said non-occluded image portion of said first image; receive an additional image of the environment including at least a first occluded image portion corresponding to a portion of the environment occluded from view from said first location; generate an auxiliary frame including image content from said first occluded image portion of the additional image; and store said first frame and said auxiliary frame in a storage device or transmit said first frame to another device.

An image processing system embodiment 16 comprising: a receiver configured to receive a first image corresponding to a portion of an environment, said first image including a non-occluded image portion corresponding to a portion of the environment visible from a first location; a processor configured to generate a first frame including image content from said non-occluded image portion of said first image; wherein said receiver is further configured to receive an additional image of the environment including at least a first occluded image portion corresponding to a portion of the environment occluded from view from said first location; wherein said processor is further configured to generate an auxiliary frame including image content from said first occluded image portion of the additional image; and a memory for storing said first frame and said auxiliary frame or a transmitter configured to transmit said first frame to another device.

An image processing system embodiment 17, the image processing system embodiment 16 wherein said processor is further configured to: generate a first UV map indicating a mapping of portions of said first frame to segments of an environmental model which correspond to portions of said environment which are visible from said first location; and generate an auxiliary UV map indicating a mapping of portions of said auxiliary frame to segments of an environmental model which correspond to portions of said environment which are not visible from said first location.

An image processing system embodiment 18, the image processing system embodiment 17 wherein said processor is further configured to generate an environmental model including segments corresponding to non-occluded surfaces of said environment and segments corresponding to occluded surfaces of said environment.

An image processing system embodiment 19, the image processing system embodiment 16 wherein said auxiliary frame is smaller than said first frame and includes fewer pixels than said first frame.

An image processing system embodiment 20, the image processing system embodiment 18 further comprising: a multiplexer configured to multiplex said first frame and said auxiliary frame; and wherein said transmitter is further configured to transmit a multiplexed content stream including said first frame in a primary content stream and said auxiliary frame in an auxiliary content stream.

An image processing system embodiment 21, the image processing system embodiment 20 wherein said multiplexer is configured, as part of being configured to multiplex said first frame and said auxiliary frame, to incorporate said auxiliary frame in said multiplexed content stream before said first frame such that a device receiving said multiplexed content stream will receive said auxiliary frame before said first frame.

An image processing system embodiment 22, the image processing system embodiment 20 wherein said receiver is further configured to receive a second image corresponding to said portion of the environment, said second image including a second non-occluded image portion; wherein said receiver is further configured to receive a second additional image of the environment including at least a second occluded image portion; and wherein said processor is further configured to generate a second frame including image content from said second non-occluded image portion of said second image.

An image processing system embodiment 23, the image processing system embodiment 22 wherein said processor is further configured, as part of being configured to generate the auxiliary frame, to include image content from said second occluded image portion of the second additional image in said auxiliary frame with said first occluded image portion.

An image processing system embodiment 24, the image processing system embodiment 23 wherein said auxiliary frame includes occluded image portions corresponding to M different frames in the primary content stream, M being a non-zero integer; and wherein said processor is further configured, as part of being configured to generate the auxiliary frame, to include image content from said second occluded image portion of the second additional image in said auxiliary frame.

An image processing system embodiment 25, the image processing system embodiment 24 wherein said auxiliary frame is the same size as said first frame and includes the same number of pixels as said first frame.

An image processing system embodiment 26, the image processing system embodiment 16 wherein said receiver is further configured to receive a first request for content corresponding to a first program from a first playback device which supports the display of occluded image content; and wherein said transmitter is further configured to send said first frame and the auxiliary frame to the first playback device in response to said first request for content.

An image processing system embodiment 27, the image processing system embodiment 26 wherein said transmitter is further configured to send the first UV map and the auxiliary UV map to the first playback device.

An image processing system embodiment 28, the image processing system embodiment 26 wherein said processor is further configured to determine from device capability information corresponding to the first playback device, prior to the first frame and the auxiliary frame being sent to the first playback device, that the first playback device supports the display of occluded image content.

An image processing system embodiment 29, the image processing system embodiment 26 wherein said receiver is further configured to receive a second request for content corresponding to the first program from a second playback device which does not support the display of occluded image content; and wherein said transmitter is further configured to send said first frame to the second playback device in response to said second request for content without sending said auxiliary frame to the playback second device.

An image processing system embodiment 30, the image processing system embodiment 26 wherein said transmitter is further configured to send the first UV map to the second playback device but not sending the auxiliary UV map to the playback device.

An image processing system embodiment 31, the image processing system embodiment 29 wherein said processor is further configured to determine, from device capability information corresponding to the second playback device, prior to the first frame being sent to the second playback device without the auxiliary frame, that the second playback device does not support the display of occluded image content.

A method embodiment 1 of operating a content playback device, the method comprising: receiving a first frame including non-occluded image content corresponding to a portion of an environment visible from a first location in the environment and occluded image content corresponding to a portion of the environment which is not visible from said first location; detecting a head position of a user; and outputting to a display an image of portions of the environment as a function of the detected head position.

A method embodiment 2 of operating a content playback device, the method embodiment 1 wherein said outputting to a display an image includes: outputting image portions corresponding to portions of the environment which are visible from the first location when said users head position is in a default location; and outputting image portions corresponding to at least some portions of the environment which are not visible from the first location when said users head position indicates a location offset from said default location.

A method embodiment 3 of operating a content playback device, the method embodiment 1 further comprising: receiving a UV map indicating a mapping between portions of a frame and segments of a model of the environment; and wherein outputting to a display an image includes outputting a portion of a rendered image generated by using the UV map to map image portions included in the first frame to segments of the model of the environment.

A method embodiment 4 of operating a content playback device, the method embodiment 3 further comprising: receiving said model of the environment, said model being a mesh model including segments corresponding to surfaces in said environment which are visible from the first location and at least some segments corresponding to occluded portions of said environment which are not visible from the first location.

A method embodiment 5 of operating a content playback device, the method embodiment 3 wherein said non-occluded image content includes content captured by a first camera at said first location in the environment and wherein the occluded image content was captured by an additional camera located in said environment at a location offset from said first location.

A method embodiment 6 of operating a content playback device, the method embodiment 4 further comprising: receiving a list of available programs, said list including for a first program a list of streams corresponding to said program but in different stream formats, a first one of said different stream formats including a stream format which does not include occluded image content and a second stream format which includes occluded image content; receiving user input selecting said first program; and selecting, based on device capability information, which stream corresponding to the user selected program to request.

A method embodiment 7 of operating a content playback device, the method embodiment 6 wherein the playback device supports display of occluded image content; and wherein said step of selecting includes selecting a stream that includes occluded image content; and wherein the method further comprises: sending a request for the selected stream corresponding to the user selected program to a content server.

A method embodiment 8 of operating a content playback device, the method embodiment 4 further comprising: receiving a list of available programs, said list including a first program; receiving user input selecting said first program; and sending a request to a content server for the stream.

A method embodiment 9 of operating a content playback device, the method embodiment 8 further comprising: communicating to said content server device capability information indicating that said playback device is capable of supporting the display of occluded image content corresponding to portions of said environment which are not visible from said first location.

A method embodiment 10 of operating a content playback device, the method embodiment 9 wherein communicating to said content server device capability information includes at least one of: i) providing an identifier to the content server which can be used to determine capabilities of the playback device or ii) indicating to the content server content stream formats that can be supported by the playback device.

A method embodiment 11 of operating a content playback device, the method embodiment 10 wherein communicating to said content server device capability information includes indicating to the content server that the playback device supports a content stream format in which occluded image data is transmitted in a frame which also includes non-occluded image data.

An embodiment including a non-transitory computer readable medium for use in a system, said non-transitory computer readable medium including computer executable instructions which, when executed by a computer, control the system to: receive a first frame including non-occluded image content corresponding to a portion of an environment visible from a first location in the environment and occluded image content corresponding to a portion of the environment which is not visible from said first location; detect a head position of a user; and output to a display an image of portions of the environment as a function of the detected head position.

A content playback device embodiment 1 comprising: a receiver configured to receive a first frame including non-occluded image content corresponding to a portion of an environment visible from a first location in the environment and occluded image content corresponding to a portion of the environment which is not visible from said first location; a processor configured to control said content playback device to: detect a head position of a user, and output to a display an image of portions of the environment as a function of the detected head position; and a memory for storing said image.

A content playback device embodiment 2, the content playback device embodiment 1 wherein output to a display an image includes: outputting image portions corresponding to portions of the environment which are visible from the first location when said users head position is in a default location; and outputting image portions corresponding to at least some portions of the environment which are not visible from the first location when said users head position indicates a location offset from said default location.

A content playback device embodiment 3, the content playback device embodiment 1 wherein said receiver is further configured to receive a UV map indicating a mapping between portions of a frame and segments of a model of the environment; and wherein outputting to a display an image includes outputting a portion of a rendered image generated by using the UV map to map image portions included in the first frame to segments of the model of the environment.

A content playback device embodiment 4, the content playback device embodiment 3 wherein said receiver is further configured to receive said model of the environment, said model being a mesh model including segments corresponding to surfaces in said environment which are visible from the first location and at least some segments corresponding to occluded portions of said environment which are not visible from the first location.

A content playback device embodiment 5, the content playback device embodiment 3 wherein said non-occluded image content includes content captured by a first camera at said first location in the environment and wherein the occluded image content was captured by an additional camera located in said environment at a location offset from said first location.

A content playback device embodiment 6, the content playback device embodiment 4 wherein said receiver is further configured to receive a list of available programs, said list including for a first program a list of streams corresponding to said program but in different stream formats, a first one of said different stream formats including a stream format which does not include occluded image content and a second stream format which includes occluded image content; and said processor is further configured to operate said content playback device to: receive user input selecting said first program; and select, based on device capability information, which stream corresponding to the user selected program to request.

A content playback device embodiment 7, the content playback device embodiment 6 further comprising a transmitter configured to send a request for the selected stream corresponding to the user selected program to a content server, and wherein the playback device supports display of occluded image content; and wherein said processor as part of being configured to operate said content playback device to select which stream corresponding to the user selected program to request is configured to operate said content playback device to select a stream that includes occluded image content.

A content playback device embodiment 8, the content playback device embodiment 4 further comprising a transmitter configured to send a request to a content server for the stream; wherein said receiver is further configured to receive a list of available programs, said list including a first program; and wherein said processor is further configured to operate said content playback device to receive user input selecting said first program.

A content playback device embodiment 9, the content playback device embodiment 8 wherein said transmitter is further configured to communicate to said content server device capability information indicating that said playback device is capable of supporting the display of occluded image content corresponding to portions of said environment which are not visible from said first location.

A content playback device embodiment 10, the content playback device embodiment 9 wherein communicating to said content server device capability information includes at least one of: i) providing an identifier to the content server which can be used to determine capabilities of the playback device or ii) indicating to the content server content stream formats that can be supported by the playback device.

A content playback device embodiment 11, the content playback device embodiment 10 wherein communicating to said content server device capability information includes indicating to the content server that the playback device supports a content stream format in which occluded image data is transmitted in a frame which also includes non-occluded image data.

One exemplary embodiment, referred to as a 12th playback method embodiment, is directed to method of operating a content playback device, in which the method includes the steps of operating the content playback device to receive a first frame including non-occluded image content corresponding to a portion of an environment visible from a first location in the environment, receive an auxiliary frame including occluded image content corresponding to a portion of the environment which is not visible from said first location, detecting a head position of a user; and output to a display image of portions of the environment as a function of the detected head position. In a thirteenth method embodiment which includes the features of the 12th method embodiment, the method further includes, as part of outputting to a display outputting to the display image portions corresponding to portions of the environment which are visible from the first location when said head position of the user corresponds to a default location and outputting to the display image portions corresponding to at least some portions of the environment which are not visible from the first location when the head position of the user corresponds to a location offset from said first location.

In a fourteenth playback method embodiment, which includes the features of the 12th playback method embodiment the method further comprises receiving a first UV map indicating a mapping between portions of the first frame including non-occluded image content to segments of a first model of the environment which correspond to portions of said environment visible from said first location; and receiving an auxiliary UV map indicating a mapping between portions of the auxiliary frame including occluded image content to segments of the first model of the environment which correspond to portions of said environment which are not visible from said first location.

In a fifteenth playback method embodiment, which includes the features of the fourteenth playback method embodiment, outputting to a display image portions of the environment includes, when said user's head is positioned at a location offset from a default location corresponding to the first location in the environment: displaying a portion of a rendered image generated by i) using the first UV map to map image portions included in the first frame to segments of the first model of the environment and ii) using the auxiliary UV map to map image portions included in the auxiliary frame to segments of the first model of the environment which correspond to portions of the environment which are not visible from said first location. In a sixteenth playback method embodiment, which includes the features of the fifteenth playback method embodiment, the method further includes receiving said first frame and auxiliary frame in a multiplexed content stream including a primary content stream including said first frame and an auxiliary content stream including said auxiliary frame.

In a seventeenth playback method embodiment, which includes the features of the sixteenth playback method embodiment, the method further includes demultiplexing said primary content stream and said auxiliary content stream. In an eighteenth playback embodiment, which includes the features of the seventieth playback embodiment, the primary content stream includes M frames for each frame in said auxiliary content stream, M being one or larger. In a nineteenth playback method embodiment which includes the features of the eighteenth playback method embodiment, M is greater than one and the auxiliary frame includes occluded image content corresponding to said first frame and at least one additional frame in a set of M frames included in said primary content stream. In a twentieth playback method embodiment which includes the features of the nineteenth playback method embodiment, the first frame and the auxiliary frame are received in encoded form and the method further includes using a first decoder to decode said first frame prior to image rendering; and using a second decoder which is different from said first decoder to decode the said auxiliary frame prior to image rendering.

In a twenty-first playback method embodiment, the second decoder is slower than said first decoder. In a twenty second playback method embodiment, which includes the features of the eighteenth playback method embodiment the auxiliary frame is the same size and includes the same number of pixels as said first frame. In a twenty third playback method embodiment which includes the features of the eighteenth playback method embodiment, the first frame and the auxiliary frame are received in encoded form, and the method further includes using a decoder on a time shared basis to decode said first frame and said auxiliary frame prior to image rendering. In a twenty-fourth playback method embodiment, which includes the features of the fourteenth playback method embodiment, the method further includes receiving a second environmental model including segments corresponding to portions of the environment visible from said first location in the environment, receiving auxiliary environmental model information providing information on segments corresponding to occluded portions of said environment which are not visible from said first location in the environment; and using the auxiliary environmental model information to modify the second environmental model to generate said first environmental model, said first environmental model including segments corresponding to occluded portions of said environment and segments corresponding to non-occluded portions of said environment.

A content playback device embodiment 12 comprising: a receiver for receiving a first frame including non-occluded image content corresponding to a portion of an environment visible from a first location in the environment and for receiving an auxiliary frame including occluded image content corresponding to a portion of the environment which is not visible from said first location; a memory for storing received frames; and a processor configured to: detect a head position of a user; and output, to a display, image of portions of the environment as a function of the detected head position.

A content playback device embodiment 13, the content playback device embodiment 12 wherein the processor is configured, as part of outputting to a display: output image portions corresponding to portions of the environment which are visible from the first location when said head position of the user corresponds to a default location; and output image portions corresponding to at least some portions of the environment which are not visible from the first location when the head position of the user corresponds to a location offset from said first location.

A content playback device embodiment 14, the content playback device embodiment 12 wherein said receiver is also for: receiving a first UV map indicating a mapping between portions of the first frame including non-occluded image content to segments of a first model of the environment which correspond to portions of said environment visible from said first location; and receiving an auxiliary UV map indicating a mapping between portions of the auxiliary frame including occluded image content to segments of the first model of the environment which correspond to portions of said environment which are not visible from said first location.

A content playback device embodiment 15, the content playback device of claim 14 wherein the processor is configured, as part of outputting to a display, when said user's head is positioned at a location offset from a default location corresponding to the first location in the environment, to: output a portion of a rendered image generated by i) using the first UV map to map image portions included in the first frame to segments of the first model of the environment and ii) using the auxiliary UV map to map image portions included in the auxiliary frame to segments of the first model of the environment which correspond to portions of the environment which are not visible from said first location.

A content playback device embodiment 16, the content playback device embodiment 15 wherein the receiver receives said first frame and auxiliary frame in a multiplexed content stream including a primary content stream including said first frame and an auxiliary content stream including said auxiliary frame.

A content playback device embodiment 17, the content playback device embodiment 16, further comprising: a demultiplexer for demultplexing said primary content stream and said auxiliary content stream.

A content playback device embodiment 18, the content playback device embodiment 17 wherein said primary content stream includes M frames for each frame in said auxiliary content stream, M being one or larger.

A content playback device embodiment 19, the content playback device embodiment 18 wherein M is greater than one, said auxiliary frame includes occluded image content corresponding to said first frame and at least one additional frame in a set of M frames included in said primary content stream.

A content playback device embodiment 20, the content playback device embodiment 19 wherein said first frame and said auxiliary frame are received in encoded form, and wherein said content playback device includes: a first decoder to decode said first frame prior to image rendering; and a second decoder which is different from said first decoder to decode the said auxiliary frame prior to image rendering.

A content playback device embodiment 21, the content playback device embodiment 20 wherein said second decoder is slower than said first decoder.

A content playback device embodiment 22, the content playback device embodiment 18 wherein said first frame and said auxiliary frame are received in encoded form, the method further comprising: using a decoder on a time shared basis to decode said first frame and said auxiliary frame prior to image rendering.

A content playback device embodiment 23, the content playback device embodiment 14 wherein said receiver is also for: receiving a second environmental model including segments corresponding to portions of the environment visible from said first location in the environment; receiving auxiliary environmental model information providing information on segments corresponding to occluded portions of said environment which are not visible from said first location in the environment; and using the auxiliary environmental model information to modify the second environmental model to generate said first environmental model, said first environmental model including segments corresponding to occluded portions of said environment and segments corresponding to non-occluded portions of said environment.

Another exemplary embodiment includes a non-transitory computer readable medium having computer executable instructions stored thereon which, when executed by a processor of a content playback device control the content playback device to perform the steps of: receiving a first frame including non-occluded image content corresponding to a portion of an environment visible from a first location in the environment; receiving an auxiliary frame including occluded image content corresponding to a portion of the environment which is not visible from said first location; detecting a head position of a user; and outputting to a display image of portions of the environment as a function of the detected head position.

While steps are shown in an exemplary order it should be appreciated that in many cases the order of the steps may be altered without adversely affecting operation. Accordingly, unless the exemplary order of steps is required for proper operation, the order of steps is to be considered exemplary and not limiting.

While various embodiments have been discussed, it should be appreciated that not necessarily all embodiments include the same features and some of the described features are not necessary but can be desirable in some embodiments.

While various ranges and exemplary values are described the ranges and values are exemplary. In some embodiments the ranges of values are 20% larger than the ranges discussed above. In other embodiments the ranges are 20% smaller than the exemplary ranges discussed above. Similarly, particular values may be, and sometimes are, up to 20% larger than the values specified above while in other embodiments the values are up to 20% smaller than the values specified above. In still other embodiments other values are used.

The techniques of various embodiments may be implemented using software, hardware and/or a combination of software and hardware. Various embodiments are directed to apparatus, e.g., a image data capture and processing systems. Various embodiments are also directed to methods, e.g., a method of image capture and/or processing image data. Various embodiments are also directed to a non-transitory machine, e.g., computer, readable medium, e.g., ROM, RAM, CDs, hard discs, etc., which include machine readable instructions for controlling a machine to implement one or more steps of a method.

Various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Some embodiments are directed a non-transitory computer readable medium embodying a set of software instructions, e.g., computer executable instructions, for controlling a computer or other device to encode and compresses stereoscopic video. Other embodiments are embodiments are directed a computer readable medium embodying a set of software instructions, e.g., computer executable instructions, for controlling a computer or other device to decode and decompresses video on the player end. While encoding and compression are mentioned as possible separate operations, it should be appreciated that encoding may be used to perform compression and thus encoding may, in some include compression. Similarly, decoding may involve decompression.

In various embodiments a processor of a processing system is configured to control the processing system to perform the method steps performed by the exemplary described processing system. In various embodiments a processor of a playback device is configured to control the playback device to implement the steps, performed by a playback device, of one or more of the methods described in the present application.

Numerous additional variations on the methods and apparatus of the various embodiments described above will be apparent to those skilled in the art in view of the above description. Such variations are to be considered within the scope.

What is claimed:

1. A method of operating a content playback device, the method comprising:
    receiving a first frame including non-occluded image content corresponding to a portion of an environment visible from a first location in the environment, said first location corresponding to a default location;
    receiving an auxiliary frame including occluded image content corresponding to a portion of the environment which is not visible from said first location;
    detecting a first head location of a user, said first head location being offset left or right, up or down from said default location;
    rendering an image by: i) using a first UV map to map image portions included in the first frame to a first set of segments of a model of the environment and ii) using an auxiliary UV map to map image portions included in the auxiliary frame to a second set of segments of the model of the environment, said rendered image including a portion of the environment which would be visible to the user in the environment having the detected first head location, said image including at least some non-occluded image content from the first frame and some occlude image content from said auxiliary frame; and
    outputting to the rendered image to a display.

2. The method of claim 1, wherein the first location in the environment corresponds to a default head position, the method further comprising:
    outputting to the display image portions corresponding to portions of the environment which are visible from the first location when the head location of the user is said default location.

3. The method of claim 1, further comprising:
    receiving the first UV map indicating a mapping between portions of the first frame including non-occluded image content to segments of a first model of the environment which correspond to portions of said environment visible from said first location; and
    receiving the auxiliary UV map indicating a mapping between portions of the auxiliary frame including occluded image content to segments of the first model of the environment which correspond to portions of said environment which are not visible from said first location.

4. The method of claim 3, further comprising:
    receiving said first frame and auxiliary frame in a multiplexed content stream including a primary content stream including said first frame and an auxiliary content stream including said auxiliary frame.

5. The method of claim 4, further comprising:
    demultiplexing said primary content stream and said auxiliary content stream.

6. The method of claim 5, wherein said first frame and said auxiliary frame are received in encoded form, the method further comprising:
    using a first decoder to decode said first frame prior to image rendering; and
    using a second decoder which is different from said first decoder to decode the said auxiliary frame prior to image rendering.

7. The method of claim 6, wherein said auxiliary frame is the same size and includes the same number of pixels as said first frame.

8. The method of claim 6, wherein said first frame and said auxiliary frame are received in encoded form, the method further comprising:
    using a decoder on a time shared basis to decode said first frame and said auxiliary frame prior to image rendering.

* * * * *